US010745570B2

(12) United States Patent
Brust et al.

(10) Patent No.: US 10,745,570 B2
(45) Date of Patent: Aug. 18, 2020

(54) COPPER-CONTAINING ARTICLES

(71) Applicant: Eastman Kodak Company, Rochester, NY (US)

(72) Inventors: Thomas B. Brust, Webster, NY (US); Grace Ann Bennett, Scottsville, NY (US); Catherine A. Falkner, Rochester, NY (US); Anne Troxell Wyand, Victor, NY (US)

(73) Assignee: EASTMAN RODACK COMPANY, Rochester, NY (US)

( * ) Notice: Subject to any disclaimer, the term of this patent is extended or adjusted under 35 U.S.C. 154(b) by 376 days.

(21) Appl. No.: 15/880,830

(22) Filed: Jan. 26, 2018

(65) Prior Publication Data

US 2019/0233660 A1 Aug. 1, 2019

Related U.S. Application Data

(62) Division of application No. 14/714,422, filed on May 18, 2015, now Pat. No. 9,963,614.

(51) Int. Cl.
| | |
|---|---|
| *C09D 5/14* | (2006.01) |
| *C09D 133/14* | (2006.01) |
| *C08F 220/06* | (2006.01) |
| *C09D 125/16* | (2006.01) |
| *C08F 220/58* | (2006.01) |
| *C09D 133/26* | (2006.01) |
| *C23C 18/40* | (2006.01) |
| *C08F 212/14* | (2006.01) |
| *C08F 2/60* | (2006.01) |
| *C08F 220/36* | (2006.01) |
| *C09D 5/16* | (2006.01) |
| *C08K 3/08* | (2006.01) |

(52) U.S. Cl.
CPC ............. *C09D 5/1618* (2013.01); *C08F 2/60* (2013.01); *C08F 212/14* (2013.01); *C08F 220/06* (2013.01); *C08F 220/36* (2013.01); *C08F 220/58* (2013.01); *C09D 5/14* (2013.01); *C09D 5/1662* (2013.01); *C09D 125/16* (2013.01); *C09D 133/14* (2013.01); *C09D 133/26* (2013.01); *C23C 18/40* (2013.01); *C08F 220/365* (2020.02); *C08F 220/585* (2020.02); *C08F 2800/10* (2013.01); *C08K 2003/085* (2013.01); *C08K 2201/011* (2013.01)

(58) Field of Classification Search
CPC .. C09D 5/1618; C09D 5/1662; C09D 125/16; C09D 133/14; C09D 133/26; C08F 2/16; C08F 212/14; C08F 220/06; C08F 220/36; C08F 220/58; C08F 220/585; C08F 220/365; C08F 2800/10; C08K 2003/085; C08K 2201/011; C23C 18/40
USPC ..................................................... 428/336
See application file for complete search history.

(56) References Cited

U.S. PATENT DOCUMENTS

| | | |
|---|---|---|
| 6,949,598 B2 | 9/2005 | Terry |
| 7,143,709 B2 | 12/2006 | Brennan et al. |
| 7,348,365 B2 | 3/2008 | Lee et al. |
| 7,650,848 B2 | 1/2010 | Brennan et al. |
| 8,361,553 B2 | 1/2013 | Karandikar et al. |
| 8,828,275 B2 | 9/2014 | Wang et al. |
| 9,081,282 B1 | 7/2015 | Brust et al. |
| 2008/0102122 A1 | 5/2008 | Mahadevan et al. |
| 2008/0102144 A1 | 5/2008 | Koritala et al. |
| 2008/0147019 A1 | 6/2008 | Song et al. |
| 2009/0263496 A1 | 10/2009 | Kijlstra et al. |
| 2010/0119829 A1 | 5/2010 | Karpov et al. |
| 2010/0226943 A1 | 9/2010 | Brennan et al. |
| 2011/0206753 A1 | 8/2011 | Karpov et al. |
| 2012/0302703 A1 | 11/2012 | Greiner et al. |
| 2013/0171225 A1 | 7/2013 | Uhlmann et al. |
| 2014/0221543 A1 | 8/2014 | Wang et al. |
| 2016/0338358 A1 | 11/2016 | Brust et al. |

OTHER PUBLICATIONS

Szczubialka et al. ("Response of micelles formed by smart terpolymers to stimuli studied by dynamic light scattering," vol. 44, issue 18, (Aug. 2003) p. 5269-5274).*
Giridhar Mishra et al., "Synthesis and Ultrasonic Characterization of Cu/PVP Nanoparticles-Polymer Suspensions," Open Journal of Acoustics, 2011, vol. 1, No. 1, 9-14.
Van Du Cao et al., "Synergistic effect of citrate dispersant and capping polymers on controlling size growth of ultrafine copper nanoparticles," Journal of Experimental Nanoscience, DOI: 10.1080/17458080.2013.848298.
Chelsea M. Magin et al., "Engineered antifouling microtopographies: the role of Reynolds number in a model that prgdicts attachmlmt of zoospores of Ulva and cells of Cobetia marina," Biofouling: The Journal of Bioadhesion and Biofilm Research, 26:6, 719-727, DOI: 10.1080/08927014.2010.511198.
Michelle L. Carman et al., "Engineered antifouling microtopographies—correlating wettability with cell attachment," Biofouling: The Journal of Bioadhesion and Biofilm Research, 22:1, 11-21, DOI: 10.1080/08927010500484854.
Jayesh P. Ruparelia et al., "Strain specificity in antimicrobial activity of silver and copper nanoparticles," Acta Materialia Inc., DOI: 10.1016/j.actbio.2007.11.006.

(Continued)

*Primary Examiner* — William K Cheung

(57) ABSTRACT

A water-soluble composition includes reducible copper ions or copper nanoparticles complexed with a reactive polymer. The reactive polymer can be crosslinked using suitable irradiation to provide copper-containing water-insoluble complexes. The water-soluble composition can be used to provide various articles and electrically-conductive materials that can be assembled in electronic devices. The reactive polymer has greater than 1 mol % of recurring units comprising sulfonic acid or sulfonate groups, at least 5 mol % of recurring units comprising a pendant group capable of crosslinking via [2+2] photocycloaddition, and optionally at least 1 mol % of recurring units comprising a pendant amide, amine, hydroxyl, lactam, phosphonic acid, or carboxylic acid group.

11 Claims, No Drawings

(56) References Cited

OTHER PUBLICATIONS

Chelsea M. Magin et al., "Antifouling Performance of Cross-linked Hydrogels: Refinement of an Attachment Model," Biomacromolecules 2011, 12, 915-922.

Il-Wun Shim et al., "Preparation of Copper Nanoparticles in Cellulose Acetate Polymer and the Reaction Chemistry of Copper Complexes in the Polymer," Bull. Korean Chem. Soc. 2002, vol. 23, No. 4, 563.

Nicola Cioffi et al., "Copper Nanoparticle/Polymer Composites with Antifungal and Bacteriostatic Properties," Chem. Mater. 2005, 17, 5255-5262.

Dongzhi Lai et al., "Synthesis of Highly Stable Dispersions of Copper Nanoparticles Using Sodium Hypophosphite," Journal of Applied Polymer Science, 2013, DOI: 10.1002/APP.38109.

Bong Kyun Park et al., "Synthesis and size control of monodisperse copper nanoparticles by polyol method," Journal of Colloid and Interface Science 311 (2007) 417-424.

Takuya Harada et al., "Formation of Rod Shape Secondary Aggregation of Copper Nanoparticles in Aqueous Solution of Sodium Borohydride with Stabilizing Polymer," Journal of Physics: Conference Series, 61 (2007) 394-398.

Jeyaraman Ramyadevi et al., "Synthesis and antimicrobial activity of copper nanoparticles," Materials Letters, 71 (2012) 114-116.

Muhammad Sani Usman et al., "Copper Nanoparticles Mediated by Chitosan: Synthesis and Characterization via Chemical Methods," Molecules 2012, 17, 14928-14936; DOI: 10.3390/molecules 171214928.

Stefan Bokern et al., "Polymer grafted silver and copper nanoparticles with exceptional stability against aggregation by a high yield one-pot synthesis," Polymer 52 (2011) 912-920.

O. E. Litmanovich et al., "Formation of Copper Nanoparticles During the Reduction of $Cu^{2+}$ Ions in Solutions and Dispersions of Polycation—Poly(acrylic acid) Interpolymer Complexes in Acidic Media," Polymer Science, Ser. B, 2014, vol. 56 No. 3, pp. 326-334.

Krzysztof Szczubialka et al., "Response of micelles formed by smart terpolymers to stimuli studied by dynamic light scattering," Oct. 29, 2002, Science Direct, Polymer 44 (2003) 5269-5274.

\* cited by examiner

COPPER-CONTAINING ARTICLES

RELATED APPLICATION

This is a divisional of U.S. Pat. No. 9,963,614.

Related subject matter is described and claimed in the following copending and commonly assigned patent application:

U.S. Ser. No. 14/714,409, filed on May 18, 2015 by Brust et al., and entitled "Copper-containing Polymeric Compositions," now abandoned.

FIELD OF THE INVENTION

This invention relates to articles containing such copper-containing polymeric compositions and to methods for preparing and using such articles for various purposes including anti-microbial technologies.

BACKGROUND OF THE INVENTION

Copper salts and to a lesser degree its metallic form, have been used for many years as antimicrobial or anti-fouling additives in paints, surface coatings, and even swimming pools. In particular, many marine paints and antifouling surfaces employ some type of copper compound. Interest in antimicrobial surface coatings has recently increased due to the broad emergence of antibiotic resistant strains of microbes such as MERSA and tuberculosis. While there has been great interest in silver salts and silver nanoparticles due to their well know antimicrobial activity, copper may also serve a similar function, is much less expensive, and forms coatings that have less color and are often nearly colorless due to the much weaker surface plasmon resonance and the lack photosensitivity that causes most silver salts to darken with age and light exposure. There is also some evidence that copper may be more effective for some microbial strains such as fungi or may compliment silver or even traditional antibiotics, possibly synergistically, to provide a much enhanced and broader spectrum antimicrobial response [see for example, Ruparelia et al. *Acta Biomaterialia* 4 (2008) 707-716]. Low levels of copper can be highly effective antimicrobial agents with low toxicity to humans and the environment.

A wide variety of methods for preparing copper nanoparticles are known and include electrochemical methods, high vacuum copper sputtering and deposition, and chemical methods [see for example, Ramyadevi et al., *Materials Letters* 71 (2012) 114-116].

Certain polymer composites with copper nanoparticles are described in the literature. For example, it is known to form copper nanoparticles by hydrogen reduction of copper ion in cellulose acetate to be used for chemical catalysis [see for example, Shim et al., *Bull. Korean Chem. Soc.* 2002, Vol. 23, No. 4, 563-566]. A strong antifungal response was found using copper nanoparticles synthesized by an electrolytic method and then dispersed in poly(vinyl methyl ketone), poly(vinyl chloride), or poly(vinylidene fluoride) in the presence of acetonitrile or tetrahydrofuran solvent according to Cioffi et al., *Chem. Mater.* 2005, 17, 5255-5262. Rod-shaped copper nanoparticles were synthesized by sodium borohydride reduction in an aqueous poly(vinyl pyrrolidone) solution according to Harada et al., *Journal of Physics; Conference Series* 61 (2007) 394-398). Poly(vinyl pyrrolidone) was used as the polymeric stabilizer in a synthesis of low dispersity copper nanoparticles in diethylene glycol with sodium hypophosphite as a reducing agent according to Park et al., *Journal of Colloid and Interface Science* 311 (2007) 417-424. Extremely small (approx. 2 nm) copper nanoparticles stabilized by thiolate functionalized polystyrene have been synthesized in tetrahydrofuran solvent with hydrazine as a reducing agent. This material appears to be coextruded with conventional polystyrene at 190° C. due to the exceptional stability of the copper nanoparticles [see Bokern et al., *Polymer* 52 (2011) 912-920]. Copper nanoparticles in the size range of 10 nm to 40 nm were prepared in an aqueous solution of about 3 weight % poly(vinyl pyrrolidone) without a disclosed reducing agent [Mishra et al., *Open Journal of Acoustics*, 2011, Vol. 1, No. 1, 9-14]. An aqueous preparation of copper nanoparticles dispersed in poly(vinyl pyrrolidone) (PVP) using sodium hypophosphite as the reducing agent at pH 1 was considered to have exceptional stability from the strong PVP interaction in Lai et al., *Journal of Applied Polymer Science*, 128: 14543-1449, 2013. Moreover, copper particles were prepared in glycerol at temperatures up to 150° C. using either PVP or poly(vinyl alcohol) (PVA) as the stabilizer and hydrazine as the reducing agent (see for example, Cao et al., *Journal of Experimental Nanoscience*, DOI: 10.1080/17458080.2013.848298). Another aqueous preparation employs a combination of poly(acrylic acid) with the cationic poly (1,2-dimethyl-5-vinylpyridinium methylsulfate) and hydrazine borane as the reducing agent to produce a range of copper nanoparticle sizes at pH below about 3 and depending on the polymer composition (see for example, Litmanovich et al., Polymer Science, Ser. B, 2014, Vol. 56, No. 3, 326-344). Preparation of copper nanoparticles in natural polymer chitosan using hydrazine as a reducing agent is discussed by Usman et al., *Molecules* 2012, 17, 14928-14936.

The preparation of copper compounds with aqueous water-soluble polymers is described in U.S. Application Publication 2011/0206753 (Karpov et al.), for example, copper oxalate or copper hydoxycarbonate in the presence of poly(carboxylate ether) polymer (Sokolan from BASF). U.S. Application Publication 2010/0119829 (Karpov et al.) describes copper or zinc oxide and hydroxide nanoparticles formed in the presence of acrylic carboxylate polymers. U.S. Application Publication 2013/0171225 (Uhlmann et al.) describes nanoparticulate copper salts such as copper iodide prepared in hydrophilic polymer emulsions including acrylics and poly(vinyl pyrrolidone). U.S. Application Publication 2012/0302703 (Greiner et al.) describes the formation of copper nanoparticles enveloped in aromatic sulfide modified non-water-soluble polymers such as polystyrene and poly(methyl methacrylate) where polymerization and nanoparticle formation is done sequentially in the same vessel.

Within the last 5 years, researchers have described reduction in biofouling and microbial colony formation by use of very specific surface patterns embossed or imprinted in a polymer layer (see for example, Magin et al. *Biomacromolecules* 2011, 12, 915-922; Magin et al. *Biofouling* Vol. 26, No. 6, August 2010, 719-727; Carman et al., *Biofouling*, 2006 Vol. 22 No. 1, 2006, 11-21; U.S. Pat. No. Application Publication 2010/0226943, and U.S. Pat. Nos. 7,650,848 and 7,143,709, all Brennan et al.). Such patterns typically have minimum feature dimensions of about 2 μm and a specific pattern known as the SHARKLET™ AF pattern has been shown to have desirable overall performance compared to simpler patterns with similar dimensions. The polymer used most frequently in such patterns is a polydimethylsiloxane (PDMS) type polymer, although acrylic polymers have also been demonstrated.

While there are numerous polymer-copper complexes described in the art, there remains a need for polymer-copper complexes that are water-soluble and water-coatable, but which also can be crosslinked with UV light to become water-insoluble and highly durable after application to a substrate. There is a need for such polymer-copper complexes that can be readily used in antimicrobial compositions or articles.

There is the further need to provide water-soluble polymeric complexes that contain reducible copper ions that are readily reduced in the polymeric complexes, before or after the polymers are crosslinked. It would be desirable to form copper nanoparticles in uniform coatings or metallic patterns in the size range of 1 to 500 nm using such materials.

SUMMARY OF THE INVENTION

This invention provides a copper-containing article comprising a substrate and having disposed thereon a copper-containing composition comprising a water-soluble complex of a reactive polymer with reducible copper ions or copper nanoparticles, the reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

In addition, the present invention provides a copper-containing article comprising a substrate and having disposed thereon a water-insoluble composition comprising a crosslinked water-insoluble complex of a crosslinked reactive polymer with reducible copper ions or copper nanoparticles, the crosslinked reactive polymer derived from photoexposure of a reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

The present invention provides a method for providing a copper-containing article, the method comprising:

disposing a copper-containing composition onto a first supporting side of a substrate, the copper-containing composition comprising a water-soluble complex of a reactive polymer with reducible copper ions, the reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

In some embodiments, the method comprises disposing the copper-containing composition onto a supporting side of the substrate in a patternwise fashion using a flexographic printing member.

Moreover, the method can further comprise:

reducing the reducible copper ions in the water-soluble complex to form copper nanoparticles in the water-soluble complex.

In other embodiments, the method further comprises:

after reducing the reducible copper ions, photoexposing the water-soluble complex containing the copper nanoparticles to form a crosslinked water-insoluble complex comprising the copper nanoparticles.

For example, the method comprises:

photoexposing the water-soluble complex containing the copper nanoparticles in a patternwise fashion on the substrate.

The method can comprise:

reducing the copper ions in the water-soluble complex to form copper nanoparticles having an average diameter of at least 2 nm and up to and including 500 nm.

In addition, the method can further comprise, after photoexposing the water-soluble complex to form the crosslinked water-insoluble complex containing copper nanoparticles, heating the crosslinked water-insoluble complex containing copper nanoparticles at a temperature sufficient to further crosslink the crosslinked water-insoluble complex containing the copper nanoparticles.

Moreover, the method further comprises, after photoexposing the water-soluble complex to form the crosslinked water-insoluble complex containing copper nanoparticles, removing any remaining water-soluble complex from the substrate.

In some embodiments, the method of the present invention comprises:

disposing the copper-containing composition onto the first supporting side of a substrate, photoexposing the water-soluble complex to form a crosslinked water-insoluble complex containing reducible copper ions, reducing the reducible copper ions in the water-soluble complex to form copper nanoparticles in the water-soluble complex on the first supporting side of the substrate, disposing the same or different copper-containing composition onto an opposing second supporting side of the substrate, photoexposing the water-soluble complex on the opposing second supporting side of the substrate, and optionally removing any remaining water-soluble complex from both the first supporting side and the opposing second supporting side of the substrate, and reducing the reducible copper ions in the water-soluble complex to form copper nanoparticles in the water-soluble complex on the opposing second supporting side of the substrate.

The advantages of the present invention are provided using a unique reactive polymer that is water-soluble or water-dispersible and can be used to form a complex with either reducible copper ions or copper nanoparticles. Two essential features are present in the reactive polymer to provide the desired properties. The first essential feature is the presence of greater than about 1 mol % of recurring units comprising sulfonic acid or sulfonate groups. The second essential feature is the presence of at least 5 mol % of recurring units comprising a pendant group capable of crosslinking via [2+2] photocycloaddition group. A variety of other recurring units can be present in the reactive polymer, for example comprising pendant amide, amine, hydroxyl, lactam, phosphonic acid, or carboxylic acid groups to provide additional properties. Hydrophobic monomers such as styrene or acrylate esters can also be used in preparation of the reactive polymers to enhance coating, film-forming, and durability characteristics.

The presence of the sulfonic acid or sulfonate groups in the reactive polymers provide desired water solubility or water dispersibility for a broad range of uses, most importantly in the presence of reducible copper ions that can precipitate other less water-soluble polymers. The pendant groups that are capable [2+2] photocycloaddition provide a built-in crosslinking function that is extremely thermally stable and only activated by exposure to the appropriate UV radiation.

The reducible copper ion or copper nanoparticle bearing polymeric complexes used in this invention have a broad range of capabilities or uses due to the reactivity of the complexed reducible copper ions or copper nanoparticles, high resolution patternability, and water-solubility or swellability after reactive polymer crosslinking. These reducible copper ion or copper nanoparticle containing polymer complexes can be used to form high resolution, electrically-conductive metal grid patterns. For example, these complexes can be coated and exposed with a high resolution UV radiation and developed in water, or they can be printed by various methods including gravure or flexographic printing methods and then hardened with UV light.

These polymeric complexes containing reducible copper ions or copper nanoparticles can also be used on various surfaces (for example, of substrates) where they can be hardened or patterned with UV radiation to form reducible copper ion loaded crosslinked hydrogels (containing reacted polymers) wherein water and ions can readily diffuse in and out. Such coatings can be used as an antimicrobial coating on various surfaces.

The high resolution patternability of the copper-containing polymeric complexes described herein can enable an enhanced form of antimicrobial surface based on recent learning about the efficacy of specifically designed high resolution patterns that show dramatic reduction in biofouling and microbial colony formation (see for example, U.S. Pat. No. Application Publication 2010/0226943A1 and U.S. Pat. No. 7,650,848 B2 and U.S. Pat. No. 7,143,709 B2 of Brennan et al.). Certain specifically designed surface patterns can be embossed or imprinted using a layer of a specific polymer. For example, some described patterns have minimum feature dimensions of about 2 μm and are designated as the "Sharklet™ AF" pattern that has been shown to have best overall performance compared to simpler patterns with similar dimensions. The polymers used in such patterns are polydimethylsiloxane (PDMS) type polymers, although acrylic polymer hydrogels have also been demonstrated (see Magin et al., *Biomacromolecules* 2011, 12, 915-922).

The reducible copper ion or copper nanoparticle containing photopatternable polymeric complexes used in this invention provide the opportunity to combine both the inherent antimicrobial activity of copper with the advantages of the noted essential polymer features so that pattern formation is also enhanced, further improving the inhibition of microbial colonization and growth. In addition, the UV radiation patternability and water-solubility of the noted reducible copper ion or copper nanoparticle containing polymer complexes facilitate patterning in a roll-to-roll manufacturing system using simple water-bath processing.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described and the discussion of any particular embodiment.

Definitions

As used herein to define various components of the copper precursor compositions, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the term "weight %" refers to the amount of a component or material based on the total solids of a composition, formulation, or layer. Unless otherwise indicated, the percentages can be the same for either a dry layer or pattern, or for the total solids of the formulation or composition.

The term "homopolymer" is meant to refer to polymeric materials that have the same repeating or recurring unit along a polymer backbone. The term "copolymer" refers to polymeric materials composed of two or more different repeating or recurring units that are arranged in any order (randomly or otherwise) along the reactive polymer backbone.

For the reactive polymers used in the present invention, the recurring units can be arranged randomly along the reactive polymer backbone, or there can be blocks of recurring units that occur naturally during the polymerization process.

Recurring units in the reactive polymers described herein can be generally derived from the corresponding ethylenically unsaturated polymerizable monomers used in a polymerization process, which ethylenically unsaturated polymerizable monomers have the desired functional and pendant groups. Alternatively, desired pendant groups can be incorporated within recurring units after polymerization of ethylenically unsaturated polymerizable monomers by reaction with requisite precursor pendant groups.

The term "polymerization" is used herein to mean the combining, for example by covalent bonding, of a large number of smaller molecules, such as monomers, to form very large molecules, that is, macromolecules or polymers. The monomers can be combined to form only linear macromolecules or they can be combined to form three-dimensional macromolecules that are commonly referred to as crosslinked polymers. One type of polymerization that can be carried out in the practice of this invention is free radical polymerization when free radically ethylenically unsaturated polymerizable monomers and suitable free radical generating initiators are present.

The term "reactive polymer" is used herein to refer to the copolymers described below that have the essential components and properties described and can be used in the compositions, articles, and methods of the present invention, and which copolymers are sensitive to ultraviolet radiation so that crosslinking occurs using the pendant groups noted below.

In reference to reactive polymers described herein, the term "water-soluble" is used to mean that the minimum solubility in water of a given reactive polymer is at least 1 weight % at 25° C. Some reactive polymers can be less water-solubility but still water-dispersible. The term "water-insoluble" is used to mean that a reactive polymer solubility is less than 1 weight % at 25° C.

The term "crosslinked reacted polymer" is used herein to refer to the crosslinked form of the corresponding reactive polymer.

The term "aqueous-based" refers to solutions, baths, or dispersions in which the predominant solvent, or at least 50 weight % of the solvents, is water.

Unless otherwise indicated, the term "mol %" when used in reference to recurring units in reactive polymers, refers to either the nominal (theoretical) amount of a recurring unit based on the molecular weight of ethylenically unsaturated polymerizable monomer used in the polymerization process, or to the actual amount of recurring unit in the resulting reactive polymer as determined using suitable analytical techniques and equipment.

Unless otherwise indicated, the term "group" particularly when used to define a substituent of a defined moiety, can itself be substituted or unsubstituted (for example and alkyl group" refers to a substituted or unsubstituted alkyl). Generally, unless otherwise specifically stated, substituents on any "groups" referenced herein or where something is stated to be possibly substituted, include the possibility of any groups, whether substituted or unsubstituted, which do not destroy properties necessary for the utility of the component or aqueous metal catalytic composition. It will also be understood for this application that reference to a compound of a particular general structure includes those compounds of other more specific formula that fall within the general structural definition. Examples of substituents on any of the mentioned groups can include known substituents such as: halogen (for example, chloro, fluoro, bromo, and iodo); nitro; cyano; amine; alkoxy particularly those with 1 to 12 carbon atoms (for example, methoxy and ethoxy); substituted or unsubstituted alkyl groups, particularly lower alkyl groups (for example, methyl and trifluoromethyl); alkenyl or thioalkyl (for example, methylthio and ethylthio), particularly either of those with 1 to 12 carbon atoms; substituted and unsubstituted aryl, particularly those having from 6 to 20 carbon atoms in the aromatic ring (for example, phenyl); and substituted or unsubstituted heteroaryl, particularly those having a 5- or 6-membered ring containing 1 to 3 heteroatoms selected from N, O, S or Se (for example, pyridyl, thienyl, furyl, pyrrolyl, and their corresponding benzo and naptho analogs); and other substituents that would be readily apparent in the art. Alkyl substituents particularly contain 1 to 12 carbon atoms and specifically include "lower alkyl" that is having from 1 to 6 carbon atoms, for example, methyl, ethyl, and t-butyl. Further, with regard to any alkyl group, alkylene group or alkenyl group, it will be understood that these can be branched or unbranched and include ring (cyclic) structures.

The term "UV radiation" is used herein to refer to electromagnetic radiation having a wavelength ($\lambda_{max}$) of at least 150 nm and up to and including 450 nm.

As used herein, all molecular weights are weight average molecular weights ($M_w$) that can be determined using known procedures and equipment if the values are not already known from the literature. For example, $M_w$ can be determined using Size Exclusion Chromatography (SEC) and values are reported herein as poly(methyl methacrylate) equivalent weights.

In defining various dimensions of features and nanoparticles, each dimension "average" is determined from at least 2 measurements of the specific dimension using appropriate measurement techniques and equipment that would be known to one skilled in the art. For example, the average dry thickness of layers described herein can be determined from the average of at least 2 separate measurements taken of a dry layer, for example, using electron microscopy.

Similarly, the average dry thickness or width of lines, grid lines, or other pattern features described herein can be the average of at least 2 separate measurements taken, for example, using electron microscopy. The "average diameter" of copper nanoparticles can be determined by at least two measurements using light scattering or electron microscopy such as transmission electron microscopy (TEM).

The term "aspect ratio" is used to define the morphology of particles including the copper nanoparticles described herein. The term has the well understood meaning of the ratio of the largest dimension to the smallest dimension of an anisotropic particle such as a platelet or rod. In some embodiments of the present invention, the copper nanoparticles in copper-containing compositions (B) and (D) described below is less than 2, or even less than 1.5 and such particles are generally considered to be low aspect ratio or near-spherical in morphology.

In many embodiments of substrates and articles described herein, the transparent substrate and all accompanying layers or features on one or both supporting sides, are considered transparent meaning that its integrated transmittance over the noted visible region of the electromagnetic spectrum (for example from 410 nm to 700 nm) is 70% or more, or more likely at least 80% or even 90% or more, as measured for example using a spectrophotometer and known techniques.

Unless otherwise indicated herein, the term "metallic" refers to materials that are single pure metals, metal alloys, metallic oxides, metallic sulfides, and materials containing metallic particles such as micro-particles, nanoparticles, or grains.

The term "reducible copper ions" generally refers to either copper(I) ions, copper(II) ions, or a mixture of both copper(I) and copper(II) ions.

The term "copper nanoparticles" is generally meant to refer to nanoparticles of copper(0) metal (that is, reduced copper ions), but as one skilled in the art would understand, copper metal can oxidize in air to form one or more copper oxides (that is, cuprous oxide, cupric oxide, or a mixture thereof), and the term "copper nanoparticles" is intended herein to include nanoparticles of any of these copper oxides.

Uses

The articles and methods described or claimed herein include the use of reactive polymers that can be used to form water-soluble complexes containing either reducible copper ions or copper nanoparticles. The resulting water-soluble complexes have a variety of applications. For example, the present invention can be used to provide copper-containing articles that can be used for anti-fouling or antimicrobial purposes in aquatic or marine environments, or in clothing or medical devices.

Reactive Polymers

In general, the reactive polymers useful in the practice of this invention have two essential features. They comprise pendant groups that are capable of crosslinking via [2+2] photocycloaddition (defined below) upon exposure to suitable radiation. In addition, the reactive polymers also comprise sulfonate or sulfonic acid groups that provide sufficient water-solubility or water-dispersibility as well as copper complexation properties. While the reactive polymers can be supplied as aqueous-based compositions, they are best used when complexed with either reducible copper ions or copper nanoparticles as described below on a substrate that can have a large or small surface, including the outer surfaces of inorganic or organic particles and then dried. Thus, the reactive polymers are reducible copper ion or copper metal complexing (as described below), water-soluble, and photocrosslinkable.

The reactive polymers can be either condensation or vinyl polymers as long as the requisite pendant crosslinkable and water-solubilizing sulfonate or sulfonic acid groups are connected to and arranged along the reactive polymer backbone. In most embodiments, the useful reactive polymers are vinyl polymers derived from appropriately selected ethylenically unsaturated polymerizable monomers using known free radical solution polymerization techniques and conditions, initiators, surfactants, catalysts, and solvents, all of which would be readily apparent to one skilled in the art from the teaching provided herein.

(a) Recurring Units Having Sulfonate or Sulfonic Acid Groups:

The reactive polymers used in the present invention comprise recurring units comprising sulfonic acid or sulfonate groups, or mixtures of both sulfonic acid and sulfonate groups. Such recurring units can be provided by polymerization of suitable ethylenically unsaturated polymerizable monomers containing such water-solubilizing groups such as vinyl sulfonic acid, styrene sulfonic acid, 2-acrylamido-2-methyl-1-propane sulfonic acid, 2-sulfoethyl methacrylate, 3-sulfopropyl methacrylate, styrene sulfonates, and 3-sulfopropyl acrylate. Partially or fully neutralized counterparts of such monomers are also often readily available and useful for certain polymer synthetic conditions.

Alternatively, such recurring units can be provided by polymerizing certain precursor ethylenically unsaturated polymerizable monomers that comprise pendant precursor groups that can in turn be reacted to provide the desired pendant sulfonic acid or sulfonate groups. For example, such monomers include but are not limited to, hydroxy- or amine-bearing monomers such as 2-hydroxyethyl acrylate, 2-hydroxyethyl methacrylate, 2-aminoethyl methacrylate, or 2-aminoethyl acrylate that can be reacted using a variety of sulfonating agents to provide the desired pendant sulfonic acid or sulfonate groups.

The recurring units described above having the sulfonic acid or sulfonate groups are present in the reactive polymers in an amount of at least 1 mol %, or more likely at least 5 mol % and up to and including 80 mol % or up to and including 95 mol %, all amounts based on the total recurring units in the reactive polymer.

Crosslinkable (b) Recurring Units:

The reactive polymers used in the present invention also comprise recurring units comprising a pendant group capable of crosslinking via [2+2] photocycloaddition when appropriately exposed to suitable radiation. While not limited to the following examples, such photosensitive crosslinkable groups can be chosen from one or more of the following classes of photosensitive crosslinkable groups, all of which can be connected to a recurring unit backbone that is derived from suitable ethylenically unsaturated polymerizable monomers:

(i) a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;

(ii) a photosensitive, non-aromatic unsaturated carbocyclic group;

(iii) a photosensitive, aromatic or non-aromatic heterocyclic group comprising a carbon-carbon double bond that is conjugated with an electron withdrawing group;

(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom, or (v) a photosensitive substituted or unsubstituted 1,2-diarylethylene group.

Multiple photosensitive crosslinkable groups can be present from the same or multiple different classes of the crosslinkable groups (i) through (v).

Upon exposure to suitable radiation having a $\lambda_{max}$ of at least 150 nm and up to and including 700 nm, or more likely exposure to radiation having a $\lambda_{max}$ of at least 150 nm and up to and including 450 nm, the noted photosensitive crosslinkable groups are electronically excited such that they can react with other pendant groups in the reactive polymer to form crosslinks for example as the product of photocycloaddition reactions.

The reactive polymers particularly become crosslinked among adjacent or proximate (molecularly near enough for [2+2] photocycloaddition crosslinking) crosslinkable groups during or after the noted irradiation. Thus, essential crosslinking can be accomplished using the reactive polymer without additional crosslinking agents. However, if desired, crosslinking can be further provided using distinct compounds that are dispersed as crosslinking agents within the compositions or layers comprising one or more reactive polymers. Such crosslinking agents react at either the crosslinkable groups or other pendant groups such as carboxylic acid groups, depending upon the chemical structure of crosslinking agent. For the pendant crosslinkable groups described herein, crosslinking is achieved by having at least two of such crosslinkable groups in proximity that can react with one another.

The crosslinkable [2+2] cyclophotoaddition groups incorporated into the reactive polymers can absorb photoexposing radiation as described above to form an electronically excited state that can undergo pericyclic ring formation to form stable covalent crosslinks. These crosslinks between the polymer chains cause the reactive polymer to become water-insoluble, although the water-insoluble reacted polymer can still absorb and transport water, ions, or other small molecules. The photoexposing radiation can be followed by additional curing or heating procedures (described below) to allow the excited [2+2] photocycloaddition groups to properly align with non-excited [2+2] photocycloaddition groups to form additional crosslinks. Curing can be shortened with higher temperatures.

The crosslinked, water-insoluble complex containing the crosslinked, water-insoluble reacted polymer can be crosslinked at a level that imparts water-insolubility and adhesion to a substrate, but still allows rapid diffusion of water, metal ions, and other small molecules. This type of water-compatible composition is sometimes referred to as a hydrogel. The diffusivity of the complex of crosslinked reacted polymer containing either reducible copper ions or copper nanoparticles can be controlled by the designing the level of crosslinking and the addition of hydrophobic recurring units such as the (c) and (d) recurring units described below.

The recurring units comprising the noted photosensitive crosslinkable groups can be present in the reactive polymers in an amount of at least 5 mol % or typically at least 5 mol % and up to and including 50 mol %, or even at least 10 mol % and up to and including 30 mol %, all amounts based on the total recurring units in the reactive polymer.

In the (i) class of pendant photosensitive, crosslinkable groups that can be present in recurring units arranged along the reactive polymer backbone can comprise —C(=O)—CR=CR$^1$—Y groups wherein R, R$^1$, and Y are defined as follows.

Specifically, R and R$^1$ can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and R$^1$ can also be nitro, cyano, or halogen groups.

More particularly, R and R$^1$ can be independently hydrogen or substituted or unsubstituted methyl, ethyl or phenyl groups, especially when Y is a substituted or unsubstituted phenyl group as described below.

Y can be a substituted or unsubstituted carbocyclic aryl group, or a substituted or unsubstituted heteroaryl group having one or more heteroatoms (oxygen, sulfur, or nitrogen) and sufficient carbon atoms to complete an aromatic heterocyclic ring. Such aromatic rings can have one or more substituents that do not adversely affect the desired behavior in the crosslinking reactions induced by the irradiation described herein.

Useful Y groups can be either heterocyclic or carbocyclic rings having desired aromaticity and any of these rings can be substituted with one or more substituents that do not adversely affect the function of the reactive polymer. Representative aromatic Y groups include but are not limited to, substituted or unsubstituted phenyl, naphthyl, anthracyl, 4-nitrophenyl, 2,4-dichlorophenyl, 4-ethylphenyl, tolyl, 4-dodecylphenyl, 2-nitro-3-chlorophenyl, 4-methoxyphenyl, 2-furyl, 2-thienyl, 3-indolyl, and 3-pyridyl rings. The substituted or unsubstituted phenyl rings are particularly useful including but not limited to phenyl, tolyl, xylyl, 4-methoxyphenyl, hydroxyphenyl, and chlorophenyl groups. Substituted or unsubstituted phenyl or 3-pyridyl groups are particularly useful Y groups.

The pendant groups comprising the crosslinkable and photosensitive —C(=O)—CR$^1$=Y groups are therefore connected to the reactive polymer backbone by means of a single connecting bond or a linking group (R$^2$) as described below.

In particular, the essential recurring units comprising the noted crosslinkable groups can be derived from any ethylenically unsaturated polymerizable monomer having appropriate pendant groups comprising one or more crosslinkable —C(=O)—CR=CR$^1$—Y groups wherein R, R$^1$, and Y are as defined above.

More particularly, such recurring units can be further defined in reference to the following Structure (-A$_i$-) comprising crosslinkable groups:

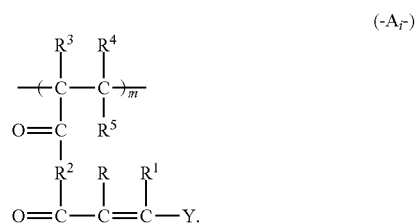

In Structure (-A$_i$-), R, R$^1$, and Y are as defined above. R$^2$ can be a divalent linking group including but are not limited to, substituted or unsubstituted alkylene (including haloalkylenes and cyanoalkylenes), alkyleneoxy, alkoxyalkylene, iminoalkylene, cycloalkylene, aralkylene, cycloalkylene-alkylene, and aryloxyalkylene groups wherein the divalent hydrocarbon groups can comprise 1 to 20 carbon atoms (in either linear, branched, or cyclic form). A skilled worker in polymer chemistry would be able to design other useful linking groups using suitable number of carbon and hetero (oxygen, nitrogen, or sulfur) atoms in an order and arrangement that are chemically possible. Particularly useful R$^2$ divalent groups are substituted or unsubstituted alkylene groups such as substituted or unsubstituted ethylene or propylenes.

R$^3$, R$^4$, and R$^5$ can be independently hydrogen, a halogen, a substituted or unsubstituted alkyl group having 1 to 6 carbon atoms, a substituted or unsubstituted cyclohexyl group, or a substituted or unsubstituted phenyl group. In particular, R$^3$, R$^4$, and R$^5$ can be independently hydrogen, chloro, methyl, or ethyl groups.

Some particularly useful ethylenically unsaturated polymerizable monomers from which -A$_i$- recurring units can be derived include:

2-cinnamoyl-ethyl methacrylate,
2-cinnamoyl-ethyl acrylate, and
2-[3-(3-pyridyl)acryloyl]ethyl methacrylate.

The -A$_1$- recurring units can also be formed after formation of a water-soluble precursor reactive polymer having precursor -A$_i$- recurring units. For example, a water-soluble precursor reactive polymer can be prepared with recurring units derived from vinyl alcohols or acrylate monomers having pendant hydroxyl groups, and the pendant hydroxyl groups can be reacted with cinnamoyl chloride (or similar substituted cinnamoyl-like chloride reactants) to form the desired -A$_i$- (or similar) recurring units with pendant water-solubilizing sulfonic acid or sulfonate groups already present before the reaction to form the -A$_i$- recurring units.

(ii) Another class of useful photosensitive crosslinkable groups arranged along the reactive polymer backbone can comprise pendant photosensitive (crosslinkable), non-aromatic unsaturated carbocyclic groups including but not limited to, cyclopropene groups, cyclobutene groups, cyclopentadiene groups, cyclohexene groups, cyclohexadiene groups, cycloheptene groups, cycloheptadiene groups, cycloheptatriene groups, cyclooctene groups, indene groups, dihydronaphthalene groups, and norbornene groups. Any of these photosensitive groups can be substituted with one or more substituents that will not interfere with the desired properties of the reactive polymer. Where appropriate, such non-aromatic unsaturated carbocyclic groups can also contain one or more carbon-containing fused rings. The cyclopropene groups including the unsaturated cyclopropene groups can be particularly useful.

In general, such useful recurring units can be represented by the following Structure ($-A_{ii}-$):

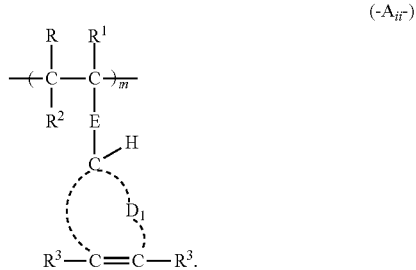

Specifically, R, $R^1$, and $R^2$ in Structure ($-A_{ii}-$) can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and $R^1$ can also be nitro, cyano, or halogen groups.

More particularly, R, $R^1$, and $R^2$ in Structure ($-A_{ii}-$) can be independently hydrogen or substituted or unsubstituted methyl, ethyl or phenyl groups, and more particularly, each of these groups is hydrogen or methyl.

E can be a divalent linking group including but not limited to, substituted or unsubstituted alkylene (including haloalkylenes and cyanoalkylenes), alkyleneoxy, alkoxyalkylene, iminoalkylene, cycloalkylene, aralkylene, cycloalkylenealkylene, aryloxyalkylene groups wherein the divalent hydrocarbon groups can comprise 1 to 20 carbon atoms (in either linear, branched, or cyclic form), carbonyloxy, oxycarbonyl, amido, keto, carbonate, carbamate, and urea. A skilled worker in polymer chemistry would be able to design other useful linking groups using suitable number of carbon and hetero (oxygen, nitrogen, or sulfur) atoms in an order and arrangement that are chemically possible. Particularly useful E divalent groups are substituted or unsubstituted alkylene groups such as substituted or unsubstituted ethylene or propylenes, or oxycarbonyl.

In Structure ($-A_{ii}-$), $D_1$ can represent the carbon atoms necessary to complete a three-membered to seven-membered non-aromatic unsaturated carbocyclic group (or ring), or particularly the carbon atoms necessary to complete a non-aromatic, unsaturated 3-membered to 7-membered carbocyclic group (or ring) such as a cyclopropene ring, a cyclobutene ring, a cyclopentene ring, a cyclohexene ring, or a cycloheptene ring. $D_1$ can also represent the saturated or unsaturated carbon atoms to provide an indene or dihydronaphthalene group, or polycyclic rings such as a norbornene group.

Moreover, in Structure ($-A_{ii}-$), $R^3$ can be hydrogen, a substituted or unsubstituted alkyl group having 1 to 12 carbon atoms (such as methyl, ethyl, isopropyl, amyl, hexyl, nonyl, decyl, and dodecyl), or a substituted or unsubstituted aryl group having 6 or 10 carbon atoms in the ring. Such groups can be substituted with one or more hydroxy, halogen, carbonyl, cyano, alkyl, or alkoxy groups.

In Structure ($-A_{ii}-$), m can represent the molar amounts of the recurring units that would satisfy the amounts described above for the water-soluble polymer.

Some particularly useful recurring units of this type represented by the following Structure ($-A_{ii2}-$) or ($-A_{ii3}-$):

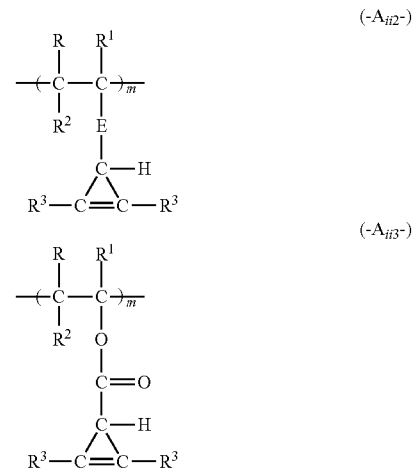

wherein R, $R^1$, $R^2$, $R^3$, and E are as defined above for Structure ($-A_i-$).

Some useful recurring units of this type can be derived from:

2-cyclopropene-1-carboxylic acid, 2,3-diphenyl-, 2-[(2-methyl-1-oxo-2-propen-1-yl)oxy]ethyl ester;

2-cyclopropene-1-carboxylic acid, 2,3-diphenyl-, 2-[(2-methyl-1-oxo-2-propen-1-yl)amino]ethyl ester;

4-(2,3-diphenyl-2-cyclopropene-1-carbonyloxy) styrene;

4-(2,3-diphenyl-2-cyclopropene-1-carbonylamino) styrene; and 4-(2,3-diphenyl-2-cyclopropene-1-carbonyloxy)ethane.

These recurring units can be derived from suitable ethylenically unsaturated polymerizable monomers that can then be polymerized under suitable conditions to provide useful reactive polymers.

Yet another class (iii) of photosensitive crosslinking groups in the reactive polymers comprise pendant photosensitive (crosslinkable), aromatic or non-aromatic heterocyclic groups, each of which comprises a carbon-carbon double bond ($>C=C<$) that is conjugated with one or more electron withdrawing groups. In many embodiments, the carbon-carbon double bond is conjugated with one or two of the same or different electron withdrawing groups, and in most embodiments, the carbon-carbon double bond is conjugated with only one electron withdrawing group.

It is to be understood that the pendant photosensitive, aromatic or non-aromatic heterocyclic groups can be single ring groups formed of carbon and hetero atoms (such as nitrogen, sulfur, and oxygen), or they can be fused ring groups with two or more fused rings formed from carbon and suitable heteroatoms.

Useful electron withdrawing groups that can be conjugated with the carbon-carbon double bond would be readily apparent to one skilled in the art as the term "electron withdrawing" in reference to a chemical group is well known in the art. However, it is particularly useful when such electron withdrawing groups include but are not limited to, carbonyl, ester, thioester, amide, imine, amidine, ether, thioether, and amine groups (or moieties). More generally, the photosensitive (crosslinkable) non-aromatic heterocyclic group can be a cyclic group that comprises an α,β-unsaturated ketone, α,β-unsaturated lactone, α,β-unsaturated lactam, α,β-unsaturated ether, α,β-unsaturated thioether, or α,β-unsaturated amine group. Of these types of photosensitive (crosslinkable) aromatic or non-aromatic heterocyclic groups, those containing a carbonyl group are particularly useful.

For example, the reactive polymers can comprise pendant photosensitive, aromatic or non-aromatic heterocyclic groups selected from the group consisting of coumarin, thiocoumarin, quinone, benzoquinone, naphthoquinone, pyran, thiopyran, benzopyran, benzothiopyran, pyranone, thiopyranone, pyridinone, quinoline, and quinolinone groups. Of these photosensitive aromatic or non-aromatic heterocyclic groups, pendant photosensitive coumarin or quinolinone groups are useful and the pendant photosensitive coumarin groups are most useful because they can be readily prepared.

Any of the photosensitive aromatic or non-aromatic heterocyclic groups can be substituted with one or more substituents that will not interfere with the desired properties of the reactive polymer.

In general, useful recurring units can be represented by the following Structure ($-A_{iii}-$):

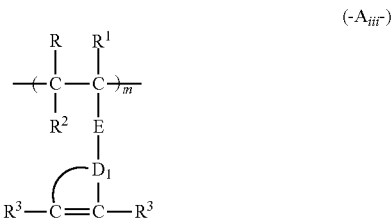

($-A_{iii}-$)

Specifically, in Structure ($-A_{iii}-$), R, $R^1$, and $R^2$ can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R and $R^1$ can also be nitro, cyano, or halogen groups.

More particularly, R, $R_1$, and $R^2$ can be independently hydrogen or substituted or unsubstituted methyl, ethyl or phenyl groups, and more particularly, each of these groups can be hydrogen or methyl.

In Structure ($-A_{iii}-$), E can be a single bond or divalent linking group that can be connected to a carbon atom within $D_1$. Thus, while E appears to be connected directly to $D_1$, E can be connected to any carbon represented by $D_1$. For example, E can be a divalent linking group including but not limited to, substituted or unsubstituted alkylene (including haloalkylenes and cyanoalkylenes), alkyleneoxy, alkoxyalkylene, iminoalkylene, cycloalkylene, aralkylene, cycloalkylene-alkylene, aryloxyalkylene groups wherein the divalent hydrocarbon groups can comprise 1 to 20 carbon atoms (in either linear, branched, or cyclic form), carbonyloxy, oxycarbonyl, amido, keto, carbonate, carbamate, and urea. A skilled worker in polymer chemistry would be able to design other useful linking groups using suitable number of carbon and hetero (oxygen, nitrogen, or sulfur) atoms in an order and arrangement that are chemically possible. Particularly useful E divalent groups are substituted or unsubstituted alkylene groups such as substituted or unsubstituted ethylene or propylenes or oxycarbonyl.

In Structure ($-A_{iii}-$), $D_1$ represents the carbon and hetero (sulfur, oxygen, or nitrogen particularly) atoms necessary to complete a three-membered to fourteen-membered aromatic or non-aromatic heterocyclic group (or ring) that includes the carbon-carbon double bond shown in Structure ($-A_{iii}-$). However, it is essential that either $D_1$ or at least one of the $R^3$ groups (defined below) comprises at least one (and optionally more) electron withdrawing groups that are conjugated with the carbon-carbon double bond shown in Structure ($-A_{iii}-$).

$D_1$ can also represent the saturated or unsaturated carbon or hetero atoms to provide one or more fused rings such as naphthoquinone, benzopyran, benzothiopyran, benzopyran-2-one (coumarin), quinoline, and quinolinone polyrings. Other useful $D_1$ ring systems optionally comprising at least one electron withdrawing group that is conjugated with the carbon-carbon double bond would be readily apparent to one skilled in the art.

Moreover, in Structure ($-A_{iii}-$), $R^3$ is hydrogen, a substituted or unsubstituted alkyl group having 1 to 12 carbon atoms (such as methyl, ethyl, isopropyl, amyl, hexyl, nonyl, decyl, and dodecyl), a substituted or unsubstituted aryl group having 6 or 10 carbon atoms in the ring, a substituted or unsubstituted alkoxy group having 1 to 12 carbon atoms (such as methoxy, 2-ethoxy, t-butoxy, and n-hexoxy), substituted or unsubstituted aryloxy group having 6 or 10 carbon atoms in the ring (such as phenoxy and naphthoxy), cyano, halo, or carbonyl-containing group. Such carbonyl-containing groups include but are not limited to, aldehyde, ketone, carboxylic acid, ester, and amide groups. Such carbonyl-containing groups can be conjugated with the carbon-carbon double bond in Structure ($-A_{iii}-$).

In Structure ($-A_{iii}-$), m can represent the molar amounts of the noted recurring units as described above for the reactive polymers.

Some useful recurring units of this type can be derived from:
7-(2-methacryloyloxyethoxy)-4-methylcoumarin,
7-(2-methacryloyloxyethoxy)-coumarin, 7-(3-methacryloyloxysulfopropyl)-4-methylcoumarin,
7-(methacryloyloxy)-4-methylcoumarin,
6-(methacryloyloxy)-4-methylcoumarin,
6-(2-methacryloyloxyethoxy)-4-methylcoumarin,
7-(2-methacryloyloxyethoxy)-quinoline-2-one,
7-(2-methacryloyloxyethoxy)-4-methylquinoline-2-one, and
5-(2-methacryloyloxyethoxy)-naphthoquinone.

The useful recurring units can be derived from suitable ethylenically unsaturated polymerizable monomers that can then be polymerized under suitable conditions to provide useful reactive polymers.

Yet another class (iv) comprises pendant photosensitive (crosslinkable), non-aromatic unsaturated heterocyclic groups, each of which non-aromatic unsaturated heterocyclic groups can comprise one or more amide groups [>N—C(=O)—], and each of the amide groups is arranged in the heterocyclic group (ring) in conjugation with a carbon-carbon double bond (>C=C<). In many embodiments, such heterocyclic groups have only one or two amide groups and the carbon-carbon double bond is conjugated with the one or two amide groups arranged within the non-aromatic unsaturated heterocyclic group (ring). In most embodiments, the carbon-carbon double bond is conjugated with the only one amide group in the non-aromatic unsaturated heterocyclic group (ring).

It is to be understood that the pendant photosensitive, non-aromatic unsaturated heterocyclic groups can be single ring groups formed of carbon and hetero atoms (such as nitrogen, sulfur, and oxygen), or they can be fused ring groups with two or more fused rings formed from carbon and suitable heteroatoms. In most embodiments, the photosensitive, non-aromatic unsaturated heterocyclic groups are single ring groups having 5 to 7 carbon and heteroatoms (usually nitrogen atoms) forming the ring. At least one, and likely two of the carbon atoms in the rings also form carbonyl (>C=O) groups.

Particularly useful reactive polymers can comprise pendant photosensitive, non-aromatic unsaturated heterocyclic groups selected from the group consisting of substituted or unsubstituted maleimide and thymine groups. Of these photosensitive non-aromatic unsaturated heterocyclic groups, the substituted maleimide groups are most useful because they can be readily prepared.

Any of the photosensitive non-aromatic unsaturated heterocyclic groups can be substituted with one or more substituents that will not interfere with the desired properties of the reactive polymer and the reactions necessary for crosslinking.

In general, useful recurring units can be represented by the following Structure (-$A_{iv}$-):

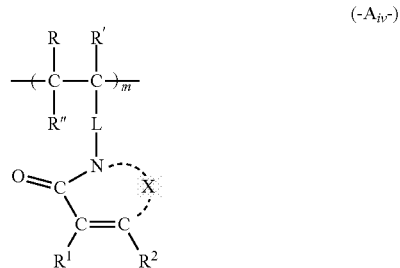

(-$A_{iv}$-)

In Structure (-$A_{iv}$-), R, R', and R" can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R, R', and R" can also be nitro, cyano, or halogen groups.

More particularly, R, R', and R" can be independently hydrogen or substituted or unsubstituted methyl, ethyl or phenyl groups, and more particularly, each of these groups can be hydrogen or methyl.

In Structure (-$A_{iv}$-), L can be a single bond or divalent linking group that can be connected to a nitrogen atom (as shown) within the photosensitive non-aromatic unsaturated heterocyclic group. For example, L can be a divalent hydrocarbon or aliphatic linking group that generally include 1 to 10 carbon, nitrogen, or oxygen atoms in the chain and can include but not limited to, substituted or unsubstituted alkylene (including haloalkylenes and cyanoalkylenes); alkyleneoxy; alkoxyalkylene; iminoalkylene; cycloalkylene; aralkylene; cycloalkylene-alkylene; or aryloxyalkylene groups wherein the divalent hydrocarbon groups can comprise 1 to 20 carbon atoms (in either linear, branched, or cyclic form) and can be connected or interrupted with heteroatom-containing groups such as oxy, carbonyl, carbonyloxy, oxycarbonyl, amino, amido, carbonate, carbamate, and urea, or any combination thereof. A skilled worker in polymer chemistry would be able to design other useful linking groups using suitable number of carbon and hetero (oxygen, nitrogen, or sulfur) atoms in an order and arrangement that are chemically possible. Particularly useful L divalent groups are substituted or unsubstituted alkylene groups such as substituted or unsubstituted methylene, ethylene, or a propylene (any isomer), or such groups can be used in combination with an oxycarbonyl (such as from an acrylic acid ester group).

In Structure (-$A_{iv}$-), X represents the 1 to 3 carbon and heteroatoms (usually nitrogen atoms), which in combination with the remaining shown nitrogen and carbon atoms, complete a five- to seven-membered photosensitive non-aromatic unsaturated heterocyclic ring. In most embodiments, X represents at least one carbon atom (for example, a carbonyl carbon atom), or at least one carbon atom (for example, a carbonyl carbon atom) and at least one nitrogen atom such that the resulting amide group is conjugated with the shown carbon-carbon double bond.

In Structure (-$A_{iv}$-), $R^1$ and $R^2$ are independently hydrogen or a substituted or unsubstituted alkyl group having 1 to 10 carbon atoms (such as substituted or unsubstituted methyl, ethyl, isopropyl, amyl, hexyl, nonyl, and decyl groups), or a substituted or unsubstituted cycloalkyl group having 5 or 6 carbon atoms in the unsaturated carbocyclic ring (such as substituted cyclohexyl groups). $R^1$ and $R^2$ are likely to be the same group such as hydrogen, or unsubstituted methyl or unsubstituted ethyl groups.

Some particular useful representations of such recurring units are shown in the following Structures (-$A_{iv1}$-), (-$A_{iv2}$-), and (-$A_{iv3}$-)

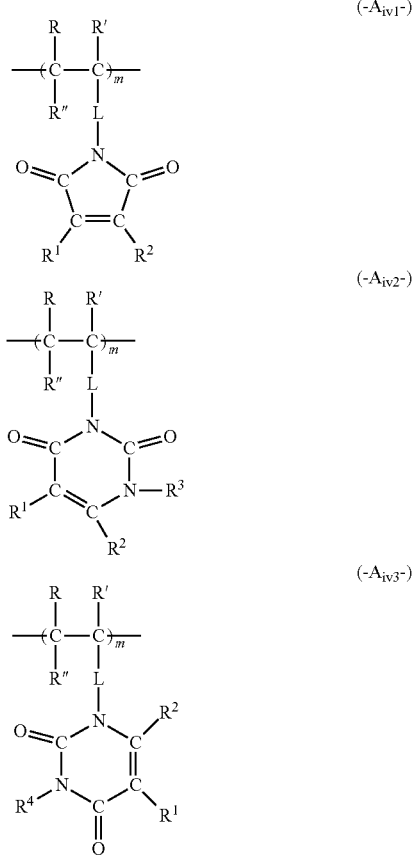

wherein R, R', R", L, $R^1$, and $R^2$ are as defined above in Structure (-$A_{iv}$-) and m is defined below.

Moreover, in Structures (-$A_{iv2}$-) and (-$A_{iv3}$-), $R^3$ and $R^4$ are independently hydrogen, or substituted or unsubstituted alkyl groups or substituted or substituted cycloalkyl groups for example as used to define $R^1$ and $R^2$ shown above.

It should be understood that a reactive polymer used in this invention can comprise a variety of different photosensitive non-aromatic unsaturated heterocyclic groups in recurring units. For example, the reactive polymer can have recurring units represented by both Structures (-$A_{iv1}$-) and either (-$A_{iv2}$-) or (-$A_{iv3}$-). Alternatively, the reactive polymer can have recurring units represented by both Structures (-$A_{iv2}$-) and (-$A_{iv3}$-). Still again, the reactive polymer can have recurring units represented by all of Structure (-$A_{iv1}$-), (-$A_{iv2}$-), and (-$A_{iv3}$-).

Some useful recurring units of this type can be derived from:
N-(2-(methacryloxy)ethyl) dimethylmaleimide;
N-(2-(acryloxy)ethyl) dimethylmaleimide;
N-(2-(acryloxy)-n-butyl) dimethylmaleimide;
N1-(2-(methacryloxy)ethyl)-thymine;
N1-(2-(methacryloxy)-n-butyl)-thymine;
N3-(2-(methacryloxy)ethyl)-thymine;
N3-(2-(methacryloxy)ethyl)-uracil;
N3-(4-(methacryloxy)-n-butyl)-thymine; and
N3-(2-(methacryloxy)ethyl)-6-methylthymine.

Still another class (v) of useful photosensitive and crosslinkable pendant groups comprises photosensitive substituted or unsubstituted 1,2-diarylethylene groups. Such groups can be generally represented as -$Ar_1$-ethylene-$Ar_2$ wherein $Ar_1$ is a divalent, substituted or unsubstituted heterocyclic or carbocyclic aromatic group and $Ar_2$ is a monovalent, substituted or unsubstituted heterocyclic or carbocyclic aromatic group.

For example, some useful reactive polymers comprise pendant groups comprising photosensitive substituted or unsubstituted 1,2-diaryl ethylene groups selected from stilbene, styrylnaphthalene, styrylpyridine, styrylpyridinium, styrylquinoline, styrylquinolinium, styrylthiazole, styrylthiazolium, naphthrylphenyl (naphthylene-ethylene-phenyl), naphthrylpyridinium, naphthylthiazolium, 1-pyridyl-2-thiazolylethylene, and 1,2-pyridiylethylene groups. The pendant groups comprising photosensitive stilbene, styrylpyridinium, styrylquinolinium, or styrylthiazolium groups are particularly useful.

Any of the photosensitive 1,2-diarylethylene groups can be substituted with one or more substituents that will not interfere with the desired properties of the reactive polymer and the reactions necessary for crosslinking.

In general, such useful recurring units can be represented by the following Structure (-$A_v$-) showing both reactive polymer backbone and pendant groups attached thereto:

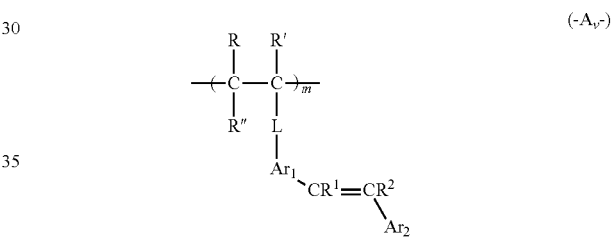

In Structure (-$A_v$-), R, R', and R" can be independently hydrogen or substituted or unsubstituted alkyl groups having at least 1 to 7 carbon atoms (including substituted or unsubstituted methyl, ethyl, isopropyl, t-butyl, hexyl, and benzyl groups, and others that would be readily apparent to one skilled in the art), substituted or unsubstituted cycloalkyl group having 5 or 6 carbon atoms in the ring (such as cyclopentyl, cyclohexyl, 4-methylcyclohexyl, and others that would be readily apparent to one skilled in the art), substituted or unsubstituted phenyl groups (such as phenyl, tolyl, and xylyl groups, and others that would be readily apparent to one skilled in the art), substituted or unsubstituted alkoxy groups having 1 to 7 carbon atoms (such as methoxy, ethoxy, benzoxy, and others readily apparent to one skilled in the art), or substituted or unsubstituted phenoxy groups (such as phenoxy, 2,4-dimethylphenoxy, and others that would be readily apparent to one skilled in the art). In some embodiments, R, R', and R" can also be nitro, cyano, or halogen groups.

More particularly, R, R', and R" can be independently hydrogen or substituted or unsubstituted methyl, ethyl or phenyl groups, and more particularly, each of these groups can be hydrogen or substituted or unsubstituted methyl groups.

In Structure (-$A_v$-), L can be a single bond or divalent linking group that can be connected to a nitrogen atom (as shown) within the photosensitive non-aromatic unsaturated heterocyclic group. For example, L can be a divalent hydrocarbon or aliphatic linking group that generally include 1 to 10 carbon, nitrogen, or oxygen atoms in the chain and can include but not limited to, substituted or unsubstituted alkylene (including haloalkylenes and cyanoalkylenes); alkyleneoxy; alkoxyalkylene; iminoalkylene; cycloalkylene; aralkylene; cycloalkylene-alkylene; or aryloxyalkylene groups wherein the divalent hydrocarbon groups can comprise 1 to 20 carbon atoms (in either linear, branched, or cyclic form) and can be connected or interrupted with heteroatom-containing groups such as oxy, carbonyl, carbonyloxy, oxycarbonyl, amino, amido, carbonate, carbamate, and urea, or any combination thereof. A skilled worker in polymer chemistry would be able to design other useful linking groups using suitable number of carbon and hetero (oxygen, nitrogen, or sulfur) atoms in an order and arrangement that are chemically possible. Particularly useful L divalent groups can be substituted or unsubstituted alkylene groups such as substituted or unsubstituted methylene, ethylene, or a propylene (any isomer), or such groups can be used in combination with an oxycarbonyl (such as from an acrylic acid ester group), and aliphatic groups comprising a carbonyloxy group directly attached to the reactive polymer backbone.

Moreover, in Structure (-$A_v$-), $Ar_1$ is a divalent carbocyclic or heterocyclic aromatic group that can be substituted or unsubstituted. For example, $Ar_1$ can be substituted or unsubstituted phenylene, substituted or unsubstituted naphthylene, substituted or unsubstituted pyridinylene, substituted or unsubstituted quinolinylene, substituted or unsubstituted thiazolylene, substituted or unsubstituted pyridinium, substituted or unsubstituted quinolinium, or substituted or unsubstituted thiazolium. As would be understood by one skilled in the art, some of the useful $Ar_1$ groups can be quaternary aromatic rings wherein a nitrogen atom in the aromatic ring is optionally attached to L or is quaternized in a suitable manner, and suitable counterions can be present such as a trifluoromethylsulfonate counterion. When the $Ar_1$ rings are substituted, the one or more substituents can be any moiety that will not adversely affect the photosensitivity of the pendant group or any other properties intended for the reactive polymer. For example, useful substituents can include but are not limited to methyl groups and ethyl groups. Particularly useful $Ar_1$ groups are substituted or unsubstituted phenylene and pyridinium groups.

$Ar_2$ can be a substituted or unsubstituted carbocyclic or heterocyclic aromatic group as defined for $Ar_1$ except that $Ar_2$ is monovalent as shown in Structure (-$A_v$-). Particularly useful $Ar_2$ groups are substituted or unsubstituted phenyl, substituted or unsubstituted naphthalene, substituted or unsubstituted pyridine, substituted or unsubstituted pyridinium, substituted or unsubstituted quinoline, substituted or unsubstituted quinolinium, substituted or unsubstituted thiazole, and substituted or unsubstituted thiazolium groups, with substituted or unsubstituted phenyl, substituted or unsubstituted pyridinium, substituted or unsubstituted quinolinium groups, and substituted or unsubstituted thiazolium groups being particularly useful. Similarly to $A_1$, some of the $Ar_2$ aromatic rings can be quaternary aromatic rings having a positive nitrogen atom, and a suitable counterion, such as trifluoromethylsulfonate, is then present. A skilled worker in the art would readily know about other suitable counterions.

Moreover, In Structure (-$A_v$-), $R^1$ and $R^2$ are independently hydrogen or substituted or unsubstituted alkyl groups having 1 to 10 carbon atoms (such as substituted or unsubstituted methyl, ethyl, isopropyl, amyl, hexyl, nonyl, and decyl groups), or substituted or unsubstituted cycloalkyl groups having 5 or 6 carbon atoms in the unsaturated carbocyclic ring (such as substituted cyclohexyl groups). $R^1$ and $R^2$ are likely to be the same group such as hydrogen, or unsubstituted methyl or unsubstituted ethyl groups.

In some embodiments, the reactive polymer comprises recurring units represented by the following Structure (-$A_{v1}$-) also showing reactive polymer backbone to which pendant groups are attached:

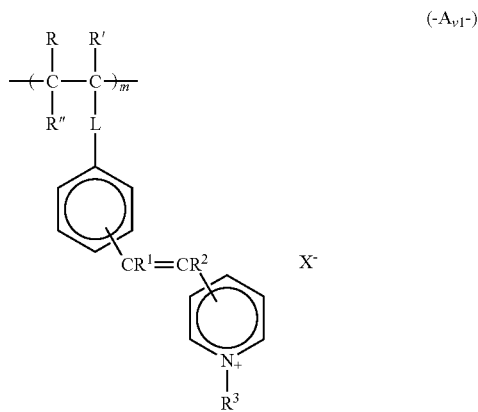

wherein R, R', R" are as defined above and are particularly hydrogen or methyl, L is as described above and particularly comprises a carbonyloxy group directly attached to the backbone, $R^1$ and $R^2$ can be independently hydrogen, methyl, or ethyl, $R^3$ can be a suitable substituted or unsubstituted alkyl, substituted or unsubstituted cycloalkyl, or substituted or unsubstituted aryl group, $X^-$ can be a suitable counterion as described above, and m is as defined below.

In Structures (-$A_v$-) and (-$A_{v1}$-), m can represent the molar amounts of the recurring units as described above for the reactive polymers.

Some useful recurring units of this class can be derived from:

1-methyl-4-[2-(4-(2-methacryloxyethyl)-carbonyloxyphenyl)ethenyl]pyridinium trifluormethylsulfonate;

1-methyl-4-[2-(4-(2-methacryloxyethyl)-carbonyloxyphenyl)ethenyl]quinolinium trifluoromethylsulfonate;

1-methyl-2-[2-(4-(2-methacryloxyethyl)-carbonyloxyphenyl)ethenyl]thiazolium trifluoromethylsulfonate;

4-[2-(4-(2-methacryloxyethyl)-carbonyloxyphenyl)ethenyl]pyridine; and 1-phenyl-2-[(4-(2-methacryloxyethyl)-carbonyloxyphenyl)]ethylene.

Such useful recurring units can be derived from suitable ethylenically unsaturated polymerizable monomers that can then be polymerized under suitable conditions to provide useful reactive polymers. More likely, such monomers are prepared by attaching a 1,2-diarylethylene group to a polymerizable acrylic group through a linking group by formation of an ester, amide or ether bond. For example 4-formylbenzoic acid can be easily condensed with 4-methylpyridine to form a styrylpyridine group with a carboxylic acid functionality suitable for attachment to a linking group on an acrylic monomer such as 2-hydroxyethylmethacrylate. The carboxylic acid and the hydroxyethyl groups can then be attached by a variety of ester forming reactions well known in the art including the known Mitsunobu reaction.

Optional (c) and (d) Recurring Units:

The reactive polymers used in the present invention can optionally comprise at least 1 mol % and up to and including 93 mol %, or typically at least 10 mol % and up to and including 70 mol %, of (c) recurring units comprising pendant amide, hydroxyl, lactam, phosphonic acid (or phosphonate), or carboxylic acid (or carboxylate) groups, all based on the total amount of recurring units in the reactive polymer. Recurring units comprising pendant hydroxyl, amide, or carboxylic acid groups are particularly useful. It is also useful to have (c) recurring units that comprise multiple different pendant groups from the noted list of pendant groups.

Useful pendant precursor groups include but are not limited to, anhydrides, alcohols, amines, lactam, lactone, amide, and ester groups that can be used to provide the various groups noted above for the (c) recurring units.

For example, useful (c) recurring units can be represented by the following Structure (—C—):

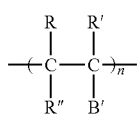

wherein B' represents a pendant amide, hydroxy, lactam, phosphonic acid, or carboxylic acid group or precursor groups that can be appropriately converted, which group can be directly attached to the reactive polymer backbone or it can be attached through a suitable divalent linking group.

For example, some useful ethylenically unsaturated polymerizable monomers from which the (c) recurring units can be derived include but are not limited to, (meth)acrylic acid, itaconic acid, maleic anhydride, fumaric acid, citraconic acid, vinyl benzoic acid, 2-carboxyethyl acrylate, 2-carboxyethyl methacrylate, (meth)acrylamide, N-vinyl pyrrolidone,2-hydroxyethyl methacrylate, 2-aminoethyl methacrylate, vinyl phosphonic acid, N-isopropyl acrylate, and dimethyl acrylamide.

In addition to the (a), (b), and (c) recurring units described above, the reactive polymers can optionally comprise one or more additional recurring units that are different from all (a), (b), and (c) recurring units, and herein identified as optional (d) recurring units, in an amount of less than 50 mol %, based on the total recurring units in the reactive polymer. Alternatively, (d) recurring units can be present with (a) and (b) recurring units but (c) recurring units are absent.

A skilled polymer chemist would understand how to choose such additional (d) recurring units, and for example, they can be derived from one or more ethylenically unsaturated polymerizable monomers selected from the group consisting of alkyl acrylates, alkyl methacrylates, styrene and styrene derivatives, vinyl ethers, vinyl benzoates, vinylidene halides, vinyl halides, vinyl imides, and other materials that a skilled worker in the art would understand could provide desirable properties to the reactive polymer. Such (d) recurring units can be represented by Structure (-D-) as follows:

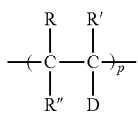

wherein the pendant D groups in Structure (-D-) can be for example, hydrogen, substituted or unsubstituted alkyl groups, substituted or unsubstituted aryl groups, alkyl ester groups, aryl ester groups, halogens, or ether groups.

In addition, some (d) recurring units can comprise an epoxy (such as a glycidyl group) or epithiopropyl group derived for example from glycidyl methacrylate or glycidyl acrylate.

In the recurring units described above, R, R', and R" can be the same or different hydrogen, methyl, ethyl, or chloro groups and each type of recurring unit can have the same or different R, R', and R" groups along the reactive polymer backbone. In most embodiments, R, R', and R" are hydrogen or methyl, and R, R', and R" can be the same or different for the various (a), (b), (c), and (d) recurring units in a given reactive polymer.

In the Structures shown above "m," "n," and "p" are used to represent the respective molar amounts of recurring units, based on the total recurring units in a given reactive polymer, so that the sum of m, n, and p equal 100 mol % in a given reactive polymer.

The mol % amounts of the various recurring units defined herein for the reactive polymers defined herein are meant to refer to the actual molar amounts present in the reactive polymers. It is understood by one skilled in the art that the actual mol % values may differ from those theoretically possible from the amount of ethylenically unsaturated polymerizable monomers that are used in the polymerization reaction solution. However, under most polymerization conditions that allow high polymer yield and optimal reaction of all monomers, the actual mol % of each monomer is generally within ±15 mol % of the theoretical amounts.

Some representative reactive polymer embodiments include but are not limited to, the following copolymers and terpolymers wherein the molar ratios are theoretical (nominal) amounts based on the actual molar ratio of ethylenically unsaturated polymerizable monomers used in the polymerization process. The actual molar amounts of recurring units can differ from the theoretical (nominal) amounts of monomers if the polymerization reactions are not carried out to completion.

Poly(3-sulfopropyl methacrylate potassium salt-co-2-cinnamoyl-ethyl methacrylate) (80:20 mol %);

Poly(3-sulfopropyl methacrylate potassium salt-co-2-cinnamoyl-ethyl methacrylate) (70:30 mol %);

Poly(3-sulfopropyl methacrylate potassium salt-co-2-cinnamoyl-ethyl methacrylate) (50:50 mol %);

Poly(3-sulfopropyl methacrylate potassium salt-co-methacrylic acid-co-2-cinnamoyl-ethyl methacrylate) (50:30:20 mol %);

Poly(3-sulfopropyl methacrylate-co-methacrylic acid-co-2-cinnamoyl-ethyl methacrylate) (30:50:20 mol %);

Poly(3-sulfopropyl methacrylate-co-methacrylic acid-co-2-cinnamoyl-ethyl methacrylate) (10:70:20 mol %);

Poly(3-sulfopropyl methacrylate-co-methacrylic acid-co-2-cinnamoyl-ethyl methacrylate) (5:75:20 mol %);

Poly(3-sulfopropyl methacrylate-co-methacrylic acid-co-2-cinnamoyl-ethyl methacrylate) (5:85:10 mol %);

Poly(3-sulfopropyl methacrylate-co-methacrylic acid-co-2-cinnamoyl-ethyl methacrylate) (5:90:5 mol %);

Poly(3-sulfopropyl methacrylate-co-methacrylic acid-co-2-cinnamoyl-ethyl methacrylate) (2:78:20 mol %);

Poly(3-sulfopropyl methacrylate-co-methyl methacrylate-co-2-cinnamoyl-ethyl methacrylate) (50:30:20 mol %);

Poly(3-sulfopropyl methacrylate-co-butyl metharylate-co-2-cinnamoyl-ethyl methacrylate) (50:30:20 mol %);

Poly(3-sulfopropyl methacrylate-co-styrene-co-2-cinnamoyl-ethyl methacrylate) (70:10:20 mol %);

Poly(3-sulfopropyl methacrylate-co-methacrylic acid-co-butyl methacrylate-co-2-cinnamoyl-ethyl methacrylate) (10:60:10:20 mol %);

Poly(3-sulfopropyl methacrylate-co-methacrylic acid-co-styrene-co-2-cinnamoyl-ethyl methacrylate) (10:65:5:20 mol %);

Poly(3-sulfopropyl methacrylate potassium salt-co-acrylamide-co-2-cinnamoyl-ethyl methacrylate) (50:30:20 mol %);

Poly(3-sulfopropyl methacrylate potassium salt-co-acrylamide-co-2-cinnamoyl-ethyl methacrylate) (10:70:20 mol %);

Poly(3-sulfopropyl methacrylate potassium salt-co-2-hydroxyethyl metacrylate-co-2-cinnamoyl-ethyl methacrylate) (50:30:20 mol %);

Poly(3-sulfopropyl methacrylate potassium salt-co-2-hydroxyethyl metacrylate-co-2-cinnamoyl-ethyl methacrylate) (10:70:20 mol %);

Poly(3-sulfopropyl methacrylate potassium salt-co-maleic anhydryde-co-2-cinnamoyl-ethyl methacrylate) (50:30:20 mol %);

Poly(3-sulfopropyl methacrylate potassium salt-co-maleic anhydryde-co-2-cinnamoyl-ethyl methacrylate) (10:70:20 mol %);

Poly(3-sulfopropyl methacrylate potassium salt-co-N-vinyl-2-pyrrolidone-co-2-cinnamoyl-ethyl methacrylate) (50:30:20 mol %);

Poly(3-sulfopropyl methacrylate potassium salt-co-vinyl phosphonic acid-co-2-cinnamoyl-ethyl methacrylate) (50:30:20 mol %);

Poly(2-acylamide-2-methyl-1-propanesulfonic acid-co-2-cinnamoyl-ethyl methacrylate) (80:20 mol %);

Poly(2-acylamide-2-methyl-1-propanesulfonic acid-co-methacrylic acid-co-2-cinnamoyl-ethyl methacrylate) (50:30:20 mol %);

Poly(2-acylamide-2-methyl-1-propanesulfonic acid-co-methacrylic acid-co-2-cinnamoyl-ethyl methacrylate) (10:70:20 mol %);

Poly(2-acylamide-2-methyl-1-propanesulfonic acid-co-acrylamide-co-2-cinnamoyl-ethyl methacrylate) (50:30:20 mol %);

Poly(2-acylamide-2-methyl-1-propanesulfonic acid-co-2-hydroxyethyl methacrylate-co-2-cinnamoyl-ethyl methacrylate) (50:30:20 mol %);

Poly(2-acylamide-2-methyl-1-propanesulfonic acid-co-maleic anhydryde-co-2-cinnamoyl-ethyl methacrylate) (50:30:20 mol %);

Poly(2-acylamide-2-methyl-1-propanesulfonic acid-co-N-vinyl-2-pyrrolidone-co-2-cinnamoyl-ethyl methacrylate) (50:30:20 mol %);

Poly(2-acylamide-2-methyl-1-propanesulfonic acid-co-vinyl phosphonic acid-co-2-cinnamoyl-ethyl methacrylate) (50:30:20 mol %);

Poly(styrene sulfonic acid sodium salt-co-2-cinnamoyl-ethyl methacrylate) (80:20 mol %);

Poly(styrene sulfonic acid sodium salt-co-methacrylic acid-co-2-cinnamoylethyl methacrylate) (50:30:20 mol %);

Poly(3-sulfopropyl acrylate sodium salt-co-methacrylic acid-co-2-cinnamoylethyl methacrylate) (50:30:20 mol %);

Poly(2-sulfoethyl methacrylate sodium salt-co-methacrylic acid-co-2-cinnamoylethyl methacrylate) (50:30:20 mol %);

Poly(4-sulfobutyl methacrylate sodium salt-co-methacrylic acid-co-2-cinnamoylethyl methacrylate) (50:30:20 mol %);

Poly(3-sulfopropyl methacrylate potassium salt-co-7-(2-methacryloxyethoxy)-4-methylcoumarin) (80:20 mol %);

Poly(3-sulfopropyl methacrylate potassium salt-co-methacrylic acid-co-7-(2-methacryloxyethoxy)-4-methylcoumarin) (50:30:20 mol %);

Poly(3-sulfopropyl methacrylate potassium salt-co-methacrylic acid-co-7-(2-methacryloxyethoxy)-4-methylcoumarin) (30:50:20 mol %);

Poly(3-sulfopropyl methacrylate potassium salt-co-methacrylic acid-co-7-(2-methacryloxyethoxy)-4-methylcoumarin) (10:70:20 mol %);

Poly(3-sulfopropyl methacrylate potassium salt-co-acrylic acid-co-7-(2-methacryloxyethoxy)-4-methylcoumarin) (50:30:20 mol %);

Poly(3-sulfopropyl methacrylate potassium salt-co-acrylamide-co-7-(2-methacryloxyethoxy)-4-methylcoumarin) (50:30:20 mol %);

Poly(3-sulfopropyl methacrylate potassium salt-co-2-hydroxyethyl methacrylate-co-7-(2-methacryloxyethoxy)-4-methylcoumarin) (50:30:20 mol %);

Poly(3-sulfopropyl methacrylate potassium salt-co-maleic anhydryde-co-7-(2-methacryloxyethoxy)-4-methylcoumarin) (50:30:20 mol %);

Poly(3-sulfopropyl methacrylate potassium salt-co-N-vinyl-2-pyrrolidone-co-7-(2-methacryloxyethoxy)-4-methylcoumarin) (50:30:20 mol %);

Poly(3-sulfopropyl methacrylate potassium salt-co-vinyl phosphonic acid-co-7-(2-methacryloxyethoxy)-4-methylcoumarin) (50:30:20 mol %);

Poly(3-sulfopropyl methacrylate potassium salt-co-N-vinyl-2-pyrrolidone-co-methacrylic acid-co-7-(2-methacryloxyethoxy)-4-methylcoumarin) (20:30:30:20 mol %);

Poly(styrene sulfonic acid sodium salt-co-7-(2-methacryloxyethoxy)-4-methylcoumarin) (80:20 mol %);

Poly(styrene sulfonic acid sodium salt-co-methacrylic acid-co-7-(2-methacryloxyethoxy)-4-methylcoumarin) (50:30:20 mol %);

Poly(2-acylamide-2-methyl-1-propanesulfonic acid-co-7-(2-methacryloxyethoxy)-4-methylcoumarin) (80:20 mol %);

Poly(2-acylamide-2-methyl-1-propanesulfonic acid-co-methacrylic acid-co-7-(2-methacryloxyethoxy)-4-methylcoumarin) (50:30:20 mol %);

Poly(3-sulfopropyl methacrylate-co-N-(2-(methacryloxy)ethyl) dimethylmaleimide-) (80:20 mol %);

Poly(3-sulfopropyl methacrylate-co-methacrylic acid-co-N-(2-(methacryloxy)ethyl) dimethylmaleimide-) (50:30:20 mol %);

Poly(3-sulfopropyl methacrylate-co-methacrylic acid-co-N-(2-(methacryloxy)ethyl) dimethylmaleimide-) (10:70:20 mol %);

Poly(styrene sulfonic acid sodium salt-co-methacrylic acid-co-N-(2-(methacryloxy)ethyl) dimethylmaleimide-) (50:30:20 mol %);

Poly (2-acylamide-2-methyl-1-propanesulfonic acid-co-methacrylic acid-co-N-(2-(methacryloxy)ethyl) dimethylmaleimide-) (50:30:20 mol %);

Poly [3-sulfopropyl methacrylate-co-3N-(2-(methacryloxy)ethyl thymine] (80:20 mol %);

Poly [3-sulfopropyl methacrylate-co-methacrylic acid-co-3N-(2-(methacryloxy)ethyl-thymine] (50:30:20 mol %);

Poly(3-sulfopropyl methacrylate sodium salt-co-methacrylic acid-co-2-(2,3-diphenyl-2-cyclopropene-1-carbonyloxy) ethyl methacrylate) (50:30:20 mol %);

Poly(3-sulfopropyl methacrylate sodium salt-co-methacrylic acid-co-2-(2,3-diphenyl-2-cyclopropene-1-carbonyloxy) ethyl methacrylate) (10:70:20 mol %);

Poly(2-acrylamindo-2-methyl-1-propanesulfonic acid-co-methacrylic acid-co-2-(2,3-diphenyl-2-cyclopropene-1-carbonyloxy) ethyl methacrylate) (10:70:20 mol %);

Poly(styrene sulfonic acid sodium salt-co-methacrylic acid-co-2-(2,3-diphenyl-2-cyclopropene-1-carbonyloxy) ethyl methacrylate) (10:70:20 mol %);

Poly[3-sulfopropyl methacrylate-co-1-methyl-4-[2-(4-(2-methacryloxyethyl)-carbonyloxyphenyl)ethenyl]pyridinium trifluoromethylsulfonate] (80:20 mol %);

Poly[3-sulfopropyl methacrylate-co-methacrylic acid-co-1-methyl-4-[2-(4-(2-methacryloxyethyl)-carbonyloxyphenyl)ethenyl]pyridinium trifluoromethylsulfonate] (10:70:20 mol %);

Poly[3-sulfopropyl methacrylate-co-methacrylic acid-co-1-methyl-4-[2-(4-(2-methacryloxyethyl)-carbonyloxyphenyl)ethenyl]quinolinium trifluoromethylsulfonate] (30:50:20 mol %);

Poly[3-sulfopropyl methacrylate-co-methacrylic acid-co-1-methyl-2-[2-(4-(2-methacryloxyethyl)-carbonyloxyphenyl)ethenyl]thiazolium trifluoromethylsulfonate-co-methacrylic acid] (20:60:20 mol %);

Poly[styrene sulfonic acid-co-methacrylic acid-co-1-methyl-4-[2-(4-(2-methacryloxyethyl)-carbonyloxyphenyl)ethenyl]pyridine] (50:30:20 mol %); and Poly[styrene sulfonic acid sodium salt-co-2-(4-(2-methacryloxyethyl)-carbonyloxyphenyl)ethenyl]phenyl] (80:20 mol %).

The reactive polymers useful in the invention generally have a molecular weight ($M_w$) of at least 20,000 and up to and including 1,000,000 as measured by gel permeation chromatography (GPC) or by size exclusion chromatography (SEC).

Preparation of the reactive polymers useful in the use of the present invention can be accomplished by free radical initiated polymerization in the appropriate reaction solvent combination. The proper choice of reaction solvents is desirable for successful polymerization because of the wide disparity in polarity between the various ethylenically unsaturated polymerizable monomers with the ethylenically unsaturated polymerizable monomers providing the (a) recurring units being very polar or negatively charged and water soluble and the ethylenically unsaturated polymerizable monomers that provide (b) recurring units being relatively non-polar and hydrophobic. It is typical to require up to three reaction solvents in combination to facilitate a well-controlled polymerization. Useful reaction solvents include but are not limited to, water, ketones such as methyl ethyl ketone, aprotic polar solvents such as N,N-dimethylacetamide, and alcohols such as isopropyl alcohol. Readily available free radical initiators such as 2,2'-azodi(2-methylbutyronitrile) (AMBN) or azobis(isobutyronitrile) (AIBN) generally work well in these preparations of the reaction polymers. The polymerization reaction is typically carried out at 60° C. to 75° C. for about 18 hours. Controlled or living radical polymerization methods (see for example, Qui et al., *Progress in Polymer Science* 26 (2001) 2083-2134) that can produce very narrow molecular weight distributions and highly controlled block copolymers could also be used.

Purification of useful reactive polymers is best accomplished by dialysis because of their high water solubility. Additional water can be added to the completed reaction mixture that is then placed in a dialysis bag with a typical retention of polymer chains with an $M_w$ of 3500 Daltons or more. The dialysis bag containing the crude reactive polymer is placed in a water washing bath for 1 to 2 days or longer if needed. After dialysis, the dilute reactive polymer solution can be concentrated by evaporation to about 10 to 20 weight % solids which is suitable for storage and dilution to desired coating concentrations.

Copper-Containing Compositions

The reactive polymers described herein can be incorporated into various copper-containing compositions described below. Such copper-containing compositions can be incorporated into the various articles described below or used in various methods as described below.

Each copper-containing composition described herein has only one essential component, that is, one or more reactive polymers (or crosslinked reacted polymers) as described above that are complexed with either reducible copper ions or reduced copper nanoparticles. The reactive polymers can be used to form crosslinked reactive polymers (rendered water-insoluble) upon exposure to radiation having $\lambda_{max}$ of at least 150 nm and up to and including 700 nm, or of at least 250 nm and up to and including 450 nm, as described below. While various other optional components can be included as described below, only the complex of reactive polymer and either copper ions or copper nanoparticles is essential for providing the desired uses, articles, and methods.

Several embodiments of copper-containing compositions are provided for use in the present invention.

Copper-Containing Composition (A):

In one embodiment, a water-soluble copper-containing composition comprises a water-soluble complex of a reactive polymer (as described above) with reducible copper ions. Such a water-soluble copper-containing composition can also be considered a "copper precursor" composition that eventually can be used to provide copper metal (nanoparticles) within a polymeric complex.

One or more complexes of reactive polymers and reducible copper ions as described herein are generally present in copper-containing composition (A) (and in a resulting dry layer) in an amount of at least 1 weight % and up to and including 100 weight %, or typically at least 10 weight % and up to and including 100 weight %, based on the total solids in copper-containing composition (A).

The water-soluble complexes of copper ions (non-reduced copper) and reactive polymers for copper-containing composition (A) can be prepared by adding a highly soluble copper salt such as copper sulfate, copper nitrate, or copper acetate to an aqueous solution of a reactive polymer with stirring and for example, using controlled addition rates. The reducible copper ions will tend to bind with the sulfonate or sulfonic acid groups and optional carboxylic acid or carboxylate sites in the reactive polymer forming a copper-containing polymer complex or salt that is less soluble and more stable than the original nitrate salt but is still soluble in water. This unreduced form of the copper-containing polymer complex is typically pale cyan to green in color, and can be coated onto a suitable substrate and hardened or patterned using ultraviolet radiation. The copper ions in the uncoated solution or UV-exposed and crosslinked coatings can be reduced to form copper nanoparticles by contact (such as immersion) with a reducing agent as described below. The formation of copper nanoparticles using a reducing agent is observable because of the appearance of the red-brown color due to the surface plasmon resonance of the reduced copper nanoparticles.

Copper-Containing Composition (B):

In another embodiment, a water-soluble copper-containing composition comprises a water-soluble complex of a reactive polymer (as described above) with copper nanoparticles. Such copper-containing compositions can be readily obtained, for example, by reducing the reducible copper ions in a copper-containing composition (A) described above.

For example, this water-soluble copper-containing composition can be obtained, for example, by reducing the copper ions in water-soluble copper-containing composition (A) described above.

One or more complexes of reactive polymers and copper nanoparticles as described herein are generally present in copper-containing composition (B) (and in a resulting dry layer) in an amount of at least 1 weight % and up to and including 100 weight %, or typically at least 10 weight % and up to and including 100 weight %, based on the total solids in copper-containing composition (B).

As noted above, the water-soluble complexes of copper nanoparticles and reactive polymers for copper-containing composition (B) can be prepared by reducing the copper ions in copper-containing composition (A) containing the same reactive polymer. For example, starting with copper-containing composition (A), the rapid formation of a complex of reactive polymer and copper nanoparticles is easily accomplished by the careful addition of a copper ion reducing agent such as dimethylamine borane (DMAB) that is especially well suited to work at the inherent low pH of the solutions. Other copper ion reducing agents are borohydrides (for example, sodium borohydride), hydrazine, hypophosphite (such as sodium hypophosphite), amines (such as tetramethylethylenediamine), aldehydes, and sugars can be used for this purpose if the pH of the composition is properly adjusted. Depending upon the composition of the reaction polymer and formulation conditions, copper nanoparticles having an average diameter of at least 2 nm and up to and including 500 nm, or at least 5 nm and up to and including 300 nm can be formed and stably dispersed and complexed within the reactive polymer such that the polymer-copper complex can be filtered without removing the copper nanoparticles and the copper-containing composition (B) can be coated without forming particulate defects. The reactive polymer complexed with copper nanoparticles can again be dialyzed if necessary to remove any reaction products or salts produced during the formation of the complex.

Alternatively, copper-containing composition (B) can be prepared by mixing copper nanoparticles from any commercial source in an aqueous solution of a reactive polymer with stirring until complexation occurs. The copper nanoparticles will tend to bind with the sulfonate or sulfonic acid groups and optional carboxylic acid or carboxylate sites in the reactive polymer forming a copper nanoparticle-polymer complex.

Copper-Containing Composition (C):

Yet another useful embodiment comprises a crosslinked water-insoluble copper-containing composition of a crosslinked reactive polymer with reducible copper ions. Such crosslinked reactive polymer can be derived from suitable photoexposure of a reactive polymer (as described above) that is complexed with reducible copper ions. Such copper-containing compositions can be obtained, for example, by photoexposure of water-soluble copper-containing composition (A) described above but before any appreciable copper ion reduction occurs. Alternatively, one can crosslink a reactive polymer as described herein and then imbibe or diffuse copper ions into it for complexation with the sulfonic acid and any carboxylic acid groups in the reacted polymer.

Copper-Containing Composition (D):

Still another useful embodiment comprises a crosslinked copper-containing composition comprising a crosslinked water-insoluble complex of a crosslinked reactive polymer with copper nanoparticles. Such crosslinked reactive polymer can be derived from photoexposure as described herein of a reactive polymer (as described above) that is already complexed with copper nanoparticles (from appropriate reduction of reducible copper ions). This crosslinked composition can be derived for example, by photoexposure of copper-containing composition (B) described above; by both photoexposure and copper ion reduction, in any order, of copper-containing composition (A) described above; or by copper ion reduction in copper-containing composition (C) described above. The resulting nanoparticles can have an average diameter of at least 2 nm and up to and including 500 nm, or at least 6 nm and up to and including 300 nm such that they can be formed and stably dispersed and complexed within the reactive polymer so that they can be filtered without removing the copper nanoparticles and the copper-containing composition (D) can be coated without forming particulate defects. Alternatively, one can diffuse a non-complexed solution of silver nanoparticles into the crosslinked reactive polymer where the silver nanoparticles will preferentially bind or complex with the sulfonic acid, carboxylic acid, or other groups.

Copper-containing compositions (A) through (D) generally do not include separate crosslinking agents or crosslinking agent precursors because the reactive polymer itself includes sufficient crosslinkable groups (described above). However, as noted above, if present, the (d) recurring units can also include additional crosslinking groups.

While not essential, it is sometimes desirable to enhance the sensitivity of some reactive polymers to longer wavelengths (for example, at least 250 nm and up to and including 700 nm, or at least 250 nm and up to and including 450 nm) by including one or more photosensitizers such as triplet state photosensitizers. A variety of photosensitizers are known in the art such as benzothiazole and naphthothiazole compounds as described in U.S. Pat. No. 2,732,301 (Robertson et al.), aromatic ketones as described in U.S. Pat. No. 4,507,497 (Reilly, Jr.), and ketocoumarins, as described for example in U.S. Pat. Nos. 4,147,552 (Specht et al.) and 5,455,143 (Ali), the disclosures of all of which are incorporated herein by reference. Particularly useful photosensitizers for long UV and visible light sensitivity include but are not limited to, 2-[bis(2-furoyl)methylene]-1-methyl-naphtho[1,2-d]thiazoline, 2-benzoylmethylene-1-methyl-β-napthothiazoline, 3,3'-carbonylbis(5,7-diethoxycoumarin), 3-(7-methoxy-3-coumarinoyl)-1-methylpyridinium fluorosulfate, 3-(7-methoxy-3-coumarinoyl)-1-methylpyridinium 4-toluenesulfonic acid, and 3-(7-methoxy-3-coumarinoyl)-1-methylpyridinium tetrafluoroborate. Other useful compounds are described in Columns 6 and 7 of U.S. Pat. No. 4,147,552 (noted above) which compound disclosure is incorporated herein by reference. Thioxanthones are also particularly useful for sensitizing the type (iv) [2+2] photocycloaddition groups such as dimethylmaleide.

One or more photosensitizers can be present in a particular copper-containing composition (and resulting dry layer) in an amount of at least 0.1 weight % and up to and including 10 weight %, or more likely at least 0.5 weight % and up to and including 5 weight %, based on the total solids in the copper-containing composition (or total dry weight of a layer of the copper-containing composition).

Copper-containing compositions (A) through (D) described herein can individually and optionally include one or more addenda such as film-forming compounds, surfactants, plasticizers, filter dyes, viscosity modifiers, and any other optional components that would be readily apparent to one skilled in the art, and such addenda can be present in amounts that would also be readily apparent to one skilled in the art.

The essential complexes of reactive polymer and either reducible copper ions or copper nanoparticles, and any optional compounds described above, are generally dissolved or dispersed in water or a mixture of water and water-miscible organic solvents to form a reactive composition that can be applied to a suitable substrate (described below) in a suitable manner. Useful water-miscible organic solvents include but are not limited to, alcohols such as methanol, ethanol, and isopropanol and polyols such as ethylene glycol, propylene glycol, and glycerol. The amounts of the complexes and any optional compounds in the aqueous-based copper-containing compositions can be readily determined by a skilled artisan for desired use in coating.

Articles

The reactive polymers and copper-containing compositions described above can be used to prepare a variety of articles that can be used for various purposes as described above, for example for antimicrobial purposes as well as for preparing electrically-conductive elements (or articles).

In all of these articles, a copper-containing composition can be disposed in a suitable manner onto one or multiple surfaces of a suitable substrate. For example, any of the copper-containing compositions described above can be applied to a suitable substrate using any suitable method including but not limited to, spin coating, bead coating, blade coating, curtain coating, or spray coating, from a suitable reservoir to form a polymeric layer. Useful substrates can be chosen for a particular use or method as long as the substrate material will not be degraded by the copper-containing composition or any treatments to which the resulting articles are subjected during the method of this invention. The copper-containing composition can be applied multiple times if desired to obtain a thicker coating, and dried between each coating or dried only after the last application. Water and any water-miscible organic solvents can be removed from the copper-containing composition using any suitable drying technique.

In general, the final dry coating of any copper-containing composition can have an average dry thickness of at least 10 nm and up to and including 1 mm, with a dry thickness of at least 0.1 λm and up to and including 100 μm being useful for various uses. Such coatings can be uniformly applied onto a substrate surface or applied in a suitable patternwise fashion as described below.

Useful substrates can be composed of glass, quartz, and ceramics as well as a wide variety of flexible materials such as cellulosic papers and polymeric films composed of polyesters including poly(ethylene terephthalate) and poly(ethylene naphthalate), polycarbonates, polyamides, poly(meth) acrylates, or polyolefins. Useful polymeric substrates can be formed by casting or extrusion methods. Laminates of various substrate materials can also be put together to form a composite substrate. Any of the substrates can be treated to improve adhesion using for example corona discharge, oxygen plasma, ozone or chemical treatments using silane compounds such as aminopropyltriethoxysilane. The substrates can be of any suitable dry thickness including but not limited to at least 10 μm and up to and including 10 mm, depending upon the intended use of the resulting articles.

Particularly useful substrates are flexible substrates that are composed of poly(ethylene terephthalate) such as biaxially oriented poly(ethylene terephthalate) (PET) films. These PET films, ranging in dry thickness of at least 50 μm and up to and including 200 μm, can also comprise, on at least one supporting side, a polymeric primer layer (also known as a subbing layer, adhesive layer, or binder layer) that can be added prior to or after film stretching. Such polymeric primer layers can comprise poly(acrylonitrile-co-vinylidene chloride-co-acrylic acid), poly(methyl acrylate-co-vinylidene chloride-co-itaconic acid), poly(glycidyl methacrylate-co-butyl acrylate), or various water-dispersible polyesters, water-dispersible polyurethanes, or water-dispersible polyacrylics, as well as sub-micrometer silica particles. The dry thickness of the primer layer can be at least 0.1 μm and up to and including 1 μm.

In many embodiments of the present invention, each of the substrates can have an integrated transmittance of at least 80%, or at least 90% or even higher to provide articles that have excellent transparency. Such highly transparent substrates can be composed of glass (such as flexible glass) or polymeric films as described above.

The useful substrates can be in any suitable shape or size. They can be in the form of sheets, films, tubes, particles, or various 3-dimensional shapes depending upon the intended use. Some particularly useful substrates are in the form of continuous webs that can be unrolled from a stock roll, treated in some manner for example to apply a copper-containing composition followed by other treatments and then rolled up for shipment or later use in roll-to-roll manufacturing processes.

If a substrate is in the form of a sheet or roll, it typically has two opposing planar surfaces known herein as a "first supporting surface" and an "opposing second supporting surface." A copper-containing composition can be disposed in a suitable manner one or both supporting sides of the substrate such as only on the first supporting side, or the same or different copper-containing composition (such as copper-containing precursor composition) can be disposed on both the first supporting side and the opposing second supporting side of the substrate.

In some embodiments, a precursor article can be prepared with a substrate and having a copper-containing precursor composition [for example copper-containing composition (A) as described above] disposed on the substrate, for example on one or both supporting surfaces of a sheet or continuous web. This copper-containing precursor composition can comprise a water-soluble complex of a reactive polymer (as described above) with reducible copper ions.

In other embodiments, a precursor article can comprise a substrate and have disposed thereon (for example, in a patternwise fashion) a water-insoluble (crosslinked) composition [for example, copper-containing composition (D) as described above], comprising a crosslinked water-insoluble complex of a crosslinked reactive polymer with reducible copper ions. Such crosslinked reactive polymer can be derived by photoexposure of a reactive polymer as described above. Such water-insoluble (crosslinked) composition can be disposed on only the first supporting side of the substrate, but in other embodiments, the same or different water-insoluble complex can be disposed on both the first supporting side and the opposing second supporting side of the substrate. It still other embodiments, the same or different water-insoluble (crosslinked) composition is disposed on both the first supporting side and the opposing second supporting side of the substrate in the same or different patternwise fashion (using means described below).

It is also possible to prepare precursor articles that comprise a substrate and having disposed thereon a water-soluble copper-containing composition [for example, copper-containing composition (B) described above] comprising a water-soluble complex of a reactive polymer (described above) with copper nanoparticles. Such water-soluble composition can be disposed on only the first supporting side of the substrate, but in other embodiments, the same or different water-insoluble complex can be disposed on both the first supporting side and the opposing second supporting side of the substrate. In still other embodiments, the same or different water-soluble complex is disposed on both the first supporting side and the opposing second supporting side of the substrate in the same or different patternwise fashion (using means described below). Such precursor articles can also comprise a photosensitizer (as described above) admixed with the water-soluble complex.

In still other embodiments, a copper-containing article can comprise a substrate and having disposed thereon a water-insoluble copper-containing composition [for example, the copper-containing composition (C) described above] comprising a crosslinked water-insoluble complex of a crosslinked reactive polymer with copper nanoparticles. This crosslinked reactive polymer can be derived from photoexposure of a reactive polymer as described above. Such water-insoluble (crosslinked) copper-containing composition can be disposed on only the first supporting side of the substrate, but in other embodiments, the same or different water-insoluble complex can be disposed on both the first supporting side and the opposing second supporting side of the substrate. It still other embodiments, the same or different water-insoluble (crosslinked) copper-containing composition is disposed on both the first supporting side and the opposing second supporting side of the substrate in the same or different patternwise fashion (using means described below).

As prepared using conditions known in the art, a copper-containing article can further comprise an electrically-conductive metal that has been electrolessly plated on the same or different crosslinked water-insoluble complex disposed on both the first supporting side and the opposing second supporting side of the substrate. This electrically-conductive metal is typically electrolessly plated on the crosslinked water-insoluble complex in which the copper nanoparticles serve as catalyst seed metal particles. For example, the electrolessly plated metal can be any metal that can be catalyzed by copper nanoparticles.

The crosslinked water-insoluble complex can be disposed on the substrate in a patternwise fashion, and the copper-containing article can further comprise an electrically-conductive metal that has been electrolessly plated on the crosslinked water-insoluble complex in the same patternwise fashion so that only the pattern of the water-insoluble complex is electrolessly plated.

Methods for Making and Using Articles

The present invention provides various methods for providing copper-containing articles as described above. For example, precursor articles described above can be prepared by disposing a copper-containing composition onto a suitable substrate (as described above). The copper-containing composition comprises a water-soluble complex of a reactive polymer (as described above) with reducible copper ions. The copper-containing composition can be disposed in any suitable manner as described above, such as by using a flexographic printing member described below, in a uniform manner (over the entire supportive side or surface of the substrate) or in a patternwise fashion to provide any desired predetermined or random pattern on the supporting side. If the substrate has a planar shape, it will generally include two supporting sides opposite each other (for example, a first supportive side and an opposing second supporting side), and the copper-containing composition can be disposed in a suitable manner on one or both supporting sides (patternwise or uniformly).

It may also be possible to use the present invention to provide certain specifically designed patterns for optimal non-toxic bioadhesion control so that marine organisms are less likely to foul or adhere to the resulting article in which the reducible copper ions have been reduced to copper nanoparticles. Some of such patterns are sometimes identified as Sharklet™ patterns as described in U.S. Pat. No. Application Publication 2010/0226943A1 identified above and the disclosure of which is incorporated herein by reference.

In other embodiments, a method is used to provide an article comprising copper nanoparticles. This method comprises, firstly disposing a copper-containing composition (as described above) onto either or both supporting sides of a suitable substrate (as described above), photoexposing the water-soluble complex to form the crosslinked water-insoluble complex containing reducible copper ions, and optionally, removing any remaining water-soluble complex from either or both first supporting side and the opposing second supporting side of the substrate. The reducible copper ions in the water-soluble complex are reduced to form copper nanoparticles (average diameter described above, for example at least 2 nm and up to and including 500 nm) in the water-soluble complex. For example, the reducible copper ions can be reduced using an aqueous solution of dimethylborane, a borohydride, a hypophosphite, an amine, an aldehyde, or a sugar.

The resulting article can be stored for later use if desired, but in many embodiments, the water-soluble complex containing the copper nanoparticles is photoexposed using conditions described below (for example, using ultraviolet radiation having a $\lambda_{max}$ of at least 150 nm) to form a crosslinked, water-insoluble complex comprising the copper nanoparticles on one or both supporting sides of the substrate. For example, the water-soluble complex containing the copper nanoparticles can be photoexposed in a patternwise fashion on either or both supporting sides of the substrate. Alternative, the water-soluble complex containing the copper nanoparticles can be blanketwise (uniformly) photoexposed.

In some embodiments, this method further comprises, after photoexposing the water-soluble complex to form the crosslinked water-insoluble complex containing copper nanoparticles, heating the crosslinked water-insoluble complex containing copper nanoparticles at a temperature sufficient to further crosslink the crosslinked water-insoluble complex containing the copper nanoparticles. Conditions for this heating treatment are described below.

In addition, after photoexposing the water-soluble complex to form the crosslinked water-insoluble complex containing copper nanoparticles, the method can include removing any remaining non-photoexposed water-soluble complex from the substrate, for example, by washing with water or another aqueous solution for a sufficient time to remove at least 90 weight % of the non-photoexposed water-soluble complex.

For example, in such methods, the copper precursor composition can be disposed on one or both supporting sides of the substrate in a patternwise fashion using a flexographic printing member.

In some particularly useful embodiments, the present invention can be used to prepare patterns on both sides of a flexible continuous web, such as a continuous (roll) of polymeric substrate, for example in a roll-to-roll manufacturing operation. Thus, in such embodiments, the method for providing a "dual-sided" article, comprising disposing a copper-containing composition (as described above) onto a first supporting side of a suitable substrate (such as a continuous web). Photoexposing the water-soluble complex is carried out to form the crosslinked water-insoluble complex containing reducible copper ions, and optionally, removing any remaining water-soluble complex from either or both the first supporting side and the opposing second supporting side of the support. The reducible copper ions in the water-insoluble complex can be reduced to form copper nanoparticles in the water-insoluble complex on the first supporting side of the substrate using the reducing conditions and solutions described below. The same or different copper-containing composition can then be disposed in a suitable fashion onto an opposing second supporting side of the same substrate. Photoexposing of the water-soluble complex can be carried out to form the crosslinked water-insoluble complex containing reducible copper ions, and optionally removing any remaining water-soluble complex from either or both the first supporting side and the opposing second supporting side of the substrate. The reducible copper ions in the water-insoluble complex can be reduced to form copper nanoparticles in the water-insoluble complex on the opposing second supporting side of the substrate.

The photoexposure of the water-soluble complex containing the reducible copper ions on either or both of the first supporting side and the opposing second supporting side of the substrate can be blanketwise (uniformly), or in a patternwise fashion. The photoexposing can be carried out using ultraviolet radiation having a $\lambda_{max}$ of at least 150 nm.

After such features, the method can further comprise, after photoexposing the water-soluble complex on either or both of the first supporting side and the opposing second supporting side of the substrate to form the crosslinked water-insoluble complex containing copper nanoparticles, optionally heating the crosslinked water-insoluble complex containing copper nanoparticles on either or both of the first supporting side and the opposing second supporting side of the substrate at a temperature sufficient to further crosslink the crosslinked water-insoluble complex containing the copper nanoparticles. The heating conditions are described in more detailed.

In other embodiments, the method can further comprise, after photoexposing the water-soluble complex on either or both of the first supporting side and the opposing second supporting side of the substrate to form the crosslinked water-insoluble complex containing copper nanoparticles, removing any remaining water-soluble complex from both of the first supporting side and opposing second supporting sides of the substrate, using water or another aqueous solution.

The reducing feature can be carried out on both supporting sides of the substrate using an aqueous solution of dimethylamine borane, a borohydride, a hypophosphite, an amine, an aldehyde, or a sugar.

Uniform or patternwise exposure can be carried out using radiation having a $\lambda_{max}$ of at least 150 nm and up to and including 700 nm or to radiation having a $\lambda_{max}$ of at least 250 nm and up to and including 450 nm. This exposure can be provided with any suitable exposing source or device that provides the desired radiation including but not limited to, various arc lamps and LED sources. The particular exposing source can be chosen depending upon the absorption characteristics of the composition used. The exposing radiation can be projected through lenses and mirrors or through a lens or mask element that can be in physical contact or in proximity with a water-soluble complex. Exposure time can range from a fraction (0.1) of a second and up to and including 10 minutes depending upon the intensity of the radiation source and the water-soluble composition. Suitable masks can be obtained by known methods including but not limited to photolithographic methods, flexographic methods, or vacuum deposition of a chrome mask onto a suitable substrate such as quartz or high quality optical glass followed by photolithographic patterning.

It is optional but desirable to heat or bake an article simultaneously with or after the exposure but generally before removing the water-soluble copper-containing composition as described below, at a temperature sufficient to further crosslink the at least partially crosslinked reactive polymer. In most embodiments, this heating is carried out at least after the patternwise exposure, but it can be carried out both during and after the patternwise exposure. Such heating can be accomplished on a hot plate with vacuum suction to hold the article in close contact with the heating surface. Alternatively, the heating device can be a convection oven. The duration of the heating procedure is generally less than 10 minutes with heating for least 10 seconds and up to and including 5 minutes being most likely. The optimal heating time and temperature can be readily determined with routine experimentation.

After the imagewise exposure and optional heating procedures, the water-insoluble complex comprising the reactive polymer and either reducible copper ions or copper nanoparticles can be removed from the substrate so that there is essentially none (less than 20%, and particularly less than 10%, by weight of the original amount) remaining on the substrate. This can be done by washing, spraying, or immersing the article in water, aqueous alkaline solution, or another aqueous solution for a suitable time and temperature to remove most or all of the water-soluble complex from the substrate. Contact with the aqueous solution can be carried out for a suitable time and temperature so that water-soluble complex is desirably removed in the non-exposed regions but little removal occurs in the exposed regions containing the crosslinked water-soluble complex. For example, the contact time can be at least 10 seconds and up to and including 10 minutes, and the contact temperature can be at room temperature (about 20° C.) and up to and including 95° C.

Reduction of the reducible copper ions at a suitable time can be done by contacting the complex containing such reducible copper ions with a suitable reducing agent for the copper ions, for example by immersion within an aqueous-based reducing solution containing one or more reducing agents for a suitable time to cause sufficient copper ion reduction to copper nanoparticles. Alternatively, an aqueous-based reducing solution comprising the reducing agent can be sprayed or rolled uniformly onto a layer containing the reducible copper ions.

Useful reducing agents include but are not limited to, an organic borane, an aldehyde such as formaldehyde, aldehyde sugar, hydroquinone, or sugar (or polysaccharide) such as ascorbic acid, and metal ions such as tin(II). These reducing agents can be used individually or in combination, and the total amount in the aqueous-based reducing solution used for the reducing procedure can be at least 0.01 weight % and up to and including 20 weight % based on the total reducing solution weight. The amount of reducing agent to be used will depend upon the reducing agent to be used and this can be readily optimized using routine experimentation. The time and temperature for the reduction can also be readily optimized in the same manner. Generally, the reducing temperature is at least room temperature (about 20° C.) and up to and including 95° C. and the reducing time can be for at least 1 second and up to and including 30 minutes.

For example, some embodiments can be carried out using an immersion bath comprising 1 reducing solution weight % of an organic borane such as dimethylamine borane (DMAB) at room temperature for up to 10 minutes. Longer or shorter times at higher temperatures are possible if needed.

After a reducing procedure, the complex containing the copper nanoparticles can be washed using distilled water or deionized water or another aqueous-based solution at a suitable temperature for a suitable time.

The present invention provides at least the following embodiments and combinations thereof, but other combinations of features are considered to be within the present invention as a skilled artisan would appreciate from the teaching of this disclosure:

1. A copper-containing article comprising a substrate and having disposed thereon a copper-containing composition comprising a water-soluble complex of a reactive polymer with reducible copper ions or copper nanoparticles, the reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

2. Embodiment 1, wherein the substrate has a first supporting side and an opposing second supporting side, and the copper-containing composition is disposed on one or both the first supporting side and the opposing second supporting of the substrate.

3. Embodiment 1 or 2, wherein the copper-containing composition is disposed on the substrate in a patternwise fashion.

4. A copper-containing article comprising a substrate and having disposed thereon a water-insoluble composition comprising a crosslinked water-insoluble complex of a crosslinked reactive polymer with reducible copper ions or copper nanoparticles, the crosslinked reactive polymer derived from photoexposure of a reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

5. An of embodiments 1 to 4, wherein the copper-containing composition comprises copper nanoparticles that have an average diameter of at least 2 nm and up to and including 500 nm.

6. Embodiment 4 or 5, wherein the same or different crosslinked water-insoluble complex is disposed on both the first supporting side and the opposing second supporting side of the substrate in the same or different patternwise fashion.

7. Any of embodiments 4 to 6, wherein the crosslinked water-insoluble complex is disposed on the substrate in a patternwise fashion.

8. A method for providing a copper-containing article, the method comprising:

disposing a copper-containing composition onto a first supporting side of a substrate, the copper-containing composition comprising a water-soluble complex of a reactive polymer with reducible copper ions, the reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

9. Any of embodiments 1 to 8, wherein the substrate has an integrated transmittance of at least 90%.

10. Embodiment 8 or 9, comprising disposing the copper-containing composition onto a supporting side of the substrate in a patternwise fashion using a flexographic printing member.

11. Any of embodiments 8 to 10, further comprising:
before disposing the copper-containing composition onto the substrate, reducing the reducible copper ions in the water-soluble complex to form copper nanoparticles in the water-soluble complex.

12. Embodiment 11, further comprising:
after reducing the reducible copper ions, photoexposing the water-soluble complex containing the copper nanoparticles to form a crosslinked water-insoluble complex comprising the copper nanoparticles.

13. Embodiment 12, comprising:
photoexposing the water-soluble complex containing the copper nanoparticles in a patternwise fashion on the substrate.

14. Any of embodiments 11 to 13, comprising:
reducing the copper ions in the water-soluble complex to form copper nanoparticles having an average diameter of at least 2 nm and up to and including 500 nm.

15. Any of embodiments 11 to 14, further comprising, after photoexposing the water-soluble complex to form the crosslinked water-insoluble complex containing copper nanoparticles,
heating the crosslinked water-insoluble complex containing copper nanoparticles at a temperature sufficient to further crosslink the crosslinked water-insoluble complex containing the copper nanoparticles.

16. Any of embodiments 12 to 15, further comprising, after photoexposing the water-soluble complex to form the crosslinked water-insoluble complex containing copper nanoparticles,
removing any remaining water-soluble complex from the substrate.

17. Any of embodiments 8 to 16, comprising:
disposing the copper-containing composition onto the first supporting side of a substrate,
disposing the same or different copper-containing composition onto an opposing second supporting side of the substrate,
photoexposing the water-soluble complex copper-containing on either or both of the first supporting side and opposing second supporting side of the substrate, to form a crosslinked water-insoluble copper-complex on either or both of the first supporting side and opposing supporting side of the substrate, and
optionally, removing any remaining water-soluble complex from both the first supporting side and the opposing second supporting side of the substrate.

18. Embodiment 17, further comprising:

reducing the copper ions in the water-insoluble complex on either or both the first supporting side and the opposing second supporting side to form copper nanoparticles having an average diameter of at least 2 nm and up to and including 500 nm.

19. Embodiment 17, further comprising:

oxidizing the copper in the water-insoluble copper-containing on either or both the first supporting side and the opposing second supporting side to form copper oxide nanoparticles having an average diameter of at least 2 nm and up to and including 500 nm.

20. Any of embodiments 1 to 19, wherein the reactive polymer comprises at least 5 mol % of the recurring units comprising sulfonic acid or sulfonate groups, based on the total recurring units in the reactive polymer.

21. Any of embodiments 1 to 20, wherein the reactive polymer comprises at least 5 mol % and up to and including 50 mol % of the recurring units comprising a pendant group capable of crosslinking via [2+2] photocycloaddition, based on the total recurring units in the reactive polymer.

22. Any of embodiments 1 to 21, wherein the reactive polymer comprises at least 1 mol % and up to and including 93 mol % of recurring units comprising a pendant hydroxyl, amide, or carboxylic acid group, based on the total recurring units in the reactive polymer.

23. Any of embodiments 1 to 22, wherein the recurring units comprising a pendant group capable of crosslinking via [2+2] photocycloaddition comprise:

(i) a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;

(ii) a photosensitive, aromatic or non-aromatic unsaturated carbocyclic group;

(iii) a photosensitive, non-aromatic heterocyclic group comprising a carbon-carbon double bond that is conjugated with an electron withdrawing group;

(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom, or (v) a photosensitive substituted or unsubstituted 1,2-diarylethylene group.

24. Any of embodiments 1 to 23, wherein the reactive polymer is one of the following:

poly(3-sulfopropyl methacrylate potassium salt-co-2-cinnamoyl-ethyl methacrylate) (80:20 mol %);

poly(3-sulfopropyl methacrylate-co-methacrylic acid-co-2-cinnamoyl-ethyl methacrylate) (2:78:20 mol %);

poly(3-sulfopropyl methacrylate-co-methacrylic acid-co-2-cinnamoyl-ethyl methacrylate) (5:75:20 mol %);

poly(3-sulfopropyl methacrylate-co-methacrylic acid-co-2-cinnamoyl-ethyl methacrylate) (10:70:20 mol %);

poly(3-sulfopropyl methacrylate-co-methacrylic acid-co-2-cinnamoyl-ethyl methacrylate) (30:50:20 mol %);

poly(3-sulfopropyl methacrylate potassium salt-co-methacrylic acid-co-2-cinnamoyl-ethyl methacrylate) (50:30:20 mol %);

poly(3-sulfopropyl methacrylate potassium salt-co-2-hydroxyethyl methacrylate acid-co-2-cinnamoyl-ethyl methacrylate) (50:30:20 mol %);

poly(3-sulfopropyl methacrylate potassium salt-co-acrylamide-co-2-cinnamoyl-ethyl methacrylate) (50:30:20 mol %);

poly(3-sulfopropyl methacrylate potassium salt-co-N-vinyl-2-pyrrolidone-co-2-cinnamoyl-ethyl methacrylate) (50:30:20 mol %);

poly(3-sulfopropyl methacrylate potassium salt-co-maleic anhydryde-co-2-cinnamoyl-ethyl methacrylate) (50:30:20 mol %);

poly(3-sulfopropyl methacrylate potassium salt-co-vinyl phosphonic acid-co-2-cinnamoyl-ethyl methacrylate) (50:30:20 mol %);

poly(2-acylamido-2-methyl-1-propanesulfonic acid-co-2-cinnamoyl-ethyl methacrylate) (80:20 mol %);

poly(2-acylamido-2-methyl-1-propanesulfonic acid-co-methacrylic acid-co-2-cinnamoyl-ethyl methacrylate) (50:30:20 mol %);

poly(2-acylamido-2-methyl-1-propanesulfonic acid-co-methacrylic acid-co-2-cinnamoyl-ethyl methacrylate) (10:70:20 mol %);

poly(styrene sulfonic acid sodium salt-co-2-cinnamoyl-ethyl methacrylate) (80:20 mol %);

poly(styrene sulfonic acid sodium salt-co-methacrylic acid-co-2-cinnamoyl-ethyl methacrylate) (50:30:20 mol %);

poly(3-sulfopropyl methacrylate potassium salt-co-7-(2-methacryloxyethoxy)-4-methylcoumarin) (80:20 mol %);

poly(3-sulfopropyl methacrylate potassium salt-co-methacrylic acid-co-7-(2-methacryloxyethoxy)-4-methylcoumarin) (50:30:20 mol %);

poly(3-sulfopropyl methacrylate potassium salt-co-methacrylic acid-co-7-(2-methacryloxyethoxy)-4-methylcoumarin) (10:70:20 mol %);

poly(styrene sulfonic acid sodium salt-co-7-(2-methacryloxyethoxy)-4-methylcoumarin) (80:20 mol %);

poly(styrene sulfonic acid sodium salt-co-methacrylic acid-co-7-(2-methacryloxyethoxy)-4-methylcoumarin) (50:30:20 mol %);

poly(2-acylamido-2-methyl-1-propanesulfonic acid-co-7-(2-methacryloxyethoxy)-4-methylcoumarin) (80:20 mol %);

poly(2-acylamido-2-methyl-1-propanesulfonic acid-co-methacrylic acid-co-7-(2-methacryloxyethoxy)-4-methylcoumarin) (50:30:20 mol %);

poly(2-acylamido-2-methyl-1-propanesulfonic acid-co-methacrylic acid-co-7-(2-methacryloxyethoxy)-4-methylcoumarin) (10:70:20 mol %);

poly(3-sulfopropyl methacrylate potassium salt-co-acrylamide-co-7-(2-methacryloxyethoxy)-4-methylcoumarin) (50:30:20 mol %);

poly(3-sulfopropyl methacrylate potassium salt-co-2-hydroxyethyl methacrylate-co-7-(2-methacryloxyethoxy)-4-methylcoumarin) (50:30:20 mol %);

poly(3-sulfopropyl methacrylate potassium salt-co-maleic anhydryde-co-7-(2-methacryloxyethoxy)-4-methylcoumarin) (50:30:20 mol %);

poly(3-sulfopropyl methacrylate potassium salt-co-N-vinyl-2-pyrrolidone-co-7-(2-methacryloxyethoxy)-4-methylcoumarin) (50:30:20 mol %);

poly(3-sulfopropyl methacrylate potassium salt-co-N-vinyl-2-pyrrolidone-co-methacrylic acid-co-7-(2-methacryloxyethoxy)-4-methylcoumarin) (20:30:30:20 mol %);

poly (3-sulfopropyl methacrylate-co-N-(2-(methacryloxy)ethyl) dimethylmaleimide) (20:80 mol %);

poly (3-sulfopropyl methacrylate-co-methacrylic acid-co-N-(2-(methacryloxy)ethyl) dimethylmaleimide) (50:30:20 mol %);

poly (3-sulfopropyl methacrylate-co-methacrylic acid-co-N-(2-(methacryloxy)ethyl) dimethylmaleimide) (10:70:20 mol %);

poly (styrene sulfonic acid sodium salt-co-methacrylic acid-co-N-(2-(methacryloxy)ethyl) dimethylmaleimide) (50:30:20 mol %);

poly (styrene sulfonic acid sodium salt-co-methacrylic acid-co-N-(2-(methacryloxy)ethyl) dimethylmaleimide) (10:70:20 mol %);

poly (2-acylamido-2-methyl-1-propanesulfonic acid -co-methacrylic acid-co-N-(2-(methacryloxy)ethyl) dimethylmaleimide) (50:30:20 mol %);

poly (2-acylamido-2-methyl-1-propanesulfonic acid -co-methacrylic acid-co-N-(2-(methacryloxy)ethyl) dimethylmaleimide) (10:70:20 mol %);

poly(3-sulfopropyl methacrylate sodium salt-co-methacrylic acid-co-2-(2,3-diphenyl-2-cyclopropene-1-carbonyloxy) ethyl methacrylate) (10:70:20 mol %);

poly(styrene sulfonic acid sodium salt-co-methacrylic acid-co-2-(2,3-diphenyl-2-cyclopropene-1-carbonyloxy) ethyl methacrylate) (10:70:20 mol %); and poly(2-acrylamido-2-methyl-1-propanesulfonic acid-co-methacrylic acid-co-2-(2,3-diphenyl-2-cyclopropene-1-carbonyloxy) ethyl methacrylate) (10:70:20 mol %).

25. Any of embodiments 1 to 24, wherein the copper-containing composition further comprises a photosensitizer.

26. Any of embodiments 1 to 25, wherein the substrate is a continuous polymeric web.

The following Examples are provided to illustrate the practice of this invention and are not meant to be limiting in any manner.

Synthesis of
7-(2-Methacryloyloxyethoxy)-4-methylcoumarin 5.44 g of 4-methylumbelliferone (7-hydroxy-4-methyl-courmarin) was suspended in 150 ml of tetrahydrofuran (THF) and 4.42 g of 2-hydroxyethyl methacrylate were added, followed by 8.42 g of triphenylphosphine. The solids slowly dissolved with stirring at room temperature under nitrogen. Then, 6.37 g of diisopropyl azodicarboxylate were added drop-wise while the temperature was kept below 25° C. The reaction solution was stirred overnight at room temperature.

Most of the solvent was evaporated and then ether was added to precipitate a white solid that was put into a freezer for a few hours. The solid was collected by filtration and rinsed with ether, and dried on the filter to obtain 12.14 g of a white solid that was purified by chromatography (silica gel: 50/50 ethyl acetate/methylene chloride). This procedure provided a white solid that was slurried with heptane and filtered and dried on the filter to provide a total of 6.77 g of the desired monomer.

Alternative Synthesis of
7-(2-Methacryloyloxyethoxy)-4-methylcoumarin 15.3 g of 4-methylumbelliferone (7-hydroxy-4-methyl-courmarin) was dissolved in about 300 ml of dimethylacetamide (DMA) in a 3-neck 1 liter flask with an overhead stirrer. 48 g of potassium carbonate, 20.8 g of 2-((methylsulfonyl)oxy)ethyl methacrylate prepared from 2-hydroxyethyl methacrylate using standard procedures, and 1.66 g of potassium iodide were then added and the mixture was heated in an oil bath at 70° C. about 18 hours. Thin layer chromatography was used to determine that the reaction was complete. The reaction solution was cooled and poured into about 1 liter of water, stirred for about an hour, and the precipitate was filtered. The precipitate was rinsed with another 1 liter of water then heptane and dried on the filter. The desired product was confirmed by NMR. A portion of the product was further purified by silica gel chromatography with ethyl acetate. The ethyl acetate was removed by evaporation and the product was crystallized from heptane to obtain a white powder.

Synthesis of 2-Cinnamoyl-ethyl Methacrylate Monomer

To a 500 ml, 3 neck round-bottomed flask equipped with a condenser and magnetic stir bar, 2-hydroxyethyl methacrylate, (11.30 g, 0.0868 mole) (Mw=130.14 g/mole), dichloromethane (DCM) (60 g), and triethylamine (Mw=101.19 g/mole) (8.50 g, 0.084 mole) were added. This solution was stirred until it was homogenous and then it was placed in an ice bath. A solution of cinnamoyl chloride (Mw+166.6 g/mole) (13.33 g, 0.080 mole) dissolved in 30 g of DCM was added slowly dropwise over 15 minutes. After this addition, the reaction solution was allowed to come to room temperature and then placed in oil bath at 40° C. and refluxed for 60 minutes to complete the reaction. The solution was then cooled and removed from the oil bath and the resulting amine hydrochloride precipitate was filtered off. Additional DCM was added and the solution was placed in a separatory funnel, the filtered solution was washed twice with sodium bicarbonate, then twice with distilled water, once with dilute hydrochloric acid solution, and then twice with distilled water. The organic layer was place over magnesium sulfate for 30 minutes and filtered. The DCM was removed and the remaining product was placed under high vacuum at room temperature overnight to remove any residual DCM. The final product was clear oil with a yellow tint with an Mw of 260.29 g/mole. The product purity was verified by NMR.

Synthesis of
2-(2,3-diphenyl-2-cyclopropene-1-carboxyl)ethyl Methacrylate Monomer Crude 2,3-diphenylcyclopropene-1-carboxylic acid was purified by recrystallization (hot filtered) using acetone. The carboxylic acid (8.0 g, 0.034 moles) was suspended in about 100 ml of dichloromethane in a 250 ml single-neck round-bottom flask equipped with a condenser and stirred magnetically under nitrogen. A 2 molar solution (21 ml) of oxalyl chloride in dichloromethane (5.37 g, 0.042 moles) was added dropwise at room temperature and then a few drops of N,N-dimethylformamide were added to help promote the reaction (gas evolution of HCl, CO, and $CO_2$ began). The reaction solution was stirred at room temperature for about 5 hours while the reaction was monitored by thin layer chromatography (the solid slowly dissolved while reacting). The reaction solution became a clear yellow in color when all solid had dissolved. The solvent(s) was evaporated and the residue was re-crystallized in hexane with a small amount of ethyl acetate (hot filtered) in the freezer overnight and 6.90 g (80% yield) of off-white crystals of diphenylcyclopropene carboxylic acid chloride were collected.

The resulting diphenylcyclopropene carboxylic acid chloride (6.90 g, 0.027 mole) was dissolved in 30 ml of dichloromethane and the solution was added dropwise at room temperature to a solution of 2-hydroxyethyl methacrylate (3.88 g, 0.030 mole) and triethylamine (2.88 g, 0.028 mole)

dissolved in 50 ml of dichloromethane in a 250 ml single-neck flask. The resulting reaction solution was stirred at room temperature under nitrogen overnight. Water was then added to the reaction solution and extracted three times with dichloromethane. The combined organics were washed twice with water, dried over magnesium sulfate, and evaporated to dryness. Methanol was then added to the oil that remained and the solution was set in a freezer overnight to crystallize after which 6.45 g (68%) of beige crystals were collected and another 1.07 g was obtained from the filtrate for a total yield of 7.52 g (80%). The combined solid was purified by chromatography (silica gel: 95/5 dichloromethane/methanol) and 4.35 g (46%) of off-white crystals of the expected ethylenically unsaturated polymerizable monomer were collected and kept frozen until used for preparation of a reactive polymer.

Synthesis of N-(2-(methacryloxy)ethyl) dimethylmaleimide Monomer

N-(2-hydroxyethyl)maleimide was prepared in toluene from dimethylmaleic anhydride and ethanolamine using conventional methods. N-(2-hydroxyethyl)maleimide (10.15 g) and 6.68 g of triethylamine were dissolved in 100 ml of dichloromethane (DCM). Methacryloyl chloride (7 ml) diluted with DCM was added slowly with stirring to avoid heating. The triethylamine hydrochloride precipitate formed and the reaction solution was held for an additional 6 hours. The reaction solution was washed twice with 200 ml aliquots of dilute sodium bicarbonate, then 2 additional washings were carried out using distilled water and then the phases were allowed to separate. The DCM phase was dried over anhydrous magnesium sulfate. The DCM was evaporated to obtain a clear liquid suitable for polymerization. The expected ethylenically unsaturated monomer structure was confirmed by NMR.

Comparative Examples

Preparation of Comparative Polymer a Using
Methacrylic Acid and
7-(2-Methacryloyloxyethoxy)-4-methylcoumarin
(80:20 mol % Ratio)

4.0 g of methacrylic acid, 3.35 g of 7-(2-methacryloyloxyethoxy)-4-methylcoumarin, and 0.07 g of AMBN polymerization initiator were weighed out into a 100 ml single-neck round-bottom flask, suspended in 29.68 g of N,N-dimethyl acetamide (DMA), and purged with nitrogen for 30 minutes. The flask was capped with a septum and set in a preheated oil bath at 65° C. overnight with magnetic stirring. After about 18 hours, the reaction solution had become clear, colorless, and viscous. The reaction solution was then cooled and the contents of the flask were added to about 500 ml of acetone with overhead stirring. The solid was collected by filtration, any large chunks were crushed using a mortar and pestle and then re-dissolved in DMA at about 20 weight % solids. The solution was precipitated in about 1.6 liters of water and the precipitate was filtered and dried in a vacuum oven. About 5.33 g of a white solid was collected and the desired polymer structure was verified by NMR. The weight average molecular weight ($M_w$) of the resulting polymer was 231,000 as determined by size exclusion chromatography (SEC). A prepared 17.1 weight % solids aqueous solution of the polymer was neutralized at 75 mol % using dimethylethanolamine (DMEA).

Preparation of Copper Ion Polymeric Complex
Using Comparative Polymer A

A 5.0 g solution of copper ion complex was prepared by adding 2.485 g of a 17.1 weight % solution of Comparative Polymer A to 1.643 g of distilled water followed by the addition of 0.614 g of 1 molar copper sulfate added slowly with stirring. A solid blue gummy precipitate formed after the addition of the copper sulfate solution that did not dissolve upon further stirring and was not suitable for coating. This result demonstrates the criticality of the presence of sulfonic acid or sulfonate bearing pendant groups in the polymer to maintain sufficient water-solubility after the polymer is complexed with copper ions.

Preparation of Comparative Polymer B from
3-Sulfopropyl Methacrylate, Methacrylic acid, and
2-Cinnamoyl-ethyl Methacrylate (1:79:20 mol %
ratio)

2.55 g of methacrylic acid, 0.09 g of 3-sulfopropyl methacrylate, 1.95 g of 2-cinnamoyl-ethyl methacrylate, and 0.046 g of AMBN polymerization initiator were weighed out into a 100 ml single-neck round bottom flask and suspended in a solvent mixture of 6.12 g of water, 6.12 g of methyl ethyl ketone, and 6.12 g of isopropyl alcohol. The resulting reaction mixture was purged with nitrogen for 30 minutes and the flask was capped with a septum and set in a preheated oil bath at 70° C. overnight with magnetic stirring. The reaction solution was cooled, additional water was added, and the contents of the flask were placed in a dialysis bag and dialyzed for 3 days. A gel-like precipitate formed during dialysis. A 2 weight % sodium hydroxide solution was added to neutralize 50 mol % of the available acid groups and a clear solution formed that was concentrated to 7.75 weight % solids by evaporation. The weight average molecular weight ($M_w$) of the resulting polymer was 567,000 as determined by size exclusion chromatography (SEC). The precipitation of this polymer during dialysis indicates that the 1 mol % of 3-sulfopropyl methacrylate recurring units was not adequate to maintain the solubility of the resulting polymer without neutralizing some of the acid groups.

Preparation of Comparative Polymeric Copper Ion
Complex B

A 5.0 g solution of the copper ion complex of Comparative Polymer B containing 1 mol % of sulfopropyl recurring units was prepared as follows: 4.125 g of the 7.76 weight % solution were placed in a vial with a magenta stir bar and 0.463 g of 1 molar copper sulfate were added slowly with stirring. A very soft clumpy gel was formed, demonstrating that the level of sulfonate groups in the polymer was insufficient to form a water-soluble polymer-copper ion complex.

Preparation of Comparative Polymer C Using
Methacrylic Acid and
7-(2-Methacryloyloxyethoxy)-4-methylcoumarin
(80:20 mol % Ratio)

4.0 g of methacrylic acid, 3.35 g of 7-(2-methacryloyloxyethoxy)-4-methylcoumarin, and 0.07 g of AMBN polymerization initiator were weighed out into a 100 ml single-neck round-bottom flask, suspended in 29.68 g of N,N-dimethyl acetamide (DMA), and purged with nitrogen for 30 minutes. The flask was capped with a septum and set in a preheated oil bath at 65° C. overnight with magnetic stirring. After about 18 hours, the reaction solution had become clear, colorless, and viscous. The reaction solution was then cooled and the contents of the flask were added to about 500 ml of acetone with overhead stirring. The solid was collected by filtration, any large chunks were crushed using a mortar and pestle and then re-dissolved in DMA at about 20 weight % solids. The solution was precipitated in about 1.6 liters of water and the precipitate was filtered and dried in a vacuum oven. About 5.33 g of a white solid was collected and the desired polymer structure was verified by NMR. The weight average molecular weight ($M_w$) of the resulting polymer was 231,000 as determined by size exclusion chromatography (SEC). A prepared 17.1 weight % solids aqueous solution of the polymer was neutralized at 75 mol % using dimethylethanolamine (DMEA).

Preparation of Comparative Polymeric Copper Ion Complex from Comparative Polymer C A 5.0 g solution of the copper ion complex of Comparative Polymer C derived from only methacrylic acid and 7-(2-methacryloyloxyethoxy)-4-methylcoumarin monomers and no sulfonate-bearing monomer units was prepared as described for the copper ion complex Comparative Polymer A. A solid gel formed that demonstrates that a carboxylate based polymer will not form a soluble copper ion complex when the polymer contains recurring units derived from 7-(2-methacryloyloxyethoxy)-4-methylcoumarin to provide crosslinking and patterning capability.

Preparation of Comparative Polymer D Using 3-Sulfopropylmethacrylate and Methacrylic Acid (10:90 mol % Ratio)

1.50 g of 3-sulfopropyl methacrylate was dissolved in 28 g of distilled water in a 250 ml round bottom flask followed by addition of 4.72 g of methacrylic acid and 28 g of isopropyl alcohol and 0.12 g of AMBN initiator. The reaction mixture was purged with nitrogen for 30 minutes, capped with a septum and set in a preheated oil bath at 70° C. overnight with magnetic stirring. The reaction mixture was cooled and additional water was added and the contents of the flask were placed in a dialysis bag with MWCO of 3500 and dialyzed for about 18 hours. The resulting clear solution was concentrated to 12.41 weight % solids by evaporation. The weight average molecular weight ($M_w$) of the resulting polymer was 294,000 as determined by size exclusion chromatography (SEC).

Preparation of Comparative Polymer E Using 3-Sulfopropyl Methacrylate and Methacrylic Acid (50:50 mol % ratio)

3.75 g of 3-sulfopropyl methacrylate were dissolved in 23 g of distilled water in a 250 ml round-bottom flask followed by addition of 1.30 g of methacrylic acid, 23 g of isopropyl alcohol, and 0.10 g of AMBN initiator. The reaction mixture was purged with nitrogen for 30 minutes, capped with a septum, and set in a preheated oil bath at 70° C. overnight with magnetic stirring. The reaction mixture was cooled and additional water was added and the contents of the flask were placed in a dialysis bag with MWCO of 3500 and dialyzed for about 18 hours. The resulting clear solution was concentrated to 13.04 weight % solids by evaporation. The weight average molecular weight ($M_w$) of the resulting polymer was 113,000 as determined by size exclusion chromatography (SEC).

Preparation of Comparative Polymeric Copper Ion Complexes from Comparative Polymers D and E 0.49 g of a 1 molar copper sulfate solution was added slowly with stirring to a quantity of each of Comparative Polymers D and E to prepare 8.5 weight % polymer solutions. Clear solutions were formed and 0.5 weight % of TERGITOL® 15-S-9 surfactant was added to each clear solution to aid coating. Each of the resulting solutions was filtered with a 1 μm glass filter, coated on a substrate, and photoexposed as described below.

Preparation of Comparative Polymeric Copper Nanoparticle Complexes from Comparative Polymers D and E 0.49 g of a 1 molar copper sulfate solution was added slowly with stirring to a quantity of each of Comparative Polymers D and E to prepare 8.5 weight % polymer solutions. To each solution, 0.126 g of a 4 weight % dimethylamine borane (DMAB) solution was added with good stirring. Each solution immediately turned a red-brown color after 15 to 30 minutes of heating at 50° C., indicative of the surface plasmon resonance absorption from copper nanoparticles. Then, 0.5 weight % TERGITOL® 15-S-9 surfactant was added to aid coating and each solution was filtered with a 1 μm glass filter, coated onto a substrate, and photoexposed as described below.

Coating and Patterning of Comparative Polymers D and E

A coatable formulation of each of Comparative Polymers D and E was prepared by diluting each Comparative Polymer to 8.5 weight % solids with distilled water and then 0.5 weight % TERGITOL® 15-S-5 surfactant. Each of the formulations was spin coated at 3000 rpm onto an acrylic layer-subbed poly(ethylene terephthalate) substrate. Samples of each coated formulation was allowed to age for 30 minutes, then photoexposed through a chrome-on-quartz mask with lines and features down to 1 μm line-width with a broad band UV lamp with a 260 to 320 nm dichroic bandpass filter for various times ranging from 2 to 120 seconds. Samples of each photoexposed coating was then allowed to age at room temperature for about 30 minutes and were then heated for 1 minute on a 60° C. vacuum hotplate. Each aged coating was then immersed in agitated distilled water bath for 2 minutes to remove the non-exposed polymer from the substrate. No pattern was observed on any of the photoexposed coatings of all formulations because all of the coated polymer, whether photoexposed or non-exposed was removed from the substrate during the 2 minute distilled water washing, indicating that no significant crosslinking occurred in these polymers during photoexposure. These Comparative Examples show that since the Comparative Polymers do not contain [2+2] photocycloaddition groups such as 2-cinnamoyl-ethyl methacrylate, 7-(2-methacryloyloxyethoxy)-4-methylcoumarin, and others described above cannot form water-insoluble polymeric patterns when exposed to UV light.

Coating and Patterning of Copper Ion and Copper Nanoparticle Complexes of Comparative Copolymers D and E The polymeric copper ion and copper nanoparticle complexes described above were coated and exposed identically to the polymer-only formulations described above. All of the copper-containing polymeric complexes, whether photoexposed or non-exposed were washed off the substrate and did not form any pattern, again indicating that it is an essential requirement that the polymers in the copper-containing complexes contain recurring units having crosslinkable pendant groups that can undergo [2+2] photocycloaddition upon exposure to UV light.

Preparation of Comparative Polymer F Using Vinyl Phosphonic Acid with 7-(2-Methacryloyloxyethoxy)-4-methylcoumarin (80:20 mol % Ratio)

3.0 g of vinyl phosphonic acid, 2.0 g of 7-(2-methacryloyloxyethoxy)-4-methylcoumarin, and 0.05 g of AMBN initiator were weighed out in a 100 ml single-neck round-bottom flask, dissolved in 23 g of N—N-dimethylacetamide (DMA), purged with nitrogen for 30 minutes, capped with a septum, and set in a preheated oil bath at 75° C. overnight with magnetic stirring. After about 18 hours, the reaction mixture was clear, colorless, and viscous. The reaction mixture was cooled and additional water was added and the contents of the flask were placed in a dialysis bag with MWCO of 3500 and dialyzed for about 18 hours. The resulting polymer precipitated during dialysis. The precipitate was filtered and the solid was dried in a vacuum oven. An attempt was made to solubilize the precipitate by neutralizing the phosphonic acid groups with sodium hydroxide, but the resulting dispersion was unstable and settled out. The weight average molecular weight ($M_w$) of the polymer was 13,700 as determined by size exclusion chromatography (SEC).

Preparation of Comparative Polymer G Using Vinyl Phosphonic Acid and 2-Cinnamoyl-ethyl Methacrylate (80:20 mol % Ratio)

2.16 g of vinyl phosphonic acid was placed in a 100 ml single-neck round-bottom flask with 6.53 g of distilled water, 6.53 g of MEK, and 6.53 g of IPA followed by 0.034 g of AMBN initiator and 1.30 g of 2-cinnamoyl-ethyl methacrylate. The reaction mixture was then purged with nitrogen for 30 minutes, capped with a septum, and set in a preheated oil bath at 70° C. overnight with magnetic stirring. After about 18 hours, the reaction mixture was clear, colorless, and viscous. The reaction mixture was cooled and the contents of the flask were placed in a dialysis bag with MWCO of 3500 and dialyzed for about 18 hours. The resulting polymer precipitated during dialysis. The precipitate was filtered and the solid was dried in a vacuum oven. The precipitate was soluble in dimethyl formamide (DMF) but was not soluble in a sodium hydroxide solution.

The poor solubility of Comparative Polymers F and G show that phosphonic acid groups do not impart adequate solubility to the polymers and therefore the pendant sulfonic acid or sulfonate groups described above are critical to the formation of stable aqueous solutions of the reactive polymers according to this invention that contain suitable pending crosslinking groups as described above.

Preparation of Comparative Polymer H Using Vinyl Phosphonic Acid, Methacrylic Acid, and 7-(2-Methacryloyloxyethoxy)-4-methylcoumarin (50:30:20 mol % Ratio)

2.0 g of vinyl phosphonic acid, 0.96 g of methacrylic acid, 2.13 g of 7-(2-methacryloyloxyethoxy)-4-methylcoumarin, and 0.05 g of AMBN initiator were weighed out into a 250 ml single-neck round-bottom flask and dissolved in 23 g of N—N-dimethyl acetamide (DMA), then purged with nitrogen for 30 minutes, capped with a septum, and set in a preheated oil bath at 75° C. overnight with magnetic stirring. After about 18 hours, the reaction mixture was clear, colorless, and viscous. As the reaction mixture was cooled, the polymer precipitated in water, and was filtered and dried in a vacuum oven. An 11% aqueous solution was made by addition of a 5 weight % sodium hydroxide solution adequate to neutralize the phosphonic acid monomer units. The weight average molecular weight ($M_w$) of the resulting polymer was 61,700 as determined by size exclusion chromatography (SEC).

Preparation of Comparative Polymer I using vinyl phosphonic Acid, methacrylic Aacid, and 2-cinnamoyl-ethyl methacrylate (50:30:20 mol % Ratio)

2.7 g of vinyl phosphonic acid, 1.3 g of methacrylic acid, 2.60 g of 2-cinnamoylethyl methacrylate, and 0.066 g of AMBN initiator were placed in a 100 ml single-neck round-bottom flask with 8.80 g of distilled water, 8.80 g of MEK, and 8.80 g of isopropyl alcohol. The reaction solution was then purged with nitrogen for 30 minutes, capped with a septum, and set in a preheated oil bath at 70° C. overnight with magnetic stirring. After about 18 hours, the reaction mixture was clear, colorless, and viscous. The reaction mixture was cooled and the contents of the flask were placed in a dialysis bag with MWCO of 3500 and dialyzed for about 18 hours. The resulting polymer precipitated during dialysis. The precipitate was filtered and the solid was dried in a vacuum oven. An aqueous solution at 13.5 weight % polymer was prepared by adding enough 45% KOH to neutralize both the pendant methacrylic acid and the phosphonic acid groups. The weight average molecular weight ($M_w$) of the resulting polymer was 111,000 as determined by size exclusion chromatography (SEC).

Preparation of Comparative Polymeric Copper Ion Complexes from Comparative Polymers H and I A copper ion complex of each of Comparative Polymers H and I containing recurring units derived from vinyl phosphonic acid in place of recurring units derived from sulfonic acid according to the present invention were prepared as described above for the copper ion complex of Comparative Polymer A. A non-filterable sticky blue gel was formed using each of Comparative Polymers H and I, demonstrating that the pendant phosphonic acid groups, even when combined with pendant neutralized carboxylic acid groups do not provide water soluble copper ion complexes and therefore cannot be used according to the present invention to provide stable water-soluble polymeric copper ion complexes.

Preparation of Comparative Polymer J Using N-vinyl-2-pyrrolidone and 7-(2-Methacryloyloxyethoxy)-4-methylcoumarin (80:20 mol % Ratio)

3.0 g of N-vinyl-2-pyrrolidone, 1.95 g of 7-(2-methacryloyloxyethoxy)-4-methylcoumarin, and 0.05 g of AMBN polymerization initiator were weighed out into a 100 ml single-neck round bottom flask, suspended in 17 ml of tetrahydrofuran (THF), and purged with nitrogen for 30 minutes. The flask was capped with a septum and set in a preheated oil bath at 65° C. overnight with magnetic stirring. After about 18 hours, the reaction mixture was clear, colorless, and viscous. The reaction mixture was cooled and the contents of the flask were added to about 500 ml of heptanes to precipitate the polymer. The polymer was collected by filtration and dried in a vacuum oven. About 4.5 g of solid was collected that was not soluble in water, dichloromethane (DCM), or N,N-dimethylacetamide (DMA).

Preparation of Comparative Polymer K Using N-Vinyl-2-pyrrolidone, Methacrylic Acid, and 7-(2-Methacryloyloxyethoxy)-4-methylcoumarin (50:30:20 mol % Ratio)

2.0 g of N-vinyl-2-pyrrolidone, 0.93 g of methacrylic acid, 2.08 g of 7-(2-methacryloyloxyethoxy)-4-methylcoumarin, and 0.05 g of AMBN polymerization initiator were weighed out into a 100 ml single neck round bottom flask, suspended in 17 ml of tetrahydrofuran (THF), and purged with nitrogen for 30 minutes. The flask was capped with a septum and set in a preheated oil bath at 65° C. overnight with magnetic stirring. After about 18 hours the reaction mixture was clear, colorless, and viscous. The reaction solution was cooled and the contents of the flask were added to about 500 ml of heptane to precipitate the polymer that was collected by filtration and dried in a vacuum oven. The resulting solid was not soluble in water, 20 weight % potassium hydroxide solution, cyclopentanone, ethyl acetate, diethyl ether, methanol, dichloromethane (DCM), or N,N-dimethylacetamide (DMA).

While poly(vinyl pyrrolidone) polymers such as Comparative Polymers J and K are generally soluble in water, the presence of crosslinkable recurring units containing pendant [2+2] photocycloaddition groups will cause the polymers to become insoluble in water. It is thus critical as shown below that the incorporation of pendant sulfonic acid and sulfonate groups in the polymers impart water-solubility and coatability while the noted crosslinkable groups and silver ions or silver nanoparticles that can dramatically reduce water-solubility of the polymers.

Preparation of Comparative Polymer L using Acrylamide and 2-Cinnamoyl-ethyl methacrylate (80:20 mol % Ratio)

2.16 g of acrylamide, 1.98 g of 2-cinnamoyl-ethyl methacrylate, and 0.088 g of AMBN initiator were placed in a 250 ml single-neck round-bottom flask with 12.54 g of distilled water, 12.54 g of MEK, and 12.54 g of isopropyl alcohol. The reaction mixture was then purged with nitrogen for 30 minutes, capped with a septum, and set in a preheated oil bath at 70° C. overnight with magnetic stirring. After about 18 hours, the reaction mixture was cloudy. The reaction mixture was cooled and the contents of the flask were placed in a dialysis bag with MWCO of 3500 and dialyzed for about 18 hours. The resulting polymer precipitated during dialysis and the precipitate was not soluble in water.

Preparation of Comparative Polymer M using Acrylamide, Methacrylic Acid, and 2-Cinnamoylethyl Methacrylate (70:10:20 mol % Ratio)

0.32 g of methacrylic acid, 1.87 g of acrylamide, 1.95 g of 2-cinnamoylethyl methacrylate, and 0.041 g of AMBN initiator were placed in a 250 ml single-neck round-bottom flask with 7.82 g of distilled water, 7.82 g of MEK, and 7.82 g of isopropyl alcohol. The reaction mixture was then purged with nitrogen for 30 minutes, capped with a septum, and set in a preheated oil bath at 70° C. overnight with magnetic stirring. After about 18 hours, the reaction mixture was clear and viscous. The reaction mixture was cooled and water was added to the contents causing the polymer to precipitate. Addition of base adequate to neutralize the pendant carboxylic acid groups was not able to solubilize the polymer.

The water-insolubility of Comparative Polymers L and M demonstrate that although polymers containing recurring units derived from acrylamide are generally soluble in water, the presence of the recurring units containing crosslinkable [2+2] photocycloaddition groups as described above makes the polymers water-insoluble. Therefore, it is demonstrated below that it is essential to include at least some pendant sulfonic acid or sulfonate groups in the polymers to maintain water solubility and coatability in the presence of both the [2+2] photocycloaddition groups and the complexed copper ions or copper metal or oxide nanoparticles that all can dramatically reduce the water solubility of the polymer.

The following identifiers of ethylenically unsaturated polymerizable monomers are used below in TABLES I and II.

TABLE I summaries properties of the Comparative Polymers described above that are outside the present invention in that they do not contain the essential pendant [2+2] photocycloaddition groups or they contain 1 mol % or less of pendant sulfonic acid or sulfonate groups. Thus, these Comparative Polymers will either not suitably crosslink upon photoexposure or they will not have suitable water-solubility as a polymer or in the resulting copper ion polymeric complexes. Thus, they cannot be used for coating and patterning as described for the present invention.

Water-Soluble Monomers:
Methacrylic Acid (MA);
Acrylamide (AA);
N-vinyl pyrrolidone (VP);
Vinyl phosphonic acid (VPH);
3-Sulfopropyl methacrylate (SPMA);
Styrene sulfonic acid (SS);
2-Acrylamido-2-methyl-1-propanesulfonic acid (AMPS);
2-Hydroxyethyl methacrylate (HEM); and
Maleic anhydride (MD).

Monomers with [2+2] Photocycloaddition Groups:
2-Cinnamoyl-ethyl methacrylate (CIN);
7-(2-Methacryloyloxyethoxy)-4-methylcoumarin (COUM);
2-(2,3-Diphenyl-2-cyclopropene-1-carboxyl)-ethyl methacrylate (DPCP); and
N-(2-(methacryloxy)ethyl) dimethylmaleimide (DMMI).

TABLE I

Summary of Performance for Comparative Polymers

| Polymer | Water-soluble Monomer(s) | Crosslinkable Monomer | Monomer ratios | Polymer Properties |
| --- | --- | --- | --- | --- |
| Comparative A | MA | CIN | 80:20 | Water-insoluble polymeric copper ion complex |
| Comparative B | SPMA, MA | CIN | 1:79:20 | Water-insoluble polymeric copper ion complex |
| Comparative C | MA | COUM | 80:20 | Water-insoluble polymeric copper ion complex |

TABLE I-continued

Summary of Performance for Comparative Polymers

| Polymer | Water-soluble Monomer(s) | Cross-linkable Monomer | Monomer ratios | Polymer Properties |
|---|---|---|---|---|
| Comparative D | SPMA, MA | none | 10:90 | Not patternable; no crosslinking |
| Comparative E | SPMA, MA | None | 50:50 | Not patternable; no crosslinking |
| Comparative F | VPH | COUM | 80:20 | Water-insoluble polymer |
| Comparative G | VPH | CIN | 80:20 | Water-insoluble polymer |
| Comparative H | VPH, MA | COUM | 50:30:20 | Water-insoluble polymeric copper ion complex |
| Comparative I | VPH, MA | CIN | 50:30:20 | Water-insoluble polymeric copper ion complex |
| Comparative J | VP | COUM | 80:20 | Water-insoluble polymer |
| Comparative K | VP, MA | COUM | 50:30:20 | Water-insoluble polymer |
| Comparative L | AA | CIN | 80:20 | Water-insoluble polymer |
| Comparative M | AA, MA | CIN | 70:10:20 | Water-insoluble polymer |

Invention Examples

Preparation of Inventive Reactive Polymer A Using 3-Sulfopropyl Methacrylate, Methacrylic Acid, and 2-Cinnamoyl-ethyl Methacrylate (2:78:20 mol % Ratio)

2.52 g of methacrylic acid, 0.18 g of 3-sulfopropyl methacrylate, 1.95 g of 2-cinnamoyl-ethyl methacrylate, and 0.047 g of AMBN polymerization initiator were weighed out into a 100 ml single-neck round-bottom flask and suspended in a solvent mixture of 6.2 g of water, 6.2 g of methyl ethyl ketone, and 6.2 g of isopropyl alcohol. The reaction solution was purged with nitrogen for 30 minutes. The flask was capped with a septum and set into a preheated oil bath at 70° C. overnight with magnetic stirring. The reaction solution was then cooled, additional water was added, and the contents of the flask were placed in a dialysis bag with MWCO (Molecular Weight Cut Off) of 3500 and dialyzed for about 18 hours. The resulting clear solution was concentrated to 12.99 weight % solids by evaporation. The weight average molecular weight ($M_w$) of the resulting Inventive reactive polymer was 1,110,000 as determined by size exclusion chromatography (SEC).

Preparation of Inventive Reactive Polymer B Using 3-Sulfopropyl Methacrylate, Methacrylic Acid, and 2-Cinnamoyl-ethyl Methacrylate (5:75:20 mol % Ratio)

2.42 g of methacrylic acid, 0.46 g of 3-sulfopropyl methacrylate, 1.95 g of 2-cinnamoyl-ethyl methacrylate, and 0.048 g of AMBN polymerization initiator were weighed out into a 100 ml single-neck round-bottom flask and suspended in a solvent mixture of 6.44 g of water, 6.44 g of methyl ethyl ketone, and 6.44 g of isopropyl alcohol. The reaction solution was purged with nitrogen for 30 minutes. The flask was capped with a septum and set into a preheated oil bath at 70° C. overnight with magnetic stirring. The reaction solution was cooled, additional water was added, and the contents of the flask were placed in a dialysis bag with MWCO of 3500 and dialyzed for about 18 hours. The resulting clear solution was concentrated to 14.33 weight % solids by evaporation. The weight average molecular weight ($M_w$) of the resulting Inventive reactive polymer was 631,000 as determined by size exclusion chromatography (SEC).

Preparation of Inventive Reactive Polymer C Using 3-Sulfopropyl Methacrylate Potassium Salt, Methacrylic Acid, and 2-Cinnamoyl-ethyl Methacrylate (10:70:20 mol % Ratio)

In a 100 ml single-neck round bottom flask, 0.92 g of 3-sulfopropyl methacrylate potassium salt, 2.26 g of methacrylic acid, 1.95 g of 2-cinnamoyl-ethyl methacrylate, and 51 mg of AMBN polymerization initiator were dissolved in a solvent mixture of 6.84 g of water, 6.84 g of methyl ethyl ketone (MEK), and 6.84 g of isopropyl alcohol (IPA). The reaction solution was purged with nitrogen and the flask was capped with a septum and set into a preheated oil bath at 75° C. overnight. The reaction mixture was then cooled and placed in a dialysis bag with MWCO of 3500 and dialyzed until the bag was fully swollen. The contents were then evaporated to a concentration of 12.76 weight % solids. The weight average molecular weight ($M_w$) of the resulting Inventive reactive polymer was 219,000 as determined by size exclusion chromatography (SEC).

Preparation of Inventive Reactive Polymer D from 3-Sulfopropyl Methacrylate Potassium Salt, Methacrylic Acid, and 2-Cinnamoyl-ethyl Methacrylate (30:50:20 mol % Ratio)

In a 100 ml single-neck round bottom flask 2.77 g of 3-sulfopropyl methacrylate potassium salt, 1.61 g of methacrylic acid, 1.95 g of 2-cinnamoyl-ethyl methacrylate, and 63 mg of AMBN polymerization initiator were dissolved in a solvent mixture consisting of 17.94 g of water, 6.10 g of methyl ethyl ketone (MEK), and 11.84 g of isopropyl alcohol (IPA). The reaction solution was purged with nitrogen and the flask was capped with a septum and set into a preheated oil bath at 70° C. overnight. The reaction mixture was then cooled and placed in a dialysis bag with MWCO of 3500 and dialyzed until the bag was fully swollen. The contents were then evaporated to a concentration of 19.07 weight % solids. The weight average molecular weight ($M_w$) of the resulting Inventive reactive polymer was 180,000 as determined by size exclusion chromatography (SEC).

Preparation of Inventive Reactive Polymer E from 3-Sulfopropyl Methacrylate potassium salt, Methacrylic Acid, and 2-Cinnamoyl-ethyl Methacrylate (50:30:20 mol % Ratio)

In a 100 ml single-neck round bottom flask 3.08 g of 3-sulfopropyl methacrylate potassium salt, 0.65 g of methacrylic acid, 1.30 g of 2-cinnamoyl-ethyl methacrylate, and 61 mg of AMBN polymerization initiator were dissolved in a solvent mixture of 14.25 g of water, 4.85 g of methyl ethyl ketone (MEK), and 9.41 g of isopropyl alcohol (IPA). The reaction solution was purged with nitrogen and the flask was capped with a septum and set into a preheated oil bath at 70° C. overnight. The reaction solution was cooled and placed in a dialysis bag with MWCO of 3500 and dialyzed until the bag was fully swollen. The contents were then evaporated to a concentration of 18.9 weight % solids. The weight average molecular weight ($M_w$) of the resulting Inventive reactive polymer was 160,000 as determined by size exclusion chromatography (SEC).

Preparation of Inventive Reactive Polymer F from 3-Sulfopropyl Methacrylate Potassium Salt and 2-Cinnamoyl-ethyl Methacrylate (80:20 mol % Ratio)

4.93 g of 3-sulfopropyl methacrylate potassium salt were dissolved in 8.25 g of water in a 100 ml single-neck round bottom flask followed by addition of 8.25 g of dimethylacetamide (DMA), 8.42 g of isopropyl alcohol (IPA), 61 mg of AMBN polymerization initiator, and 1.30 g of 2-cinnamoyl-ethyl methacrylate. The resulting reaction solution was purged with nitrogen and the flask was capped with a septum and set in a preheated oil bath at 75° C. overnight. The reaction solution was cooled and placed in a dialysis bag with MWCO of 3500 and dialyzed until the bag was fully swollen. The contents were then evaporated to a concentration of 19.8 weight % solids. The average molecular weight ($M_w$) of the resulting Inventive reactive polymer was determined to be 138,000 by size exclusion chromatography (SEC).

Preparation of Inventive Reactive Polymer G using 3-Sulfopropyl Methacrylate Potassium Salt, Methacrylic acid, and 7-(2-Methacryloyloxyethoxy)-4-methylcoumarin (10:70:20 mol % Ratio)

3.65 g of 3-sulfopropyl methacrylate potassium salt, 2.15 g of methacrylic acid and 2.88 g of 7-(2-methacryloyloxyethoxy)-4-methylcoumarin monomers were weighed out into a 250 ml single-neck round-bottom flask dissolved in a solvent mixture of 14 g water, 14 g of dimethylacetamide (DMA), and 5.3 g of isopropyl alcohol. 0.09 g of AMBN polymerization initiator was added and nitrogen was bubbled through the slurry for 60 minutes before heating in an oil bath at 65° C. for about 18 hours. The solution reaction was cooled and diluted with water to form a clear solution. The reaction solution was then dialyzed for about 18 hours and then concentrated to a 15.05 weight % solids solution that was suitable for coating. The weight average molecular weight ($M_w$) of the resulting Inventive reactive polymer was 422,000 as determined by size exclusion chromatography (SEC).

Preparation of Inventive Reactive Polymer H Using 3-Sulfopropyl Methacrylate Potassium Salt, Methacrylic Acid, and 7-(2-Methacryloyloxyethoxy)-4-methylcoumarin (30:50:20 mol % Ratio)

1.43 g of 3-sulfopropyl methacrylate potassium salt, 3.50 g of methacrylic acid, and 3.35 g of 7-(2-methacryloyloxyethoxy)-4-methylcoumarin monomers were weighed out into a 100 ml single-neck round-bottom flask dissolved in a solvent mixture of 11 g water, 11 g of dimethylacetamide (DMA), and 8.25 g of isopropyl alcohol. 0.08 g of AMBN polymerization initiator was added and nitrogen was bubbled through the slurry for 30 minutes before heating it in an oil bath at 65° C. for about 18 hours. The reaction solution was cooled and diluted with water to form a clear solution. The reaction solution was dialyzed for about 60 hours and then concentrated to an 11.4 weight % solids solution that was suitable for coating. The weight average molecular weight ($M_w$) of the resulting Inventive reactive polymer was 800,000 as determined by size exclusion chromatography (SEC).

Preparation of Inventive Reactive Polymer I Using 3-Sulfopropyl Methacrylate Potassium Salt, Methacrylic Acid, and 7-(2-Methacryloyloxyethoxy)-4-methylcoumarin (50:30:20 mol % Ratio)

4.93 g of 3-sulfopropyl methacrylate potassium salt, 1.03 g of methacrylic acid, and 2.31 g of 7-(2-methacryloyloxyethoxy)-4-methylcoumarin monomers were weighed out in a 250 ml single-neck round-bottom flask dissolved in a solvent mixture of 11 g water, 11 g of dimethylacetamide (DMA), and 8.25 g of isopropyl alcohol. 0.08 g of AMBN polymerization initiator was added and nitrogen was bubbled through the slurry for 60 minutes before heating it in an oil bath at 65° C. for about 18 hours. The reaction solution was cooled and diluted with water to form a clear solution. The reaction solution was then dialyzed for about 60 hours and then concentrated to a 12.17 weight % solids solution that was suitable for coating. The weight average molecular weight ($M_w$) of the resulting Inventive reactive polymer was 414,000 as determined by size exclusion chromatography (SEC).

Preparation of Inventive Reactive Polymer J from 3-Sulfopropyl Methacrylate Potassium Salt and 7-(2-Methacryloyloxyethoxy)-4-methylcoumarin (80:20 mol % Ratio)

10.0 g of 3-sulfopropyl methacrylate potassium salt and 2.93 g of 7-(2-methacryloyloxyethoxy)-4-methylcoumarin were weighed out into a 250 ml single-neck round-bottom flask and dissolved in a solvent mixture of 22 g of water, 22 g of dimethylacetamide (DMA), and 11 g of isopropyl alcohol. The reaction solution was purged with nitrogen, 0.13 g of AMBN polymerization initiator was added, and nitrogen was bubbled through the slurry for 60 minutes before heating it in an oil bath at 67° C. for about 18 hours. The reaction solution was cooled and diluted with water to form a clear solution. The reaction solution was then dialyzed for about 18 hours, cooled, and concentrated to 14.8 weight % solids solution that was slightly hazy but suitable for coating. The weight average molecular weight ($M_w$) of the resulting Inventive reactive polymer was determined to be 469,000 by size exclusion chromatography (SEC).

Preparation of Inventive Reactive Polymer K Using Styrene Sulfonic Acid Sodium Salt and 7-(2-Methacryloyloxyethoxy)-4-methylcoumarin (80:20 mol % Ratio)

6.15 g of styrene sulfonic acid sodium salt and 2.15 g of 7-(2-methacryloyloxyethoxy)-4-methylcoumarin were weighed out into a 100 ml single-neck round bottom flask and dissolved in a solvent mixture of 11 g water, 11 g of dimethylacetamide (DMA), and 8.25 g of isopropyl alcohol. The reaction solution was purged with nitrogen, and 0.08 g of AMBN polymerization initiator was added and nitrogen was bubbled through the slurry for 60 minutes before heating it in an oil bath at 67° C. for about 18 hours. The reaction solution was cooled and diluted with water to form a clear solution. The reaction solution was dialyzed for about 60 hours and then concentrated to a 13.06 weight % solids solution that was suitable for coating. The weight average molecular weight ($M_w$) of the resulting Inventive reactive polymer was 258,000 as determined by size exclusion chromatography (SEC).

Preparation of Inventive Reactive Polymer L Using Styrene Sulfonic Acid Sodium Salt, Methacrylic Acid, and 7-(2-Methacryloyloxyethoxy)-4-methylcoumarin (50:30:20 mol % Ratio)

4.50 g of styrene sulfonic acid sodium salt, 1.13 g of methacrylic acid, and 2.52 g of 7-(2-methacryloyloxyethoxy)-4-methylcoumarin were weighed out in a 250 ml single-neck round-bottom flask dissolved in a solvent mixture of 12 g of water, 12 g of dimethylacetamide (DMA), and 4.15 g of isopropyl alcohol. 0.08 g of AMBN polymerization initiator was added and nitrogen was bubbled through the slurry for 30 minutes before heating in an oil bath at 65° C. for about 18 hours. The reaction mixture was cooled and diluted with water to form a clear solution. The reaction solution was dialyzed for about 18 hours and then concentrated to a 15.53 weight % solids solution that was suitable for coating. The weight average molecular weight ($M_w$) of the resulting Inventive reactive polymer was 437,000 as determined by size exclusion chromatography (SEC).

Preparation of Inventive Reactive Polymer M Using 2-Acrylamido-2-methyl-1-propanesulfonic Acid and 7-(2-Methacryloyloxyethoxy)-4-methylcoumarin (80:20 mol % Ratio)

6.15 g of 2-acrylamido-2-methyl-1-propanesulfonic acid and 2.14 g of 7-(2-methacryloyloxyethoxy)-4-methylcoumarin were weighed out into a 100 ml single neck round bottom flask and dissolved in a solvent mixture of 11 g water, 11 g of dimethylacetamide (DMA), and 8.25 g of isopropyl alcohol. The reaction solution was purged with nitrogen, 0.08 g of AMBN polymerization initiator were added, and nitrogen was bubbled through the slurry for 60 minutes before heating it in an oil bath at 67° C. for about 18 hours. The reaction solution was cooled and diluted with water to form a clear solution that was dialyzed for about 60 hours and then concentrated to a 15.68 weight % solids solution that was suitable for coating. The weight average molecular weight ($M_w$) of the resulting Inventive reactive polymer was 48,900 as determined by size exclusion chromatography (SEC).

Preparation of Inventive Reactive Polymer N Using 2-Acrylamido-2-methyl-1-propanesulfonic acid, Methacrylic Acid, and 7-(2-Methacryloyloxyethoxy)-4-methylcoumarin (50:30:20 mol % Ratio)

4.50 g of 2-acrylamido-2-methyl-1-propanesulfonic acid, 1.12 g of methacrylic acid, and 2.5 g of 7-(2-methacryloyloxyethoxy)-4-methylcoumarin monomers were weighed out in a 250 ml single-neck round-bottom flask dissolved in a solvent mixture of 11 g of water, 11 g of dimethylacetamide (DMA), and 4.5 g of isopropyl alcohol. The reaction mixture was purged with nitrogen, 0.08 g of AMBN polymerization initiator was added, and nitrogen was bubbled through the slurry for 30 minutes before heating in an oil bath at 65° C. for about 18 hours. The reaction solution was cooled and diluted with water to form a clear solution. The reaction solution was dialyzed for about 18 hours and then concentrated to a 14.41 weight % solids solution that was suitable for coating. The weight average molecular weight ($M_w$) of the resulting Inventive reactive polymer was 322,000 as determined by size exclusion chromatography (SEC).

Preparation of Inventive Reactive Polymer O Using 2-Acrylamido-2-methyl-1-propanesulfonic acid and 2-Cinnamoyl-ethyl methacrylate (80:20 mol % Ratio)

4.15 g of 2-acrylamido-2-methyl-1-propanesulfonic acid, 1.30 g of 2-cinnamoyl-ethyl methacrylate monomer, and 0.027 g of AMBN polymerization initiator were weighed out in a 100 ml single-neck round-bottom flask and dissolved in a solvent mixture of 5.45 g of water, 5.45 g of methyl ethyl ketone (MEK), and 4.45 g of isopropyl alcohol. Nitrogen was bubbled through the reaction solution for 30 minutes before heating in an oil bath at 70° C. for about 18 hours. The reaction solution was cooled and diluted with water to forming a cloudy solution. The reaction solution was dialyzed for about 18 hours and then concentrated to a 15.98 weight % solids solution that was suitable for coating. The weight average molecular weight ($M_w$) of the Inventive reactive polymer was 51,800 as determined by size exclusion chromatography (SEC).

Preparation of Inventive Reactive Polymer P Using 2-Acrylamido-2-methyl-1-propanesulfonic acid, Methacrylic Acid, and 2-Cinnamoyl-ethyl methacrylate (50:30:20 mol % Ratio)

2.59 g of 2-acrylamido-2-methyl-1-propanesulfonic acid, 0.65 g of methacrylic acid, 1.30 g of 2-cinnamoyl-ethyl methacrylate monomer, and 0.045 g of AMBN polymerization initiator were weighed out in a 100 ml single-neck round-bottom flask and dissolved in a solvent mixture of 8.58 g of water, 8.58 g of methyl ethyl ketone (MEK), and 8.58 g of isopropyl alcohol. Nitrogen was bubbled through the reaction solution for 30 minutes before heating it in an oil bath at 70° C. for about 18 hours. The reaction solution was cooled and diluted with water to forming a clear solution. The reaction solution was then dialyzed for about 18 hours and concentrated to an 18.64 weight % solids solution that was suitable for coating. The weight average molecular weight ($M_w$) of the Inventive reactive polymer was 62,200 as determined by size exclusion chromatography (SEC).

Preparation of Inventive Polymer Q Using 3-Sulfopropyl Methacrylate Potassium Salt, N-vinyl-2-pyrrolidone, and 7-(2-Methacryloyloxyethoxy)-4-methylcoumarin (50:30:20 mol % Ratio)

4.93 g of 3-sulfopropyl methacrylate potassium salt, 1.33 g of N-vinyl-2-pyrrolidone, and 2.31 g of 7-(2-methacryloyloxyethoxy)-4-methylcoumarin were weighed out in a 250 ml single-neck round-bottom flask and dissolved in a solvent mixture of 11 g of water, 11 g of dimethyl acetamide (DMA), and 8.25 g of isopropyl alcohol. Then, 0.09 g of AMBN polymerization initiator was added and nitrogen was bubbled through the slurry for 60 minutes before heating it in an oil bath at 65° C. for about 18 hours. The reaction solution was cooled and diluted with water to form a clear solution that was dialyzed for about 24 hours and then concentrated to a 12.56 weight % solids solution that was suitable for coating. The weight average molecular weight ($M_w$) of the resulting Inventive reactive polymer was 112,000 as determined by size exclusion chromatography (SEC).

Preparation of Inventive Polymer R Using 3-Sulfopropyl Methacrylate Potassium Salt, N-vinyl-2-pyrrolidone, Methacrylic Acid, and 7-(2-Methacryloyloxyethoxy)-4-methylcoumarin (20:30:30:20 mol % Ratio)

1.04 g of 3-sulfopropyl methacrylate potassium salt, 0.70 g of N-vinyl-2-pyrrolidone, 0.55 g of methacrylic acid, and 1.22 g of 7-(2-methacryloyloxyethoxy)-4-methylcoumarin were weighed out into a 250 ml single-neck round-bottom flask and dissolved in a solvent mixture of 4.5 g of water, 5.5 g of dimethyl acetamide (DMA), and 4.13 g of isopropyl alcohol. Then, 0.04 g of AMBN polymerization initiator was added and nitrogen was bubbled through the slurry for 60 minutes before heating it in an oil bath at 65° C. for about 18 hours. The reaction solution was cooled and diluted with water to form a clear solution that was dialyzed for about 24 hours and then concentrated to an 11.46 weight % solids solution that was suitable for coating. The weight average molecular weight ($M_w$) of the resulting Inventive reactive polymer was 608,000 as determined by size exclusion chromatography (SEC).

Preparation of Inventive Reactive Polymer S Using 3-Sulfopropyl Methacrylate Potassium Salt, 2-Hydroxyethyl Methacrylate, and 7-(2-Methacryloyloxyethoxy)-4-methylcoumarin (50:30:20 mol % Ratio)

4.00 g of 3-sulfopropyl methacrylate potassium salt was dissolved in 10 g of distilled water in a 250 ml single-neck round-bottom flask, followed by addition of 1.27 g of 2-hydroxyethyl methacrylate and 10 g of isopropyl alcohol. Then, 1.87 g of 7-(2-methacryloyloxyethoxy)-4-methylcoumarin monomer and 10 g of dimethylacetamide (DMA) were added, followed by 0.07 g of AMBN polymerization initiator. Nitrogen was bubbled through the slurry for 30 minutes before heating it in an oil bath at 65° C. for about 18 hours. The reaction solution was cooled and diluted with water to form a clear solution. The reaction solution was then dialyzed for about 18 hours in distilled water and concentrated to a 14.94 weight % solids solution that was suitable for coating. The weight average molecular weight ($M_w$) of the resulting Inventive reactive polymer was 269,000 as determined by size exclusion chromatography (SEC).

Preparation of Inventive Reactive Polymer T Using 3-Sulfopropyl Methacrylate Potassium Salt, 2-Hydroxyethyl Methacrylate, and 7-(2-Methacryloyloxyethoxy)-4-methylcoumarin (10:70:20 mol % Ratio)

1.00 g of 3-sulfopropyl methacrylate potassium salt was dissolved in 10 g of distilled water in a 250 ml single-neck round-bottom flask, followed by addition of 3.7 g of 2-hydroxyethyl methacrylate, 10 g of isopropyl alcohol, 2.34 g of 7-(2-methacryloyloxyethoxy)-4-methylcoumarin monomer, 10 g of dimethylacetamide (DMA), and 0.07 g of AMBN polymerization initiator. Nitrogen was bubbled through the slurry for 30 minutes before heating it in an oil bath at 65° C. for about 18 hours. The reaction solution was cooled and diluted with water to form a clear solution. The reaction solution was then dialyzed for about 18 hours in distilled water and then concentrated to a 13.76 weight % solids solution that was suitable for coating. The weight average molecular weight ($M_w$) of the resulting Inventive reactive polymer was 127,000 as determined by size exclusion chromatography (SEC).

Preparation of Inventive Reactive Polymer U Using 3-Sulfopropyl Methacrylate Potassium Salt, Maleic Anhydride, and 7-(2-Methacryloyloxyethoxy)-4-methylcoumarin (50:30:20 mol % Ratio)

4.00 g of 3-sulfopropyl methacrylate potassium salt was dissolved in 10 g of distilled water in a 250 ml single-neck round-bottom flask, followed by addition of 0.96 g of maleic anhydride, 10 g of isopropyl alcohol, 1.87 g of 7-(2-methacryloyloxyethoxy)-4-methylcoumarin monomer, 10 g of dimethylacetamide (DMA), and 0.07 g of AMBN polymerization initiator. Nitrogen was bubbled through the slurry for 30 minutes before heating it in an oil bath at 65° C. for about 18 hours. The reaction solution was cooled and diluted with water to form a clear solution. The reaction solution was then dialyzed for about 18 hours in distilled water and then concentrated to a 13.87 weight % solids solution that was suitable for coating. The weight average molecular weight ($M_w$) of the resulting Inventive reactive polymer was 100,000 as determined by size exclusion chromatography (SEC).

Preparation of Inventive Reactive Polymer V Using 3-Sulfopropyl Methacrylate Potassium Salt, Acrylamide, and 2-Cinnamoyl-ethyl methacrylate (50:30:20 mol % Ratio)

In a 100 ml single-neck round-bottom flask, 4.26 g of 3-sulfopropyl methacrylate potassium salt, 0.80 g of acrylamide, 1.95 g of 2-cinnamoyl-ethyl methacrylate, and 147 mg of AMBN polymerization initiator were dissolved in a solvent mixture of 33.17 g of water and 33.17 g of isopropyl alcohol (IPA). The reaction mixture was purged with nitrogen, capped with a septum, and set in a preheated oil bath at 70° C. overnight. The reaction mixture was then cooled and placed in a dialysis bag with MWCO of 3500 and dialyzed for about 18 hours, forming a gel-like product that dissolved upon addition of 0.47 g of a 45 weight % potassium hydroxide solution. The composition was then evaporated to a concentration of 11.07 weight % solids. The weight average molecular weight ($M_w$) of the resulting Inventive reactive polymer was 181,000 as determined by size exclusion chromatography (SEC).

Preparation of Inventive Reactive Polymer W Using 3-Sulfopropyl Methacrylate Potassium Salt, Acrylamide, and 2-Cinnamoyl-ethyl methacrylate (10:70:20 mol % Ratio)

In a 100 ml single-neck round-bottom flask, 0.92 g of 3-sulfopropyl methacrylate potassium salt, 1.87 g of acrylamide, 1.95 g of 2-cinnamoyl-ethyl methacrylate, and 95 mg of AMBN polymerization initiator were dissolved in a solvent mixture of 21.33 g of water and 21.33 g of isopropyl alcohol (IPA). The reaction mixture was purged with nitrogen, capped with a septum, and set into a preheated oil bath at 70° C. overnight. The reaction mixture was then cooled and placed in a dialysis bag with MWCO of 3500 and dialyzed for about 18 hours, forming a cloudy but stable dispersion. The composition was then evaporated to a concentration of 13.24 weight % solids.

Preparation of Inventive Reactive Polymer X Using 3-Sulfopropyl Methacrylate Potassium Salt, 2-Hydroxyethyl Methacrylate, and 2-Cinnamoyl-ethyl methacrylate (50:30:20 mol % Ratio)

In a 100 ml single-neck round-bottom flask, 3.08 g of 3-sulfopropyl methacrylate potassium salt, 0.98 g of 2-hydroxyethyl methacrylate, 1.30 g of 2-cinnamoyl-ethyl methacrylate, and 54 mg of AMBN polymerization initiator were dissolved in a solvent mixture of 7.15 g of water, 7.15 g of methyl ethyl ketone (MEK), and 7.15 g of isopropyl alcohol (IPA). The reaction mixture was capped with a septum, purged with nitrogen for 30 minutes, and set in a preheated oil bath at 70° C. for about 18 hours. The reaction mixture was then cooled and placed in a dialysis bag with MWCO of 3500 and dialyzed in distilled water for about 18 hours. The composition was then evaporated to a concentration of 13.78 weight % solids. The weight average molecular weight ($M_w$) of the resulting Inventive reactive polymer was 69,300 as determined by size exclusion chromatography (SEC).

Preparation of Inventive Reactive Polymer Y Using 3-Sulfopropyl Methacrylate Potassium Salt, 2-Hydroxyethyl Methacrylate, and 2-Cinnamoyl-ethyl methacrylate (10:70:20 mol % Ratio)

In a 100 ml single-neck round-bottom flask, 0.92 g of 3-sulfopropyl methacrylate potassium salt, 3.42 g of 2-hydroxyethyl methacrylate, 1.95 g of 2-cinnamoyl-ethyl methacrylate, and 63 mg of AMBN polymerization initiator were dissolved in a solvent mixture of 8.39 g of water, 8.39 g of methyl ethyl ketone (MEK), and 8.39 g of isopropyl alcohol (IPA). The reaction mixture was capped with a septum, purged with nitrogen for 30 minutes, and set in a preheated oil bath at 70° C. for about 18 hours. The reaction mixture was then cooled and placed in a dialysis bag with MWCO of 3500 and dialyzed in distilled water for about 18 hours. The composition was then evaporated to a concentration of 12.85 weight % solids. The weight average molecular weight ($M_w$) of the resulting Inventive reactive polymer was 542,000 as determined by size exclusion chromatography (SEC).

Preparation of Inventive Reactive Polymer Z Using 3-Sulfopropyl Methacrylate Potassium Salt, Maleic Anhydride, and 2-Cinnamoylethyl Methacrylate (50:30:20 mol % Ratio)

In a 100 ml single-neck round-bottom flask, 3.08 g of 3-sulfopropyl methacrylate potassium salt, 0.74 g of maleic anhydride, 1.30 g of 2-cinnamoyl-ethyl methacrylate, and 51 mg of AMBN polymerization initiator were dissolved in a solvent mixture consisting of 6.83 g of water, 6.83 g of methyl ethyl ketone (MEK), and 6.83 g of isopropyl alcohol (IPA). The reaction mixture was capped with a septum, purged with nitrogen for 30 minutes, and set in a preheated oil bath at 70° C. for about 18 hours. The reaction mixture was then cooled and placed in a dialysis bag with MWCO of 3500 and dialyzed in distilled water for about 18 hours. The composition was then evaporated to a concentration of 14.20 weight % solids. The weight average molecular weight ($M_w$) of the resulting Inventive reactive polymer was 68,500 as determined by size exclusion chromatography (SEC).

Preparation of Inventive Reactive Polymer AA Using 3-Sulfopropyl Methacrylate Potassium Salt, Maleic Anhydride, and 2-Cinnamoylethyl Methacrylate (10:70:20 mol % Ratio)

In a 100 ml single-neck round-bottom flask, 0.92 g of 3-sulfopropyl methacrylate potassium salt, 2.57 g of maleic anhydride, 1.95 g of 2-cinnamoyl-ethyl methacrylate, and 54 mg of AMBN polymerization initiator were dissolved in a solvent mixture consisting of 7.25 g of water, 7.25 g of methyl ethyl ketone (MEK), and 7.25 g of isopropyl alcohol (IPA). The reaction mixture was capped with a septum, purged with nitrogen for 30 minutes, and set in a preheated oil bath at 70° C. for about 18 hours. The reaction mixture was then cooled and placed in a dialysis bag with MWCO of 3500 and dialyzed in distilled water for about 18 hours. The composition was then evaporated to a concentration of 13.21 weight % solids. The weight average molecular weight ($M_w$) of the resulting Inventive reactive polymer was 50,500 as determined by size exclusion chromatography (SEC).

Preparation of Inventive Reactive Polymer AB Using 3-Sulfopropyl Methacrylate Potassium Salt, Vinyl Phosphonic Acid, and 2-Cinnamoylethyl methacrylate (50:30:20 mol % Ratio)

In a 100 ml single-neck round-bottom flask, 1.85 g of 3-sulfopropyl methacrylate potassium salt, 1.35 g of vinyl phosphonic acid, 1.30 g of 2-cinnamoyl-ethyl methacrylate, and 45 mg of AMBN polymerization initiator were dissolved in a solvent mixture consisting of 8.50 g of water, 8.50 g of methyl ethyl ketone (MEK), and 8.50 g of isopropyl alcohol (IPA). The reaction mixture was capped with a septum, purged with nitrogen for 30 minutes, and set in a preheated oil bath at 70° C. for about 18 hours. The reaction mixture was cooled and placed in a dialysis bag with MWCO of 3500 and dialyzed in distilled water for about 18 hours. The composition was then evaporated to a concentration of 18.33 weight % solids. The weight average molecular weight ($M_w$) of the resulting Inventive reactive polymer was 26,600 as determined by size exclusion chromatography (SEC).

Preparation of Inventive Reactive Polymer AC Using 3-Sulfopropyl Methacrylate Potassium Salt, Methacrylic Acid, and 2-(2,3-Diphenyl-2-cyclopropene-1-carboxyl)-ethyl methacrylate (50:30:20 mol % Ratio)

3.0 g of 3-sulfopropyl methacrylate potassium salt was dissolved in 16 g of distilled water in a 250 ml single-neck round-bottom flask followed by addition of a solution of 1.70 g of 2-(2,3-diphenyl-2-cyclopropene-1-carboxyl)-ethyl methacrylate dissolved in 16 g of MEK to form a two-phase mixture. A solution of 0.63 g of methacrylic acid dissolved in 16 g of isopropyl alcohol was then added and the solution became a single phase, followed by addition of 0.11 g of AMBN polymerization initiator. The reaction solution was capped with a septum, purged with nitrogen for 30 minutes, and then set in a preheated oil bath at 70° C. for about 18 hours. The reaction solution was cooled and diluted with water to form a clear solution. The solution was dialyzed for about 18 hours and then concentrated to an 11.76 weight % solids solution that was suitable for coating.

Preparation of Inventive Reaction Polymer AD Using 3-Sulfopropyl Methacrylate Potassium Salt, Methacrylic Acid, and 2-(2,3-Diphenyl-2-cyclopropene-1-carboxyl)-ethyl methacrylate (10:70:20 mol % Ratio)

0.53 g of 3-sulfopropyl methacrylate potassium salt was dissolved in 10 g of distilled water in a 250 ml single-neck round-bottom flask followed by addition of a solution of 1.50 g of 2-(2,3-diphenyl-2-cyclopropene-1-carboxyl)-ethyl methacrylate monomer dissolved in 10 g of MEK to form a two-phase mixture. A solution of 1.30 g of methacrylic acid dissolved in 10 g of isopropyl alcohol was then added and the solution became a single phase, followed by addition of 0.07 g of AMBN polymerization initiator. The solution was capped with a septum, purged with nitrogen for 30 minutes, and set in a preheated oil bath at 70° C. for about 18 hours. The reaction solution was cooled and diluted with water to form a clear solution that was dialyzed for about 18 hours and then concentrated to a 12.64 weight % solids solution that was suitable for coating. The weight average molecular weight ($M_w$) of the resulting Inventive reactive polymer was 61,800 as determined by size exclusion chromatography (SEC).

Preparation of Invention Reactive Polymer AE Using 3-Sulfopropyl Methacrylate Potassium Salt and N-(2-(methacryloxy)ethyl) Dimethylmaleimide (80:20 mol % Ratio)

In a 100 ml single neck round bottom flask, 4.93 g of 3-sulfopropyl methacrylate potassium salt, 1.19 g of N-(2-(methacryloxy)ethyl) dimethylmaleimide, and 61 mg of AMBN were dissolved in a solvent mixture consisting of 8.16 g of water, 8.16 g of methyl ethyl ketone (MEK), and 8.16 g of isopropyl alcohol (IPA). The reaction mixture was capped with a septum, purged with nitrogen for 30 minutes, and set in a preheated oil bath at 70° C. for about 18 hours. The reaction mixture was cooled and placed in a dialysis bag with MWCO of 3500 and dialyzed in distilled water for about 18 hours. The contents were then evaporated to a concentration of 16.84 weight % solids. The weight average molecular weight ($M_w$) of the resulting Invention Reactive Polymer AE was 110,000 as determined by size exclusion chromatography (SEC).

Preparation of Inventive Reactive Polymer AF Using 3-Sulfopropyl Methacrylate Potassium Salt, Methacrylic Acid, and N-(2-(methacryloxy)ethyl) Dimethylmaleimide (50:30:20 mol % Ratio)

In a 100 ml single neck round bottom flask, 3.08 g of 3-sulfopropyl methacrylate potassium salt, 0.65 g of methacrylic acid, 1.19 g of N-(2-(methacryloxy)ethyl) dimethylmaleimide, and 49 mg of AMBN were dissolved in a solvent mixture consisting of 6.56 g of water, 6.56 g of methyl ethyl ketone (MEK), and 6.56 g of isopropyl alcohol (IPA). The reaction mixture was capped with a septum, purged with nitrogen for 30 minutes, and set in a preheated oil bath at 70° C. for about 18 hours. The reaction mixture was cooled and placed in a dialysis bag with MWCO of 3500 and dialyzed in distilled water for about 18 hours. The contents were then evaporated to a concentration of 15.36 weight % solids. The weight average molecular weight ($M_w$) of the resulting Invention Reactive Polymer AF was 93,300 as determined by size exclusion chromatography (SEC).

Preparation of Inventive Reactive Polymer AG Using 3-Sulfopropyl Methacrylate Potassium Salt, Methacrylic Acid, and N-(2-(methacryloxy)ethyl) Dimethylmaleimide (10:70:20 mol % Ratio)

In a 100 ml single neck round bottom flask, 0.92 g of 3-sulfopropyl methacrylate potassium salt, 2.26 g of methacrylic acid, 1.78 g of N-(2-(methacryloxy)ethyl) dimethylmaleimide, and 50 mg of AMBN were dissolved in a solvent mixture consisting of 6.61 g of water, 6.61 g of methyl ethyl ketone (MEK), and 6.61 g of isopropyl alcohol (IPA). The reaction mixture was capped with a septum, purged with nitrogen for 30 minutes, and set in a preheated oil bath at 70° C. for about 18 hours. The reaction mixture was cooled and placed in a dialysis bag with MWCO of 3500 and dialyzed in distilled water for about 18 hours. The contents were then evaporated to a concentration of 11.46 weight % solids. The weight average molecular weight ($M_w$) of the resulting Inventive reactive Polymer AG was 254,000 as determined by size exclusion chromatography (SEC).

Preparation of Polymeric Copper Ion Complexes:

For the Inventive polymers described above, a water soluble and water-coatable polymer copper ion complex was formed as follows:

A quantity of Inventive reactive polymer solution sufficient to provide 5.0 g of 8.5 weight % of reactive polymer was added to a clear glass vessel, followed by any additional make-up water. With vigorous stirring, 0.614 g of 1.0 molar copper sulfate solution was added dropwise. A stable pale blue solution was formed that ranged from clear to turbid depending on the type of reactive polymer. A surfactant such as Dupont Capstone FS-35 or TERGITOL® 15-S-9 was added at between 0.05 and 0.5 weight % as a coating aid. Each resulting solution was filtered through a 1 µm glass syringe filter to provide a coating-ready water-soluble formulation (that is, a copper metal or oxide precursor composition).

Preparation of Polymeric Copper Nanoparticle Complexes:

A general procedure to form a water-soluble and a water-coatable copper nanoparticle complex with each Inventive reactive polymer described above is as follows:

A quantity of polymer solution sufficient to provide 5.0 g of 8.5 weight % reactive polymer was added to a clear glass vessel, followed by any additional make-up water. With vigorous stirring, 0.614 g of 1.0 molar copper sulfate solution was added dropwise. A stable pale blue solution was formed that was generally clear, but could have some turbidity depending on the type of reactive polymer. With continued stirring, 0.157 g of a freshly prepared 4 weight % dimethylamine borane solution was added dropwise. After heating at 50° C. for 15 to 30 minutes, the initially pale blue solution changes to a deep red-brown color due to the surface plasmon resonance absorption of the newly formed copper nanoparticles.

Preparation of Copper Oxide Nanoparticle Polymeric Complexes:

Approximately 1 g of the preparation of Copper Nanoparticle Polymer Complex described above was placed in a clear 5 ml vial and shaken vigorously to incorporate air and dissolve oxygen into the polymer copper complex. Upon standing for about 3 hours, the dark reddish brown color from the surface plasmon resonance of the metal particles faded to a very pale dull green color indicating the oxidation of the copper nanoparticles into copper oxide nanoparticles.

Coating and Patterning the Polymeric Copper Ion and Copper Nanoparticle Complexes:

The water-soluble polymeric copper ion and polymeric copper nanoparticle complexes described above and listed below in TABLE II were coated and patterned using ultraviolet (UV) light as follows:

A surfactant such as Dupont Capstone FS-35 or TERGITOL® 15-S-9 was added to each water-soluble complex at a concentration of between 0.05 weight % and 0.5 weight % and the resulting formulation was passed through a 1 μm glass syringe filter. Each of the formulations was then spin coated at between 2000 and 3000 RPM onto a poly(ethylene terephthalate) (PET) film pre-coated before stretching with a layer of poly(glycidyl methacrylate-co-butyl acrylate) to provide a substrate. Each coating was then allowed to dry and age for between 30 and 60 minutes.

Each dried coating was then exposed through a predetermined contact mask to a broadband high pressure UV lamp that was collimated and filtered with a dichroic mirror with a bandpass of 350 nm to 450 nm. Other dichroic mirrors with a bandpass of 260 nm to 320 nm or 220 nm to 260 nm can be used if shorter wavelength UV light is desired. The exposing masks are made of evaporated chrome on quartz with the high resolution patterns made with conventional photolithographic methods capable of sub 1 μm resolution. The photo-patternability of each dried complex was evaluated with a high resolution contact exposure mask with a series of features down to 1 μm.

Following UV exposure, each dried coating was then again allowed to age for 15 to 60 minutes and then baked for 1 minute on a 60° C. hotplate with vacuum suction. Each sample was then processed for 2 minutes in an agitated bath of distilled water at room temperature to remove any unexposed polymer complex. After removal from the agitated distilled water bath, each dried coating was rinsed twice for approximately 5 seconds in distilled water to further remove any residual non-exposed complex. Optical microscopy was used to evaluate the resolved line-widths and overall quality of the resulting pattern.

Dried coatings that were exposed through a plain quartz mask to harden and insolubilize (crosslink) the polymer complex were also prepared for evaluation of their antimicrobial behavior.

TABLE II

Description of Inventive Copper-Polymer Complexes

| Polymer | Water-soluble Monomer(s) | Crosslinkable Monomer | Monomer Mol % Ratios | Polymer Molecular Weight | Appearance of Copper Ion Complex | Copper ion Complex Patterning with UV light | Appearance of Copper Nano-particle Complex | Copper Average Nano-particle size (nm) by light scattering | Patterning with UV Radiation |
|---|---|---|---|---|---|---|---|---|---|
| Inventive A | SPMA, MA | CIN | 2:78:20 | 1,110,000 | Slightly turbid pale blue | | Very turbid grey-brown | | |
| Inventive B | SPMA, MA | CIN | 5:75:20 | 631,000 | Clear pale blue | | Clear dark red-brown | 14 nm | 10 μm lines |
| Inventive C | SPMA, MA | CIN | 10:70:20 | 219,000 | Slightly turbid pale blue | 2 μm lines | Clear dark red-brown | 15 nm | 2 μm lines |
| Inventive D | SPMA, MA | CIN | 30:50:20 | 180,000 | Slightly turbid pale blue | | Clear dark red-brown | | 2 μm lines |
| Inventive E | SPMA, MA | CIN | 50:30:20 | 160,000 | Slightly turbid pale blue | 2 μm lines | Clear dark red-brown | 7 nm | 2 μm lines |
| Inventive F | SPMA | CIN | 80:20 | 138,000 | Slightly turbid pale blue | | Turbid brown | | 2 μm lines |
| Inventive G | SPMA, MA | COUM | 10:70:20 | 422,000 | Clear pale blue-green | | Clear dark red-brown | | 2 μm lines |
| Inventive H | SPMA, MA | COUM | 30:50:20 | 800,000 | Clear pale blue | | Clear dark red-brown | | 3 μm lines |
| Inventive I | SPMA, MA | COUM | 50:30:20 | 414,000 | Slightly turbid pale blue | | Clear dark red-brown | 11 nm | 2 μm lines |
| Inventive J | SPMA | COUM | 80:20 | 469,000 | Clear pale blue | | Turbid light red-brown | | |
| Inventive K | SS | COUM | 80:20 | 258,000 | Clear pale blue | 5 μm lines | Turbid light red-brown | | 5 μm lines |
| Inventive L | SS, MA | COUM | 50:30:20 | 437,000 | Clear pale blue | | Clear dark red-brown | 26 nm | 4 μm lines |
| Inventive M | AMPS | COUM | 80:20 | 48,900 | Slightly turbid pale blue | | Turbid red-brown | | |
| Inventive N | AMPS, MA | COUM | 50:30:20 | 322,000 | Slightly turbid pale blue | | Clear dark red-brown | | 5 μm lines |
| Inventive O | AMPS | CIN | 80:20 | 51,800 | Slightly turbid pale blue-green | | Slightly turbid dark brown | 41 nm | |
| Inventive P | AMPS, MA | CIN | 50:30:20 | 62,200 | clear pale blue-green | | Clear dark brown | 28 nm | |
| Inventive Q | SPMA, VP | COUM | 50:30:20 | 112,000 | Slightly turbid pale blue-green | | Turbid red-brown | | |

TABLE II-continued

Description of Inventive Copper-Polymer Complexes

| Polymer | Water-soluble Monomer(s) | Crosslinkable Monomer | Monomer Mol % Ratios | Polymer Molecular Weight | Appearance of Copper Ion Complex | Copper ion Complex Patterning with UV light | Appearance of Copper Nano-particle Complex | Copper Average Nano-particle size (nm) by light scattering | Patterning with UV Radiation |
|---|---|---|---|---|---|---|---|---|---|
| Inventive R | SPMA, MA, VP | COUM | 20:30:30:20 | 608,000 | clear pale blue-green | | Clear dark red-brown | | |
| Inventive S | SPMA, HEM | COUM | 50:30:20 | 269,000 | Clear pale blue | | Turbid red-brown | 16 nm | 2 μm lines |
| Inventive T | SPMA, HEM | COUM | 10:70:20 | 127,000 | Slightly turbid pale blue-green | | gelled | | |
| Inventive U | SPMA, MD | COUM | 50:30:20 | 100,000 | Slightly turbid pale blue-green | | Turbid red-brown | 7 nm | |
| Inventive V | SPMA, AA | CIN | 50:30:20 | 181,000 | clear pale blue-green | 2 μm lines | Very turbid red-brown | 326 nm | 3 μm lines |
| Inventive W | SPMA, AA | CIN | 10:70:20 | N/A | Very turbid pale blue | | Very turbid red-brown | | |
| Inventive X | SPMA, HEM | CIN | 50:30:20 | 69,300 | Slightly turbid pale blue | 2 μm lines | Turbid red-brown | 28 nm* | 2 μm lines |
| Inventive Y | SPMA, HEM | CIN | 10:70:20 | 542,000 | Slightly turbid pale blue | 3 μm lines | Turbid red-brown | 41 nm* | |
| Inventive Z | SPMA, MD | CIN | 50:30:20 | 68,900 | Slightly turbid pale blue | 2 μm lines | Clear dark red-brown | 26 nm | 2 μm lines |
| Inventive AA | SPMA, MD | CIN | 10:70:20 | 50,500 | Clear pale blue | | Clear dark red-brown | 16 nm | 2 μm lines |
| Inventive AB | SPMA, VPH | CIN | 30:50:20 | 26,600 | Clear pale blue | | Clear dark red-brown | 18 nm | 2 μm lines |
| Inventive AC | SPMA, MA | DPCP | 50:30:20 | N/A | Turbid pale blue-green | | Turbid red-brown | | 4 μm lines |
| Inventive AD | SPMA, MA | DPCP | 10:70:20 | 61,800 | clear pale blue-green | | Clear dark red-brown | | 3 μm lines |
| Inventive AE | SPMA | DMMI | 80:20 | 110,000 | clear pale blue-green | | Turbid light red-brown | 1230 nm | 2 μm lines |
| Inventive AF | SPMA, MA | DMMI | 50:30:20 | 93,300 | Slightly turbid pale blue-green | | Clear dark red-brown | 7 nm | 2 μm lines |
| Inventive AG | SPMA, MA | DMMI | 10:70:20 | 254,000 | Slightly turbid pale blue-green | | Clear dark red-brown | 16 nm | 2 μm lines |

Preparation of Coatings for Antimicrobial Testing:

The copper ion polymeric complex and copper nanoparticle polymeric complex solutions prepared using Inventive Reactive Polymers I and K, respectively, were spin coated at 2000 rpm on the polymer subbed PET substrate described above. Each resulting precursor article was allowed to age for 30 to 60 minutes, then uniformly exposed to a broad band UV lamp with a 350 nm to 450 nm dichroic bandpass filter for 30 seconds without using any patterned mask. Each exposed article was allowed to age at room temperature for 30 to 90 minutes and then heated for 1 minute on a 60° C. vacuum hotplate.

Antimicrobial Surface Challenge Testing:

A Self-Sanitizing Surface Efficacy Test based on ASTM WK42235 was conducted using *E. coli* with a 2 hour dry exposure on a 1 inch×1 inch (2.54 cm×2.54 cm) square of each article described above containing the uniform coating of copper ion polymeric complex containing Inventive Reactive Polymer K and the copper nanoparticle polymeric complex containing Inventive Reactive Polymer I. A 2.7 log reduction in colony forming units (CFU) was observed for the article containing the copper ion polymeric complex containing Inventive Reactive Polymer K relative to a coating of Inventive Reactive Polymer K containing no copper ions or copper metal.

The uniform coating of copper nanoparticle polymeric complex containing Inventive Reactive Polymer I showed a 3.6 log reduction in colony forming units (CFU) relative to a coating of Inventive Reactive Polymer I that did not contain any copper ions or copper metal.

A 2.9 log reduction in CFU/carrier for the uniform coating of the copper ion polymeric complex containing Inventive Reactive Polymer K and a 3.9 log reduction in CFU/carrier for the uniform coating containing copper nanoparticle polymeric complex containing Inventive Reactive Polymer I were observed relative to a stainless steel surface used as a standard reference. These results indicate a very strong antimicrobial response from both the ionic and nanoparticle form of copper in the polymeric complexes according to the present invention.

High Resolution Patterning to Form Antimicrobial Surfaces with Resistance to Microbial Colonization and Biofilm Formation:

High resolution chrome-on-quartz masks where prepared to produce SHARKLET™ AF patterns with 1.5 to 2 μm lines and spaces as described in U.S. Pat. No. Application Publication 2010/0226943A1 and U.S. Pat. Nos. 7,650,848B2 (Brennan et al.) and 7,143,709B2 (Brennan et al.). Inventive polymeric copper ion and polymeric copper nanoparticle complexes containing Inventive reactive polymers E, I and V were prepared and coated on the primed PET substrate described above for general patterning procedures. Each dried coating was exposed through the SHARKLET™ AF mask with collimated broadband UV light filtered with a 350 nm to 450 nm bandpass dichroic filter and processed with an agitated distilled water bath as described above for the general photopatterning procedure.

Both the Invention polymeric copper ion and polymeric copper nanoparticle complexes were successfully used to reproduce the approximately 1.5 to 2 μm line-width features of the SHARKLET™ AF mask.

The invention has been described in detail with particular reference to certain preferred embodiments thereof, but it will be understood that variations and modifications can be effected within the spirit and scope of the invention.

The invention claimed is:

1. A copper-containing article comprising a substrate and having disposed thereon a copper-containing composition comprising a water-soluble complex of a reactive polymer with reducible copper ions or copper nanoparticles, the reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

2. The copper-containing article of claim 1, wherein the reactive polymer comprises:
(i-a) at least 5 mol % and up to and including 50 mol % of the recurring units comprising a pendant group capable of crosslinking via [2+2] photocycloaddition, based on the total recurring units in the reactive polymer,
(i-b) at least 1 mol % and up to and including 93 mol % of recurring units comprising a pendant hydroxyl, amide, or carboxylic acid group, based on the total recurring units in the reactive polymer, or
both (i-a) and (i-b).

3. The copper-containing article of claim 1, wherein the recurring units comprising a pendant group capable of crosslinking via [2+2] photocycloaddition comprise:
a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;
(ii) a photosensitive, non-aromatic unsaturated carbocyclic group;
(iii) a photosensitive, aromatic or non-aromatic heterocyclic group comprising a carbon-carbon double bond that is conjugated with an electron withdrawing group;
(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom; or
(v) a photosensitive substituted or unsubstituted 1,2-diarylethylene group.

4. The copper-containing article of claim 1, wherein the substrate has a first supporting side and an opposing second supporting side, and the copper-containing composition is disposed on one or both the first supporting side and the opposing second supporting of the substrate.

5. The copper-containing article of claim 1, wherein the copper-containing composition is disposed on the substrate in a patternwise fashion.

6. A copper-containing article comprising a substrate and having disposed thereon a water-insoluble composition comprising a crosslinked water-insoluble complex of a crosslinked reacted polymer with reducible copper ions or copper nanoparticles, the crosslinked reacted polymer derived from photoexposure of a reactive polymer comprising: (a) greater than 1 mol % of recurring units comprising sulfonic acid or sulfonate groups, (b) at least 5 mol % of recurring units comprising a pendant group capable of crosslinking via [2+2] photocycloaddition, and optionally (c) at least 1 mol % of recurring units comprising a pendant amide, amine, hydroxyl, lactam, phosphonic acid, or carboxylic acid group, all amounts based on the total recurring units in the reactive polymer.

7. The copper-containing article of claim 6, wherein the water-insoluble composition comprises copper nanoparticles that have an average diameter of at least 2 nm and up to and including 500 nm.

8. The copper-containing article of claim 6, wherein the same or different crosslinked water-insoluble complex is disposed on both the first supporting side and the opposing second supporting side of the substrate in the same or different patternwise fashion.

9. The copper-containing article of claim 6, wherein the substrate is a continuous polymeric web.

10. The copper-containing article of claim 6, wherein the reactive polymer comprises:
(i-a) at least 5 mol % and up to and including 50 mol % of the recurring units comprising a pendant group capable of crosslinking via [2+2] photocycloaddition, based on the total recurring units in the reactive polymer,
(i-b) at least 1 mol % and up to and including 93 mol % of recurring units comprising a pendant hydroxyl, amide, or carboxylic acid group, based on the total recurring units in the reactive polymer, or
both (i-a) and (i-b).

11. The copper-containing article of claim 6, wherein the recurring units comprising a pendant group capable of crosslinking via [2+2] photocycloaddition comprise:
a photosensitive —C(=O)—CR=CR$^1$—Y group wherein R and R$^1$ are independently hydrogen or an alkyl group having 1 to 7 carbon atoms, a 5- to 6-membered cycloalkyl group, an alkoxy group having 1 to 7 carbon atoms, a phenyl group, or a phenoxy group, and Y is an aryl or heteroaryl group;
(ii) a photosensitive, non-aromatic unsaturated carbocyclic group;
(iii) a photosensitive, aromatic or non-aromatic heterocyclic group comprising a carbon-carbon double bond that is conjugated with an electron withdrawing group;
(iv) a photosensitive non-aromatic unsaturated heterocyclic group comprising one or more amide groups that are conjugated with a carbon-carbon double bond, which photosensitive non-aromatic unsaturated heterocyclic group is linked to the water-soluble backbone at an amide nitrogen atom; or
(v) a photosensitive substituted or unsubstituted 1,2-diarylethylene group.

* * * * *